United States Patent
Pandey et al.

(10) Patent No.: US 10,900,877 B1
(45) Date of Patent: Jan. 26, 2021

(54) METHODS, APPARATUS, AND SYSTEMS TO EXTRACT AND QUANTIFY MINUTE OBJECTS FROM SOIL OR FECES, INCLUDING PLANT-PARASITIC NEMATODE PESTS AND THEIR EGGS IN SOIL

(71) Applicant: Iowa State University Research Foundation, Inc., Ames, IA (US)

(72) Inventors: Santosh Pandey, Ames, IA (US); Augustine Beeman, Ames, IA (US); Leland E. Harker, Ames, IA (US); Jared P. Jensen, Ames, IA (US); Upender Kalwa, Ames, IA (US); Taejoon Kong, Ames, IA (US); Zach L. Njus, Ames, IA (US); Gregory L. Tylka, Ames, IA (US); Christopher M. Legner, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 240 days.

(21) Appl. No.: 15/914,735

(22) Filed: Mar. 7, 2018

Related U.S. Application Data

(60) Provisional application No. 62/468,760, filed on Mar. 8, 2017.

(51) Int. Cl.
  *G01N 1/28* (2006.01)
  *G01N 1/40* (2006.01)
  (Continued)

(52) U.S. Cl.
  CPC ............ *G01N 1/40* (2013.01); *G01N 1/286* (2013.01); *G01N 1/34* (2013.01); *G01N 35/0099* (2013.01);
  (Continued)

(58) Field of Classification Search
  CPC ...... G01N 1/40; G01N 35/0099; G01N 35/02; G01N 35/00871; G01N 1/286; G01N 1/34;
  (Continued)

(56) References Cited

U.S. PATENT DOCUMENTS

| 3,905,895 A | 9/1975 | Addis |
| 4,081,356 A | 3/1978 | Zierdt |

(Continued)

FOREIGN PATENT DOCUMENTS

CN  203735291 U  7/2014

OTHER PUBLICATIONS

Zayas, I. Y., and Paul W. Flinn. "Detection of insects in bulkwheat samples with machine vision." Transactions of the ASAE 41.3 (1998): 883. (Year: 1998).*

(Continued)

*Primary Examiner* — Amandeep Saini
(74) *Attorney, Agent, or Firm* — McKee, Voorhees & Sease, PLC

(57) ABSTRACT

A system, method, and apparatus for quantification of predetermined particles in a soil or feces sample with certain automated steps. In one aspect it includes an input station for inputting a soil or feces sample; a sieving/filtering station for separating soil or feces from particles or particle carriers, and/or separating particle carriers from particles; and a collection station for receiving the extracted particles. It can include quantification of the collected sample with an imaging station to digitally image the particles and recognize and count the particles collected. A mechanism can mechanically move the filtered particles from the sieve/filter station to the collection station. A controller can be programmed to automatically control at least certain functions of the mechanism. An optional feature includes acquisition of chemical, (Continued)

biological, physical, or other parameters of the sample with one or more sensors positioned or positionable at the sample.

25 Claims, 47 Drawing Sheets
(9 of 47 Drawing Sheet(s) Filed in Color)

(51) Int. Cl.
    *G06K 9/32*      (2006.01)
    *G06T 7/00*      (2017.01)
    *G01N 1/34*      (2006.01)
    *G01N 35/00*     (2006.01)
    *G01N 35/02*     (2006.01)
    *G06K 9/00*      (2006.01)
    *G05B 19/402*    (2006.01)

(52) U.S. Cl.
    CPC ....... *G01N 35/00871* (2013.01); *G01N 35/02* (2013.01); *G05B 19/402* (2013.01); *G06K 9/00134* (2013.01); *G06K 9/3233* (2013.01); *G06T 7/0012* (2013.01); *G01N 2001/2866* (2013.01); *G05B 2219/23416* (2013.01); *G06T 2207/10016* (2013.01); *G06T 2207/10056* (2013.01); *G06T 2207/30188* (2013.01); *G06T 2207/30242* (2013.01)

(58) Field of Classification Search
    CPC ....... G01N 2001/2866; G06K 9/00134; G06K 9/3233; G05B 19/402; G05B 2219/23416; G06T 7/0012; G06T 2207/30188; G06T 2207/10056; G06T 2207/30242; G06T 2207/10016
    USPC ........................................................ 382/110
    See application file for complete search history.

(56) References Cited

U.S. PATENT DOCUMENTS

| | | |
|---|---|---|
| 5,063,026 A | 11/1991 | Wong |
| 5,222,605 A * | 6/1993 | Pogue ........................ B07B 1/38 209/239 |
| 5,526,705 A | 6/1996 | Skotnikov et al. |
| 6,202,829 B1 | 3/2001 | Van Dyke, Jr. et al. |
| 6,331,438 B1 | 12/2001 | Aylott et al. |
| 7,123,750 B2 | 10/2006 | Lu et al. |
| 7,788,970 B2 | 9/2010 | Hitt et al. |
| 7,830,504 B2 | 11/2010 | Deppermann et al. |
| 9,110,240 B2 | 8/2015 | Gill et al. |
| 2004/0005714 A1 | 1/2004 | Safar et al. |
| 2012/0202715 A1* | 8/2012 | Partida-Sanchez ........................ B01L 3/50255 506/23 |

OTHER PUBLICATIONS

Syed, Farhan Abbas. Development of an automated system for extraction and quantification of soybean cyst nematode (SCN) eggs and cysts. Diss. 2015. (Year: 2015).*
Winfield, A.L. et al., "A Column Elutriator for Extracting Cyst Nematodes and Other Small Invertebrates from Soil Samples", Association of Applied Biologists, pp. 223-231. 1987.
Adamchuk, V.I. et al., "On-The-Go Soil Sensors for Precision Agriculture", Computers and Electronics in Agriculture, pp. 71-91. Mar. 8, 2004.
Byrd, Jr., D. W. et al., "Two Semi-Automatic Elutriators for Extracting Nematodes and Certain Fungi From Soil", Journal of Nematology, vol. 8, No. 3, pp. 206-212. Jan. 16, 1976.
Faghihi, J. et al., "An Efficient New Device to Release Eggs From Heterodera Glycines", Journal of Nematology 32 (4): pp. 411-413. 2000.
Turntable Bearing Kit—VEX Robotics, https://www.vexrobotics.com/276-1810.html, pp. 1-3, retrieved from internet on Feb. 22, 2018.
Humboldt Manufacturing—ASTM Sieves, https://www.humboldtmfg.com/sieves.html, pp. 1-2, retrieved from internet on Mar. 7, 2018.
Syed, Farhan, "Development of an Automated System for Extraction and Quantification of Soybean Cyst Nematode (SCN) Eggs and Cysts", Grad Student Thesis, pp. 1-86. 2015.
Gerdemann, J. W., "Relation of a Large Soil-Borne Spore to Phycomycetous Mycorrhizal Infections", Mycological Society of America, vol. 47, No. 5, pp. 619-632. 1955.
CN203735291U, English machine translation of part of China patent publication, 1 page, published on Jul. 30, 2014.
Soil Sensor Types and Technologies, http://soilsensor.com/soil-sensor-types, pp. 1-6, retrieved from internet on Mar. 8, 2018.

* cited by examiner

METHODS, APPARATUS, AND SYSTEMS TO EXTRACT AND QUANTIFY MINUTE OBJECTS FROM SOIL OR FECES, INCLUDING PLANT-PARASITIC NEMATODE PESTS AND THEIR EGGS IN SOIL

CROSS-REFERENCE TO RELATED APPLICATIONS

This application claims the benefit of Provisional Application U.S. Ser. No. 62/468,760, filed on Mar. 8, 2017, which is herein incorporated by reference in its entirety.

GOVERNMENT RIGHTS

This invention was made with government support under NATIONAL SCIENCE FOUNDATION GRANT No. DBI1556370. The Government has certain rights in the invention.

I. BACKGROUND OF THE INVENTION

A. Field of the Invention

The present invention relates to extracting relatively small objects or organisms of interest from a starting mixture, such as a soil or feces sample, and to apparatus, systems, and methods of automating at least certain steps in not only extraction, but in input, collection, and quantification of the extracted items of interest for further use. In one example, the items of interest are plant-parasitic nematodes of field crops that can be sampled with a mixture of soil and debris from a field and further use of collected and quantified items of interest to assist in making informed decisions on how to manage the organisms and/or crops in the sampled field. Those skilled in the art will appreciate that at least aspects of the disclosed invention may be applied to different items of interest. Therefore, the invention is not necessarily limited to nematodes, soil or feces samples, or quantification for remedial purposes.

B. Problems in the State of the Art

Extraction of relatively small objects or organisms from a soil or feces sample has numerous challenges. For example, the organism of interest can be in different stages of development. The soil or feces sample vary drastically in characteristics such as particular size distribution, debris, organic and inorganic matter, etc. In particular, the organisms can be hard to distinguish from other components and other organisms in the sample.

Take the case of soybean cyst nematodes. They can exist in egg, juvenile worm, or egg-filled cyst form in soil. Each state varies in size and shape (see ref. nos. 10, 12, 14 and 16 in FIG. 1A). Soil from field-to-field, and sometimes within a single field, can vary in texture, moisture, make-up, and other organisms and organic and inorganic components.

Soybean cyst nematodes (SCN) can cause substantial yield decrease. Yield reduction typically is related to nematode eggs and cysts population density (or number) in a field. Knowledge of estimated population density at the appropriate time or times, with sufficient accuracy, can at least allow the chance of meaningful remedial actions.

As is well known in soybean production agriculture, SCN is the number one yield loss. While it has been demonstrated that yield loss is proportional to number of SCN eggs per volume of soil, the difficulty is (a) identifying whether infestation has occurred and then (b) what severity. One cannot tell from simply looking at the soil, as the organisms are beneath the top of the soil. Also, quantification or severity cannot be accurately determined from simply looking at plants growing in the soil.

Decisions as to treatment or strategies of remediation require a reasonable quantification of infestation severity to be practical and effective. In other words, a producer could prophylactically apply chemicals to the soil, or utilize specific SCN-resistant seed coatings, varieties or GMO seeds. But this might utilize quantities not needed and incur substantial unneeded expense or may result in ineffective treatment in terms of level of chemicals or type of seed used. Another remediation technique is crop rotation for the field of interest between different growing seasons.

The dilemma is made worse by the fact that SCN is becoming increasingly resistant to GMO engineered seed. Therefore, a better understanding of where infestation has expanded to geographically and its severity would be highly valuable to the agricultural community. It could help on a macro-scale with remedial strategies. Thus, individual producers addressing their specific SCN problems, to regional or even worldwide organizations or governments, face increasing pressure because of the expanding infestations geographically and increasing resistance to typical treatments. See, e.g. FIG. 1B.

As can be appreciated, the small size of the SCN organism, as well as its entrainment in soil, make both extraction and quantification not just difficult, but unpredictable. Manual soil sampling from a field, manual sieving of the sample through increasingly fine mesh sizes to extract eggs, and then quantification of number of SCN eggs per sample by such things as visual or manual counting is laborious and error-prone. Considering the increasing incidence of infestation and need for more quantifiable, quicker understanding of severity of infestation, such manual procedures become almost untenable.

A conventional way of estimating nematode population density from a soil sample is to gather field soil samples and send them to a remote laboratory for analysis prior to the growing season. There the sample is sub-divided into sub-samples of known volume. A sieving process is conducted manually on selected sub-samples to try to extract the relevant forms of the nematode pests, whether egg, worm, or cyst stage from the sub-sample known volume of soil. Pest population density estimates for the field are made manually counting what the worker decides are pests in the sub-sample and then relating that count to a pest density estimate per volume of soil. This can be extrapolated into an estimate correlated to whether pest density needs remediation.

The foregoing technique relies heavily on human manual actions and judgements. As such, it is susceptible to human error, as well as resource costs and limitations related to labor and time. It also requires substantial targeted training of the workers.

Therefore, the inventors have identified room for improvement in this technical area.

There is a need for more automated, quicker, repeatable, and precise extraction of nematode eggs and cysts, and their quantification. There is the need for a system that can operate away from laboratory settings and, as such, can be substantially portable and robust.

However, there are many challenges. The small scale of nematode eggs (e.g., microscale) presents technological hurdles to not only identifying them but handling them in machine-based fashion. Technological hurdles include variation and content of soil sample. Most samples contain not only any nematodes but other organisms along with dirt particles. Also, the soil in the sample can vary by composition (clay, loam, etc.) but also textures, particle sizes, not to mention debris (e.g. organic trash, rocks, etc.). These types of factors make it difficult to differentiate objects of interest from all else. Unpredictability results from both the foregoing challenges, and also because design factors can be antagonistic with one another. For example, better extraction of such small objects tends to require more steps and more time. But a need in this area is more efficient extraction techniques. Similarly, better automatic identification and counting tend to suggest higher cost and complexity. But this is antagonistic with economical solutions.

It will be further appreciated that analogous challenges can exist regarding other items of interest. For example, there are other organisms that lay their eggs in soil or feces of which efficient, economical, and accurate population density estimation would be useful. Some are parasitic. Others are non-parasitic or beneficial. There can be other objects of interest in feces. But quantification could be beneficial, including for pest management and for research purposes. Still further, there are other relatively small items that could benefit from a more efficient and economical extraction, collection, and/or quantification.

SUMMARY OF THE INVENTION

A. Objects, Features and Advantages of the Invention

It is therefore a principal object, feature, or advantage of the present invention to improve over or solve problems and deficiencies in the state-of-the-art.

Other objects, features, and advantages of the invention include a system, methods, or apparatus as above described which provide one or more of the following:
  a. Efficiency. Does not require transport of samples to dedicated laboratory, which is many times remote from sample site, or necessarily require advanced or highly specialized training.
  b. Economy. Does not require high priced components, a lab setting or specialized training.
  c. Throughput. Can allow at least substantially efficient automated movement through the system for good throughput of plural samples, while keeping track of each for documentation and identification purposes. This can relate to speed per sample, or cumulative number of processed samples per unit time.
  d. Uniformity of results. By reducing sources of human error, and by consistent mechanized, automated functions, inconsistencies can be reduced, and results obtained more consistently for improved comparisons between samples from the same field to samples from different fields.
  e. Effectiveness. High control of extraction functions can improve extraction of relevant items and thus quantification of the same.
  f. Flexibility of Implementation and Use. Allows multiple functions with same basic systems so that different items of relevance can be extracted and quantified. Different processes, different order of processes, and sequence of processes allows for application to different target items of relevance or different treatments of such targets. Essentially the system can be reconfigured as to when, where, what, how, and why certain functions occur but all within the same basic system.
  g. Portability of system. Can be carried and moved to different laboratory or non-laboratory settings or in farm fields or other locations to perform functions on the soil or feces sample in a preferred location by the user or group of users.
  h. Speed. Can quantify a plurality of samples in much quicker time-frame than present techniques. Aspects of the invention can be implemented in single sample serial processing or high-throughput plural parallel sample processing.
  i. Repeatability. Can be set up over a variety of different sample make-ups and conditions to produce repeatable results.
  j. Precision and accuracy. As will be explained further below, absolute precision and accuracy is not required for benefits. But repeatability and accuracy within a certain acceptable margin of error can be sufficient. It is to be understood that the present invention can address and take advantage of that.
  k. Macro- or micro-data. As will be appreciated, the increasing pressure at addressing problems discussed herein, exists over a range of scales. On one hand, individual producers or researchers would like to better quantify soil or feces samples not only at one sample location but in as many per field or location as is practical. Modern precision agricultural application and planting equipment allow on-the-go adjustment of chemical application rate or seed selection which can be changed across a single field. Knowing if infestation levels differ in the same field can be meaningful as far as cost of materials. On the other hand, the ability to have a technique that is repeatable, accurate within needed margin of error, and precise within the margin of error can allow gathering of data on a more macro-scale. Use of multiple systems across wide range of geographical areas can gather such information in a consistent manner. Such information can be reliably correlated in a data sense to help understand the SCN problem and generate solutions regionally and world-wide. Modern animal science could likewise benefit from such systems in similar ways by gaining information from quantifying small organisms in feces samples.
  l. Starting unpurified sample. Aspects of the invention can be used with a dirty sample, in the sense it does not require substantial, costly, complex pre-processing of the sample to remove substantially all impurities or irrelevant substances.

B. Aspects of the Invention

A first aspect of the present invention relates to a highly flexible, highly adaptable substantially automated system and method of extracting, collecting, and/or quantifying relatively small items of interest to improve over highly manual techniques that require substantial technical training of workers. In particular, this aspect of the invention presents a basic framework or functional technique to not only foster relatively high throughput, highly controllable, highly adjustable extraction, but also collection and/or quantification, which allows the designer to apply these aspects to a variety of possible tasks. For example, one implementation is improved efficiency in extracting relatively small items of interest from a mixture. Alternatively, the system and method could be used for collection and quantification of relatively small items of interest. An intelligent, programmable controller can orchestrate different operations to effectuate the desired operations to achieve such results. Examples of controllable functions are translation between operational stations, multiple steps for extraction, acquisition of automated counting of the items of interest, and communication and storage of the quantification for subsequent use. Such uses can include, but are not limited to, decisions related to the quantification, research purposes, or other.

Another aspect of the invention comprises a comprehensive automated system and method of providing multiple samples to an input station, serially extracting items of interest from each sample, collecting the extracted items of interest from each sample, and quantifying the number of items of interest in each collection in a continuous or semi-continuous efficient manner. In one implementation, a conveying sub-system presents samples sequentially to an input station. A mechanized positioner guides a first sample through one or more extraction functions at an extraction station. Examples of the extraction functions can include, but are not limited to, separating the items of interest from at least other constituent materials in the sample by one or more filtering or sieving steps. Additionally, extraction functions can also include further operations on the extracted items. One example is grinding the items to separate constituent parts of the items of interest, such as to release eggs from cysts. Another example is use of fluids to assist in separation of objects of interest or cleaning the sub-systems. Quantification can include further operations on extracted items of interest to prepare for evaluation at a quantification station. Examples include but are not limited to moving extracted items to a rotational or centrifugation separation device to concentrate the items of interest in preparation of imaging. Quantification can then be done by digital imaging and using image recognition software to identify and count the items of interest automatically. The count can be communicated to an intelligent programmable processor where the count can be used, stored, or manipulated according to need or desire. Second and succeeding samples can be then processed serially in a similar manner.

Another aspect of the invention comprises different techniques of quantifying extracted objects of interest. In one example, image recognition of a digital image of a static sample from a scanned-based digital imager is used to identify and count objects of interest based on differentiating characteristics, such as size, shape and color. In another example, image reconstruction of digital video of a sample entrained in a flowing liquid from a lens-less digital video imager is used to identify and count objects of interest.

In a further aspect of the invention, a specific application can include an automated extraction of items of interest from a starting sample mixture by directing the mixture through at least two sieves. Each sieve may have pores of different sizes. This aspect involves filtering the sample mixture in a first sieve and collecting what passes the first sieve in a lower sieve, and then either collecting what is not passed by the second sieve or actuating further processing steps. The extraction can include automated ancillary functions such as vibration, rinsing, or tipping of one or multiple sieves, either sequentially or in parallel. In one embodiment, a robotic hand can be automatically controlled relative to the sieves, actuators can be automatically controlled for vibration of sieves or the entire extraction system, and valves automatically controlled for rinsing action of sieves or the entire extraction system. A programmable controller can coordinate timing and sequence of operations. The system can further include techniques to maintain identity of a sample and any items of extracted from it between input to and output from the system to maintain correlation of samples.

A further aspect of the invention applies the concepts above to a single soil sample for quantifying nematodes in any of its life stages, including eggs, worms, and cysts.

A further aspect of the invention applies the concepts above to a single feces sample for quantifying organisms in it.

A further aspect of the invention provides efficient parallel processing of many samples.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF EXEMPLARY EMBODIMENTS OF THE INVENTION

A. Overview

For a better understanding of the invention, several examples of forms or embodiments the invention can take will now be described in detail. These examples are neither inclusive nor exclusive of all forms and embodiments. As will be appreciated by those skilled in this technical area, variations and options are possible.

The examples will focus on soybean nematodes and their cysts and eggs as the items of interest to be extracted, collected, and/or quantified. As will be appreciated, the invention is not so limited. Application of the techniques of the invention can be applied in analogous ways to other items of interest.

The examples will be focused on a substantially comprehensive automated system for extraction, collection, and/or quantification of items of interest. As will be appreciated, aspects of the invention can be a subset or even one of those functions, depending on need or desire. For example, aspects of the invention can relate simply to extraction. Other aspects can be limited to collection or quantification.

B. Generalized Example

Figure 1A:
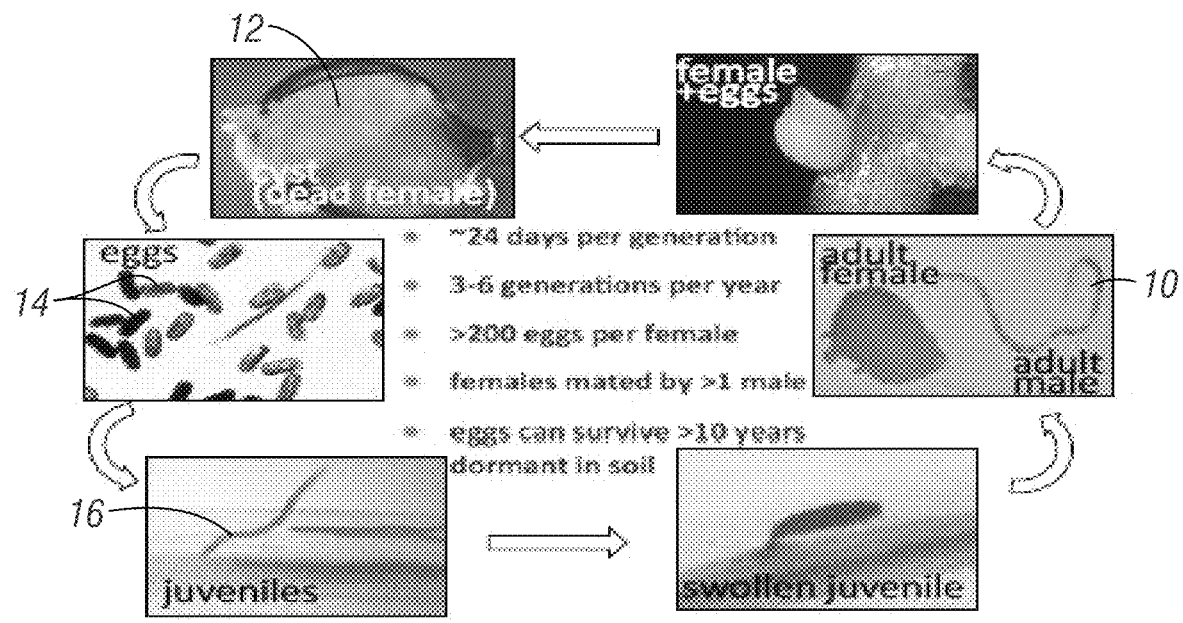
FIGS. 1A-B are diagrammatic views and illustrations of background information regarding SCN.
Figure 1B:
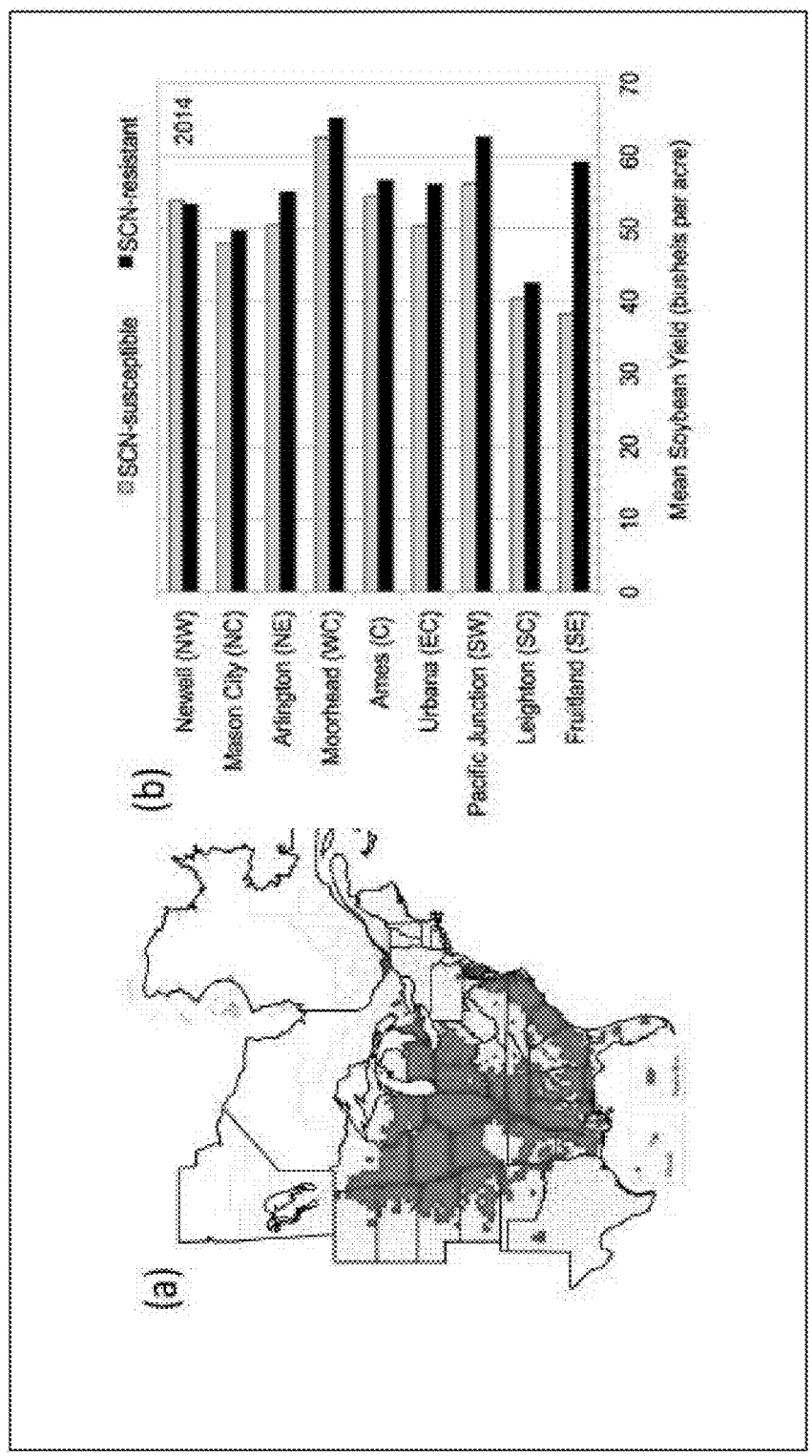
Figure 2A:
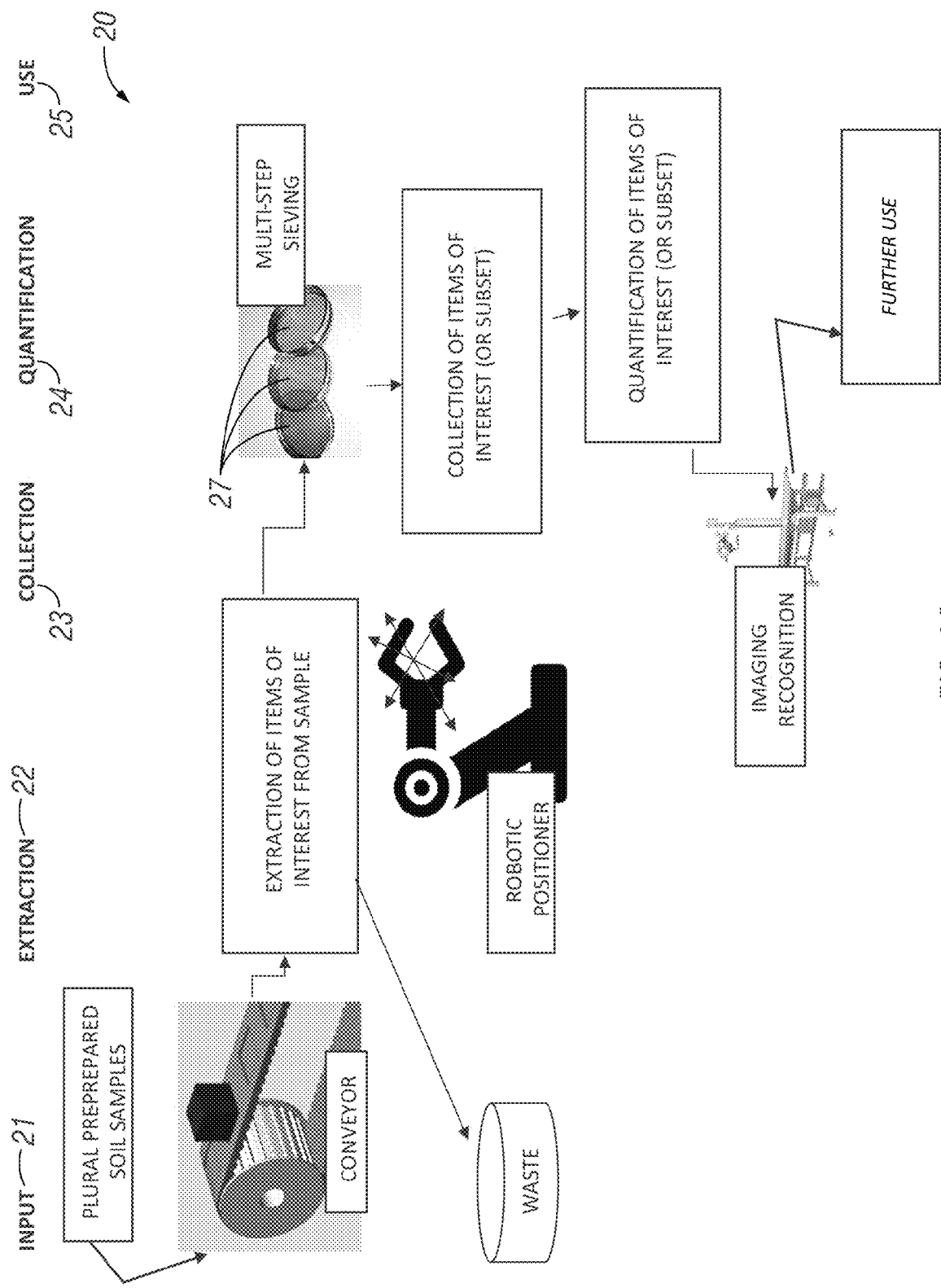
FIG. 2A is a high-level diagrammatic flowchart of a methodology using the system of FIG. 2B according to an exemplary embodiment of the invention.
Figure 2B:
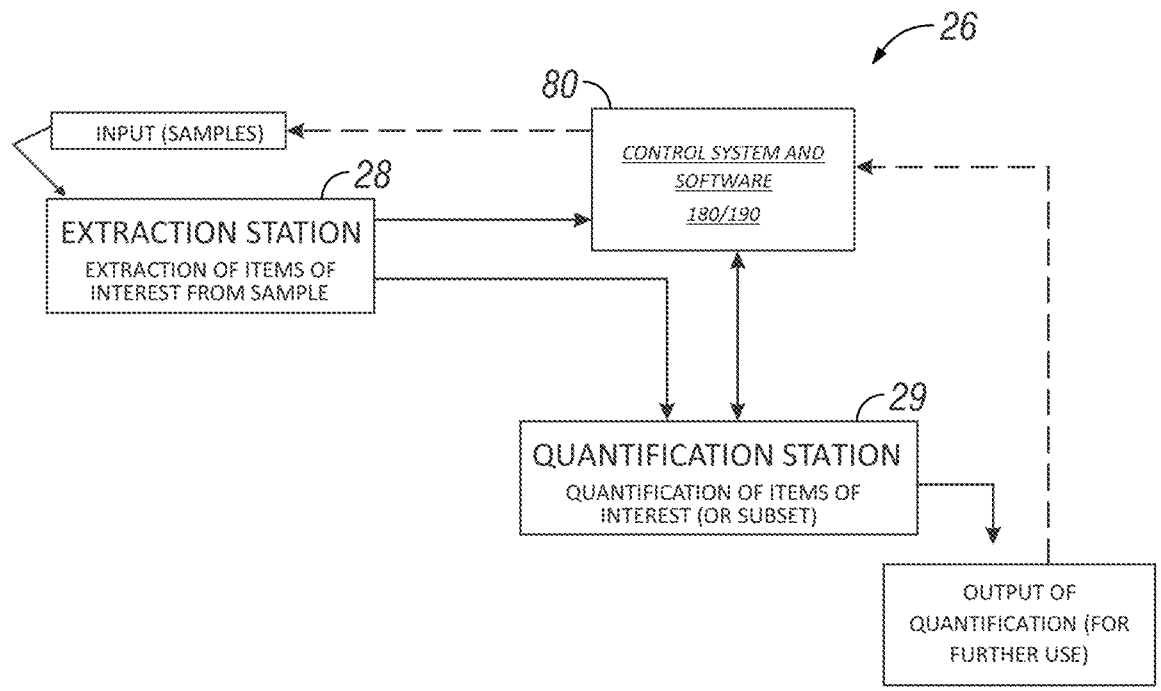
FIG. 2B is a high-level diagram of a system and its major components according to one exemplary embodiment of the invention.

A generalized example of a method (indicated generally at reference no. 20) and system (generally at 26) according to aspects of the invention is illustrated at FIGS. 2A and 2B.

FIGS. 2A and 2B show at its highest level, aspects of the invention can include on a functional level. One or more of efficient extraction and/or quantification of an unknown quantity of minute objects of interest can be accomplished, including from a relatively dirty starting raw sample. Automation or semi-automation can be applied to one or more of these. While specific embodiments are described in relation to soybean or other nematodes, the invention is not necessarily limited to those items of interest.

FIG. 2A shows the basic methodology. One or more raw samples are prepared (see step 21). In the example of nematodes, this can involve a soil sample obtained from a field. Thus, it is "dirty" in the sense that it contains the objects of interest to be quantified (e.g. SCNs or its cysts or eggs) but entrained in a substantial amount of objects or substances not of interest (e.g. dirt, other organisms, debris). It can be diluted or otherwise prepared for further processing. But in one aspect, it does not need to be purified in the sense of substantially separating the objects of interest from all else. In the case of feces, it can be obtained from a field, an animal confinement, or otherwise.

An identification designation can be given to the sample. In one example an identification number can be assigned. That number could be encoded in a bar code or other machine-readable form on a sample container. Techniques to do so are well-known to those skilled in this area of technology. Sample(s) can be presented for processing including by mechanized conveyance or otherwise.

1. Extraction

In this generalized embodiment, an extraction function involves at least two separation or filtering steps. In the case of nematodes, it can involve a first sieving with a sieve mesh size effective to pass nematodes in whatever stage (eggs, worms, cysts) through to a second sieve. As explained further later, the second sieve is selected based on what item of interest and/or what stage of development of items of interest is desired to be collected.

In the case of nematode eggs, the sieving may include a grinding step to rupture or force the eggs in cysts to be released through a second sieve to a third sieve. In the case of worms, the second sieve may have a mesh size to collect them and no third sieve is needed. In the case of cysts, it may be that only two sieves are needed.

One aspect of the generalized embodiment is that the paradigm provides the designer/user with high flexibility in selecting and adjusting the system to meet different requirements, with the advantages of automation at acceptable levels of precision and accuracy, and further on a cost-effective basis at least compared to conventional techniques. As in the above example, the extraction (step 22) is adjustable based on what needs to be filtered according to different goals. In the nematode implementation, this involves two or more sieves 27. In some applications it might be just one sieve. Automatic actions are controlled to cause the starting raw ("dirty") sample mixture through a first filtering step at least at one sieve and collection of what passes through on another. Further filtering through still smaller mesh-size sieves is possible. This processing can include controlled movement of the sieves both in position relative to other components of the system or relative to space generally (translation in XYZ directions to different position, or tilting, vibration, or other).

As shown in FIG. 2A, the items of interest can be collected after the extraction (step 23). Such collection can be a result of the extraction steps. For example, after sieving, items of interest can collect on top of a sieve. In some uses, the collected items of interest can simply be used for further research (e.g. biological research regarding nematodes).

Optionally, a variety of post-collection steps are possible. One example is to collect the contents of a sieve and then further process that collected intermediate product. For example, items of interest in the intermediate product could be quantified. Non-limiting examples include substantially automated quantification (see FIG. 2A, step 24). One places the intermediate product on a filter paper, plastic sheet, counting slide, or other substrate, and uses image recognition to count items of interest recognized on the substrate. Another moves the intermediate product past or through some type of sensor configured to differentiate and count items of interest. Non-limiting examples include microfluidic flow past a video imager with image reconstruction identification of items or interest in the video or use of flow cytometry techniques to singulate and count items of interest in a flow. Further options can include techniques to improve on the intermediate product. Non-limiting examples include purification steps to promote a greater percentage of items of interest relative to other particles in the intermediate product before counting. This can include, inter alia, shaking, centrifuging, rotating, heating, or otherwise manipulating (including by automated techniques) to further separate, isolate, concentrate, or distribute the extracted items of interest. There are also enhancements possible regarding any carrier fluids, surfactants or detergents combined with the items of interest, along with hydrophobic coating the inner walls of container and mechanical agitation to avoid clumping of the items of interest. Examples will be discussed herein.

As illustrated in FIGS. 2A and 2B, different stations and components can effectuate the method steps. An extraction station 28 can include robotic or automated motion control. An intelligent controller 80 (with software) can instruct system operation. Further intelligent devices (e.g. tablets or smart phones) can communicate with the main controller. A quantification 24 (FIG. 2A) by various possible components at a quantification station 29 (FIG. 2B) can produce a quantification count of items of interest in a highly flexible, efficient, and effective manner.

2. Quantification

As shown in FIGS. 2A and 2B, substantially automated quantification of the extracted items of interest in the intermediate product can take different forms. One example is transfer of items of interest from the extraction step or steps to then digitally image them. Image recognition or reconstruction software can be used to identify and count what are considered by the software to fit the profile or parameters of an item of interest. This could be by shape, size, color, or other parameters or combinations of parameters.

As will be further discussed, digital imaging can be implemented in different ways and techniques. One is by distributing an extracted sample across the surface of a substrate and acquiring a static digital image of that surface by a digital scanner. The image can be evaluated by image recognition pre-programmed to identify objects of interest and count them.

In one embodiment, the static image is acquired by a flat-bed digital scanner. This can include using built-in zooming capabilities of the scanner to zoom in on the surface for higher magnification to promote better image recognition. This could include scanning the surface at the zoomed setting to acquire individual areas or blocks of the surface, each which could be evaluated by the software. Alternatively, or in combination, the imager could have a digital zoom function that could be employed after a digital image of at least part of the surface (or all of it) is acquired. That digital zoom could magnify discrete portions of the image to promote better image recognition of objects of interest. The count would accumulate over the entire surface area to produce a quantification of total estimated nematode eggs in the sample from the static sample.

Another technique for imaging is a video, acquired by a lens-less digital sensor component, of the extracted sample in solution flowing past the sensor. With an appropriate illumination source and optical set-up, inexpensive, small form factor lens-free Talbot-effect interference patterns can be captured by the sensor. The interference patterns caused by non-transparent objects in the flow can be compared across several frames of captured video. The software would be pre-programmed to either identify diffraction patterns indicative of an object of interest and count them or reconstruct a truer optical image from the interference pattern and use more typical image recognition to count. The count would accumulate over the entire sample flow to produce a quantification of total estimated SCN eggs (or other objects-of-interest) from the sample.

FIG. 2B indicates that a final quantification of the items of interest can be then communicated automatically for further use (step 25). Examples include digital storage for later access. Another is transfer of information over a communications network (including wide-area networks like the Internet or local networks). In the example of nematodes, the quantification can be correlated with a beginning soil sample, the count converted into an estimate of population density of nematode eggs and cysts per unit volume soil for the field sampled, and the further action involve a recommendation for remedial action for that field to reduce the effect of that density of nematodes on crop growth and production.

The method can include additional automated steps. One is control over waste or non-relevant components of the sample (see FIG. 2A). Automated actions can be programmed to move such substances to a waste location. Additionally, automation can be controlled to present, sequentially and serially to the input, plural pre-prepared samples for processing. Such steps can allow high throughput by allowing automated processing of samples on a continuous, even around-the-clock basis, if desired. Alternatively, parallel processing of samples is possible applying aspects of extraction and/or quantification according to the exemplary embodiments. Examples of these techniques are available commercially from a variety of sources and are well-known to those skilled in this technical area.

FIG. 2B is a block diagram for a generalized system according to aspects of the invention. As indicated, the system can include the following stations:

Input station—for presenting one or more pre-prepared samples.

Extraction station 28—for automated separation of items of interest of each sample, and for collection in useful form of extracted items of interest.

Quantification station 29—for in some fashion quantifying the items of interest as a raw quantity or in correlation with other relevant information. One example is computation of an estimate of density of nematode eggs and cysts per unit volume of soil.

It is to be appreciated that the system of FIG. 2B does not necessarily require all stations to be automated. For example, there could be tasks which simply take advantage of automated extraction. One specific example is simply extracting nematode worms from a mixture for research purposes without quantifying their number in the sample.

As will be appreciated by those skilled in the art, automated or semi-automated tracking of a soil or feces sample, through the extraction station and then to the quantification station, can take a variety of forms. In some embodiments, simply by nature of known sequence and timing of actions through the stations, a soil or feces sample in can be correlated to the quantification measurement out. The system is simply reset for the next sample.

On the other hand, a variety of known commercially-available technologies could be used. For example, a bar code on a container with the first of soil or feces sample can be scanned and entered into the control system. Once the results of the extraction station are collected into a second container, a bar code or other identifier can be tracked or assigned to correlate it to the input soil or feces sample barcode. This can continue through the quantification station and be correlated to a numerical quantification value that would match an SCN infestation characterization to that original soil or feces sample. That can be communicated, stored, displayed, printed out, etc.

Still further, even more automated identification and tracking systems can be used. Those systems are quite advanced and available in a variety of testing or automated systems. For example, when testing a plurality of biological samples with multi-well titrator trays, such automated components such as pipettes and other material handling components can correlate an input sample to output data for that sample which can be utilized according to need or desire of the designer.

As indicated in the generalized example of FIGS. 2A-B, discrete parts of the overall system 26 or method 20 could be implemented in certain situations. For example, as indicated earlier, just the extraction station 28 and functions 22 could be used for extraction of items of interest from a complex starting sample, even if the quantification station 29 or functions 24 are not used. Similarly, different extraction systems or functions could benefit from just the quantification system or functions of the generalized example.

But, as can be appreciated, combining the extraction and quantification functions can result in benefits.

C. Specific Example 1

One exemplary embodiment according to at least some of the aspects of the present invention are set forth below. The description outlines both apparatus and methods but also some of the practical considerations with respect to extracting, collecting, and/or quantifying soybean nematodes in egg, cyst, or worm form in comparison to conventional techniques.

1. Overall Functions/Components of Specific Embodiment 1 (FIGS. 3A-B)

Figure 3A:
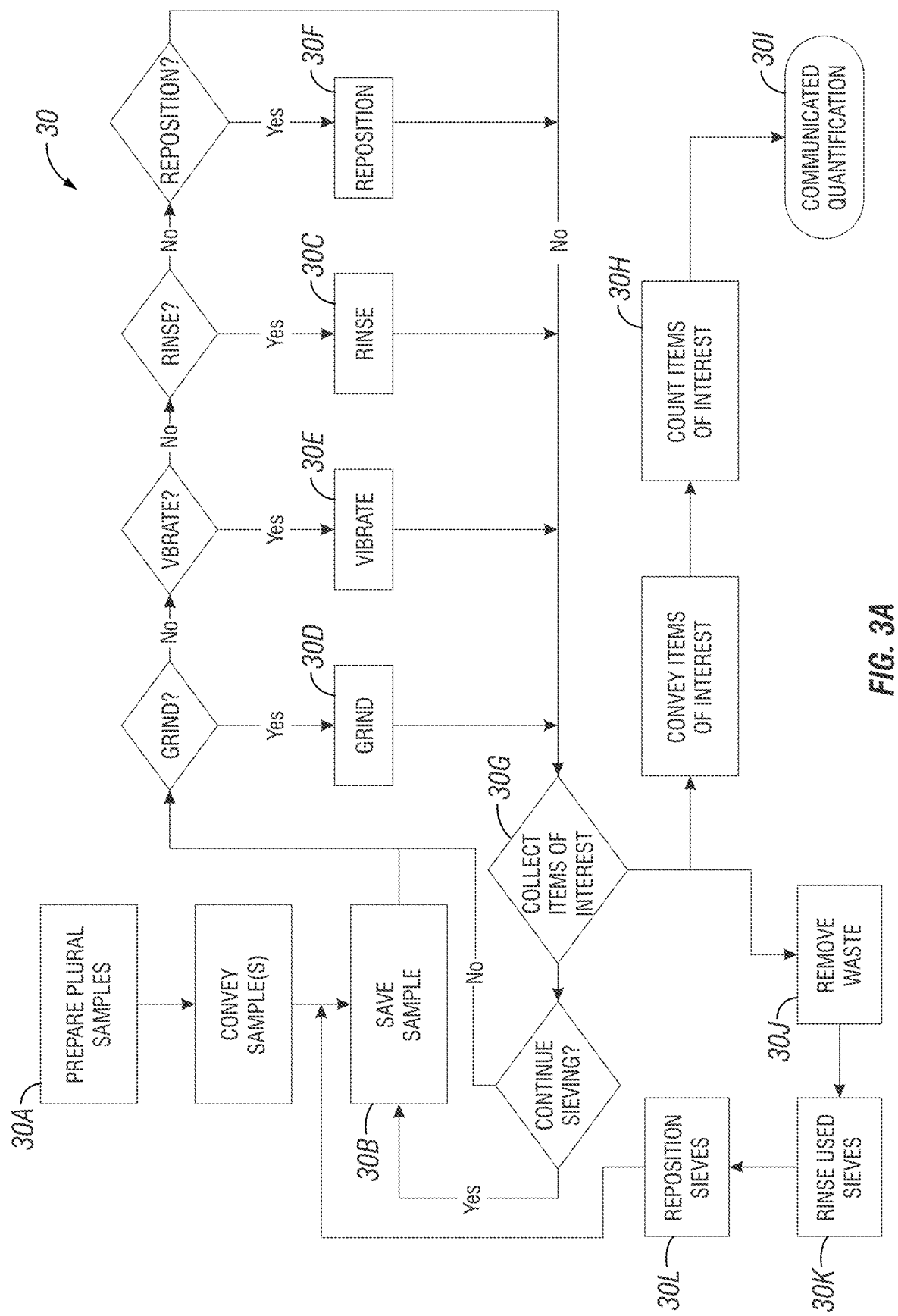
FIG. 3A is a flowchart of a method of operation according to a first specific embodiment of the present invention.
Figure 3B:
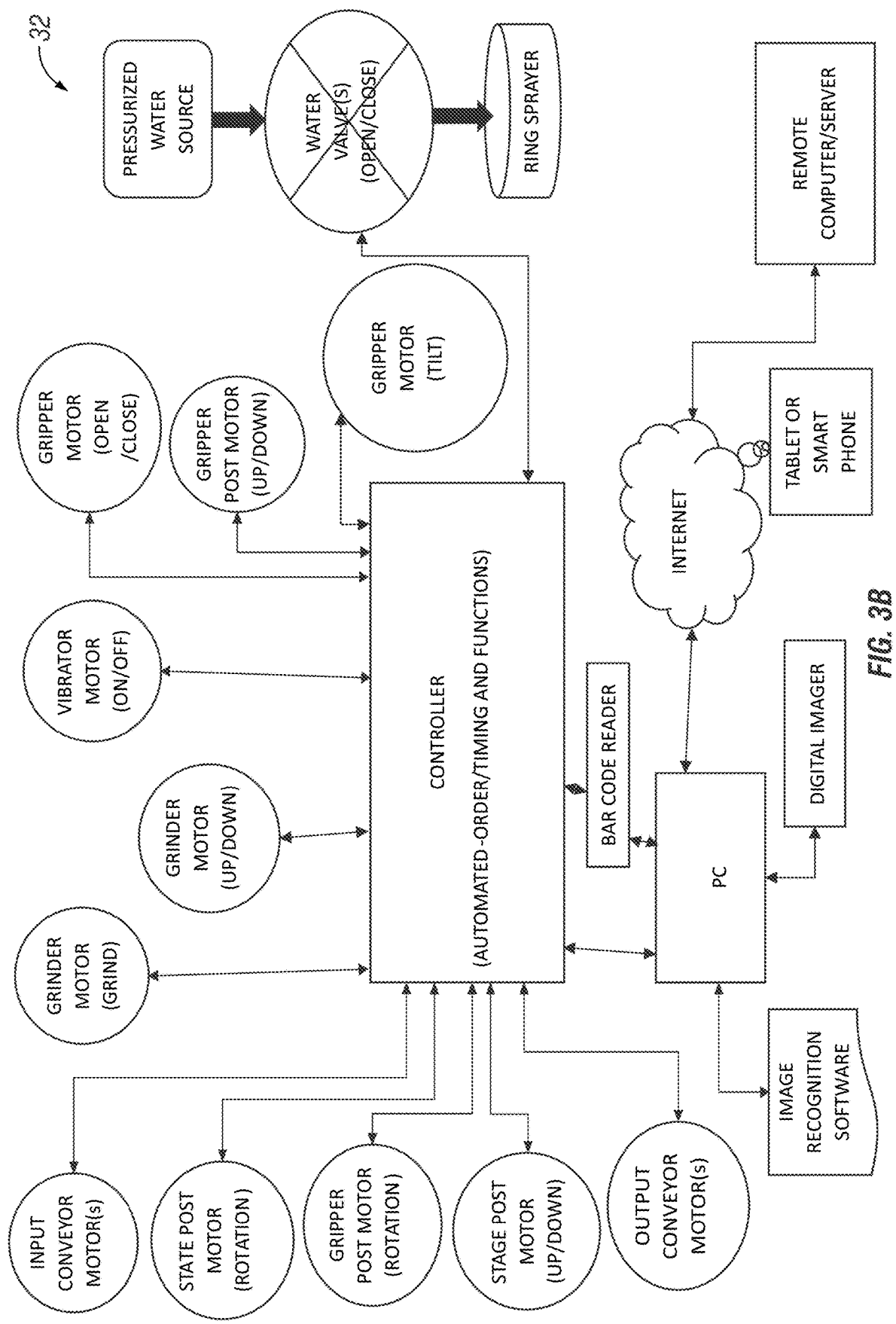
FIG. 3B is a diagrammatic view of an apparatus and system components to practice the methodology of FIG. 3A.

FIGS. 3A and 3B illustrate diagrammatically examples of some of the automation requirements of the system and method of FIGS. 2A and 2B, such as might be applied to nematodes in a specific implementation of the generalized invention discussed above. For example, one or more programmable controllers would be needed to control different actuators to accomplish needed movement, timing, and other functions. The designer would have to coordinate them as needed or desired.

FIGS. 3A and B are overall schematics of one example of methodology (FIG. 3A) and system (FIG. 3B) that can be used with this specific embodiment. They show diagrammatically one example of the overall control and actuation system for automated operation of this embodiment. As will be appreciated, the specific components and their set-up and interconnection can be adjusted by the system designer according to needed functions.

In this example, the system controls not only a robotic gripper arm that has multiple degrees freedom of movement, but also a water rinsing sub-system and a rotatable turntable with multiple levels. There is also an available grinder that can be translated towards a sieve screen (or sieve screen translated to the grinder) and rotated for grinding action near the sieve screen.

A computer is shown connected to the controller and includes imager control as well as image recognition processing, digital storage, or communication to other devices, including remote computers or devices.

As will be appreciated by those skilled in the art, appended FIGS. 3A and 3B schematically depict non-limiting examples of the overall control system(s) and method steps that are possible with this embodiment. As shown in FIG. 3A, some type of programmable controller 180 (e.g. Arduino UNO Controller board for NEMA 17 stepper motor) can be programmed to control timing and actuation of a variety of components. In this example, there could be timing of operation of conveyors, both input and output. There is timing and sequencing of turntable(s) and gripper, as well as several degrees freedom of movement of the gripper to allow movement of sieves in three dimensions. The system can control spraying by controlling fluid valve(s), as well as vibration by a motor or actuator if used.

Still further, the control system could sense and read identification information about samples. Such techniques are well-known. It can utilize an intelligent device and wired or wireless communications (e.g. PC, laptop, tablet, smart phone, or other) or use the controller to control and process digital imaging and image recognition at the imaging station. Finally, optionally, the quantification calculated from image recognition counting can be stored or communicated for further use.

FIG. 3A shows in flow chart form, one non-limiting method according to invention which makes the system very flexible in its application. For example, some processes require one sieving step and then collection. But others require a second or third sieving step (with different sieves). There could be repeats or more sieving steps. Also, grinding is not needed in all applications. For example, grinding is needed only when an egg count is desired where the cysts are ruptured to release the eggs. Vibration and rinsing of an individual sieve or multiple sieves is optional and is needed to enhance the extraction process and clean the sieves when desired. This illustrates that the system could be programmed and configured easily for different sequences, number, and types of processing steps according to desire or need.

FIG. 3B shows diagrammatically one non-limiting hardware combination to effectuate at least the method 30A-L of FIG. 3A. Variations are, of course, possible.

FIGS. 4A-D show, from different perspectives, one example of an assembled embodiment 40 for an extraction station according to relevant components 32 in FIG. 3B. Then, FIGS. 5A-E, 6A-B, 7A-B, and 8A-B illustrate with more detail the gripper, washer, turntable, grinder, and control sections of station 40.

Further illustrations of how the Specific Embodiment 1 can be operated, including in an automatic mode, are shown at FIGS. 9A-G.

a) Method of FIG. 3A Applied to Extraction of SCN Eggs from a Soil Sample

FIG. 3A is a highly schematic depiction of examples of automatically controlled functions for extraction and collection steps according to one way that Specific Embodiment 1 can be configured and operated. As will be discussed in detail later, this automated control can be applied to motion-controlled handling of standard-sized sieves. One example is as follows.

A sample is introduced (step 30A) to a first #20 sieve (e.g., ~800 μm openings). The #20 sieve is selected to pass cysts and some of the dirt by gravity and, optionally, water rinsing (step 30C) and/or vibration (step 30E) from a soil sample onto a #60 sieve (~300 μm openings) beneath but block larger particles and debris. This is a first purification or extraction step (step 30B) for soybean cyst nematodes.

After a pre-selected time, the gripper automatically moves and grabs the #60 sieve, and automatically moves it into a position (step 30F) where a grinder can automatically be converged towards the top of the small #60 sieve to gently grind (step 30D) the cysts. This action releases and pushes eggs from the cysts through the small #60 sieve to drop by gravity (and optionally with vibration and/or water assistance) onto the top of a #200 sieve (~100 μm openings) below it. The #200 is sized to block larger debris than the eggs but allow the chance for smaller items (and any water) to pass through (step 30G). This essentially is trying to purify the sample at this point down to just eggs and debris of similar or smaller size. At that point the gripper can manipulate the #200 sieve and pour its contents to a collection funnel or conduit for quantification, or further filter onto an even smaller sieve (e.g. #500), approx.~20 μm openings, and the eggs (which are on the order of less than 100 μm dia.).

As will be appreciated, this schematic shows the flexibility of the embodiment. It can be varied as to what size sieves and mesh pores are desired, how many sieving steps, when and how to collect, and whether to add ancillary steps such as grinding. Rinsing and vibration are examples of others. An example of sieves is U.S.A. Standard ASTM Sieves Series (e.g. 6" dia.) available from Humboldt Mfg. Co., Elgin, Ill., USA.

Counting/quantification (step 30H) and storage/communication (step 30I) of the count can occur, if desired.

Waste removal (step 30J), rinsing of all used sieves (step 30K) and repositioning of sieves (step 30L) can reset the system for a next sample.

b) Apparatus of FIG. 3B Applied to Extraction of SCN Eggs from a Soil Sample FIG. 3B is a block diagram depiction of one configuration of automated control for the processing of FIG. 3A. It illustrates how a programmable control board, by appropriate programming, can control motors which perform the different automatic steps described above. It will be appreciated that different configurations are possible according to need or desire.

As will be appreciated by details regarding each of the component parts of extraction instrument 40 later in this description, the fundamental aspect of instrument 40 is the ability to automate sieving action on a raw sample to extract extremely small items of interest for further use. Extraction instrument 40 does this with a combination of carefully designed components, each having functionalities to promote the process. Motion control is through an effective yet flexible manner.

2. Extraction Station 100 Assembled (FIGS. 4A-D)

The nematode egg extraction instrument 40 can be broken down into a number of subsystems including linear motor sub-systems, gripper arm, washing tool, a set of rotational stage platforms, and grinder tool. FIGS. 4A-D shows the locations of these individual subsystems and how they fit into the overall instrument 40. The linear motor subsystems control both the vertical motion of the combined gripper/washing tools and their planar rotation, allowing for sieves to be moved vertically to new positions and the washing tool to access and operate at any of those position. The gripper arm assists in this process by grabbing a cylindrical object, as in any of the sieves, in its fingers and holding it while the linear systems carries out the transfer between turntable stages. Each turntable stage can contain four sieve retainer positions (could be more or less) allowing for up to four different sieves or the same or different types to be housed on each level of the instrument's stage subsystem. These stages can then rotate to the gripper or washing tool vertical axis independent of each other increasing the versatility of the instrument as a whole.

Figure 4A:
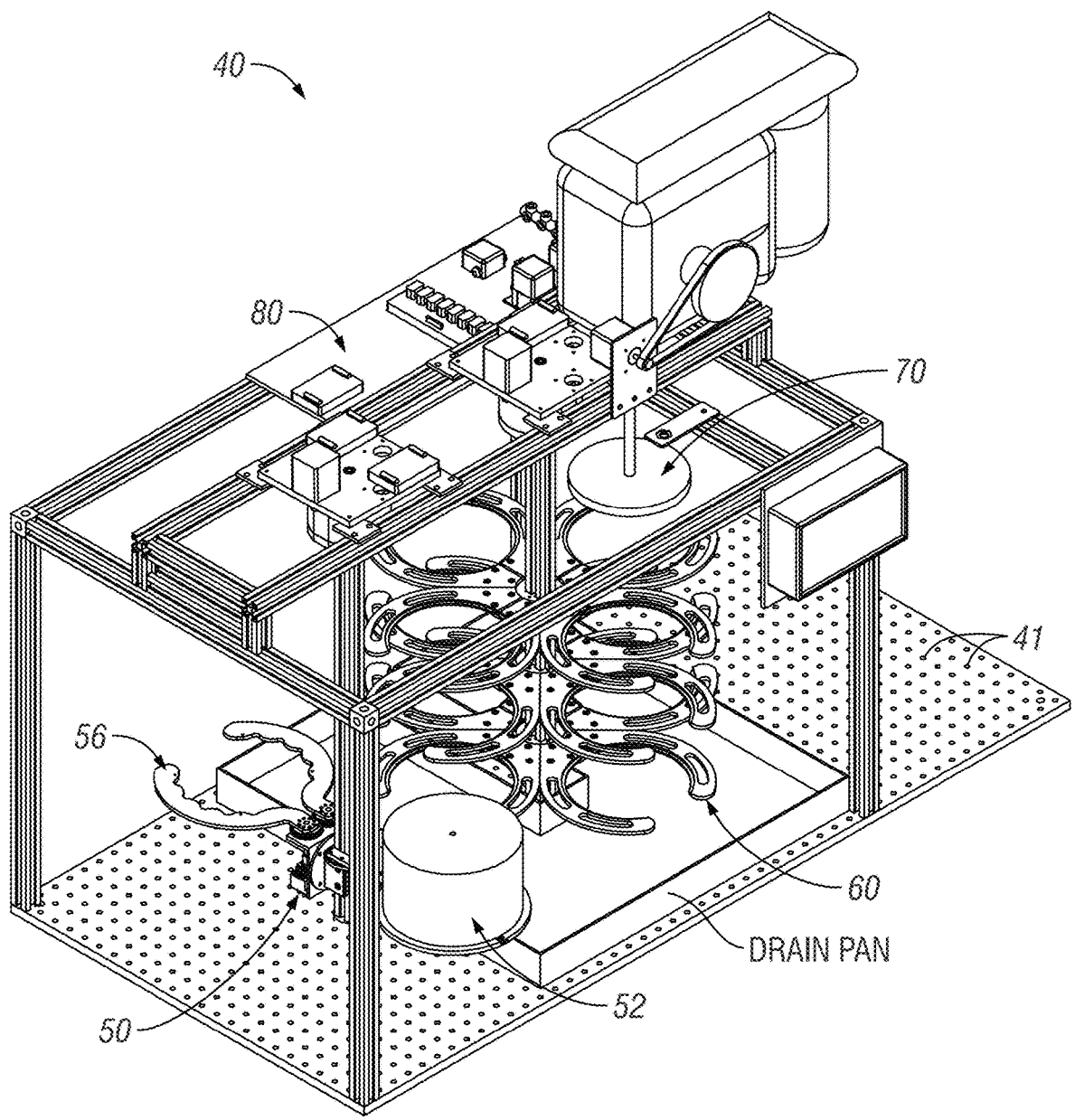
FIG. 4A is a perspective assembled view of an extraction station of FIG. 2A in one specific implementation and embodiment.

FIG. 4A illustrates a specific, non-limiting embodiment 40 of the extraction station 28 of FIG. 2B. Its major subsystems are as follows.

A framework 41, including a base or floor, has a length, width, and height that can be reasonably portable and robust. In one example it is table-top scale. This would allow the entire integrated extraction station 40 to be mobile such as on a pickup truck or the like. It could be taken directly to the field from which soil samples are obtained. Of course, can be scaled up or down depending a need or desire.

The materials used for frame 41 can vary. One example for beams is Aluminum Extrusion 10 Series, Part #: 1010-S from 80/20 Inc. of Columbia City, Ind. (USA). See https://8020.net/shop/1010-s.html (incorporated by reference herein). Beams are connected by 10 Series 3 Way-Squared Corner Connectors, Part #: 4042 from 80/20 Inc. See https://8020.net/4042.html (incorporated by reference herein).

Figure 4B:
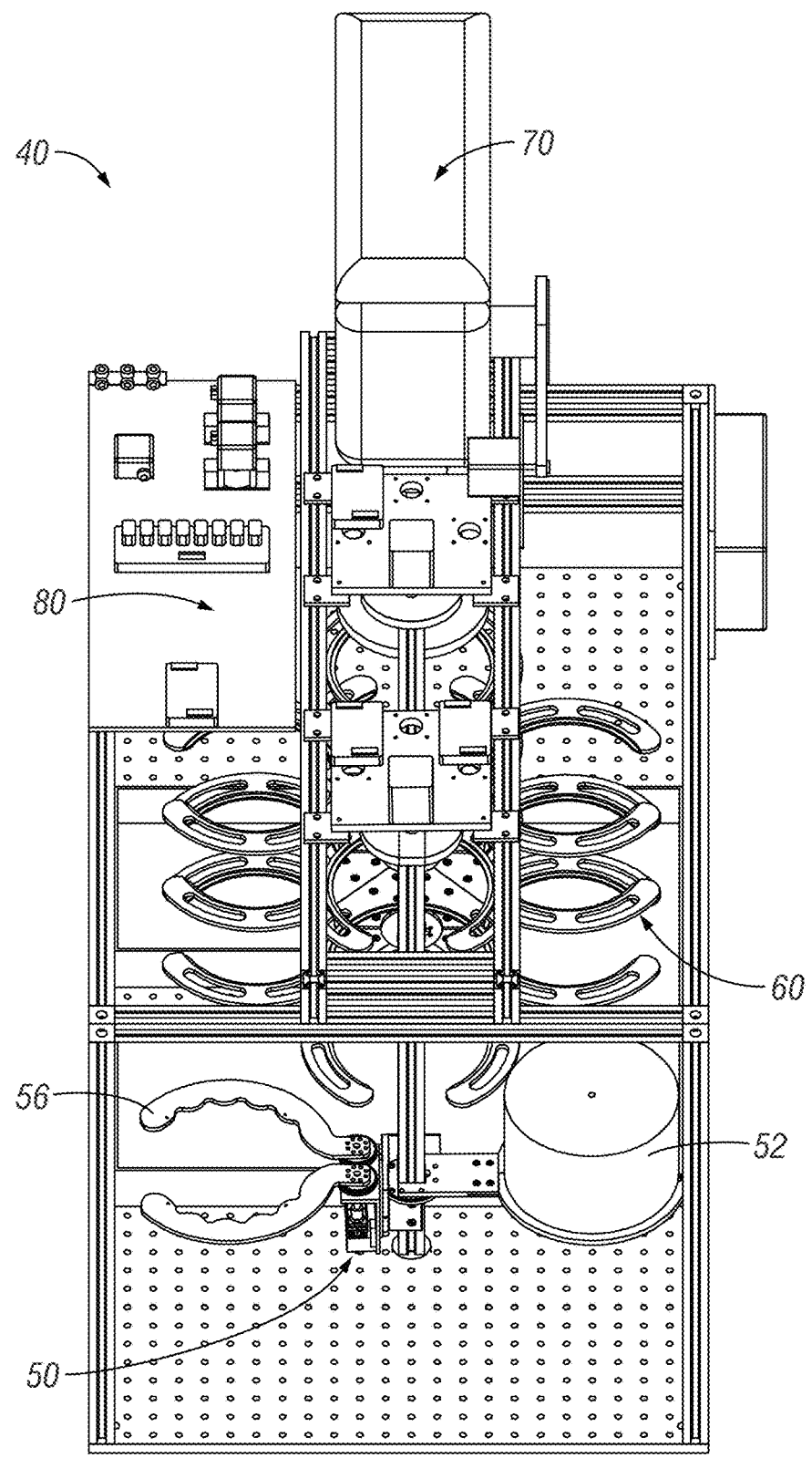
FIGS. 4B, 4C, and 4D are front, side, and in views of FIG. 4A.
Figure 4C:
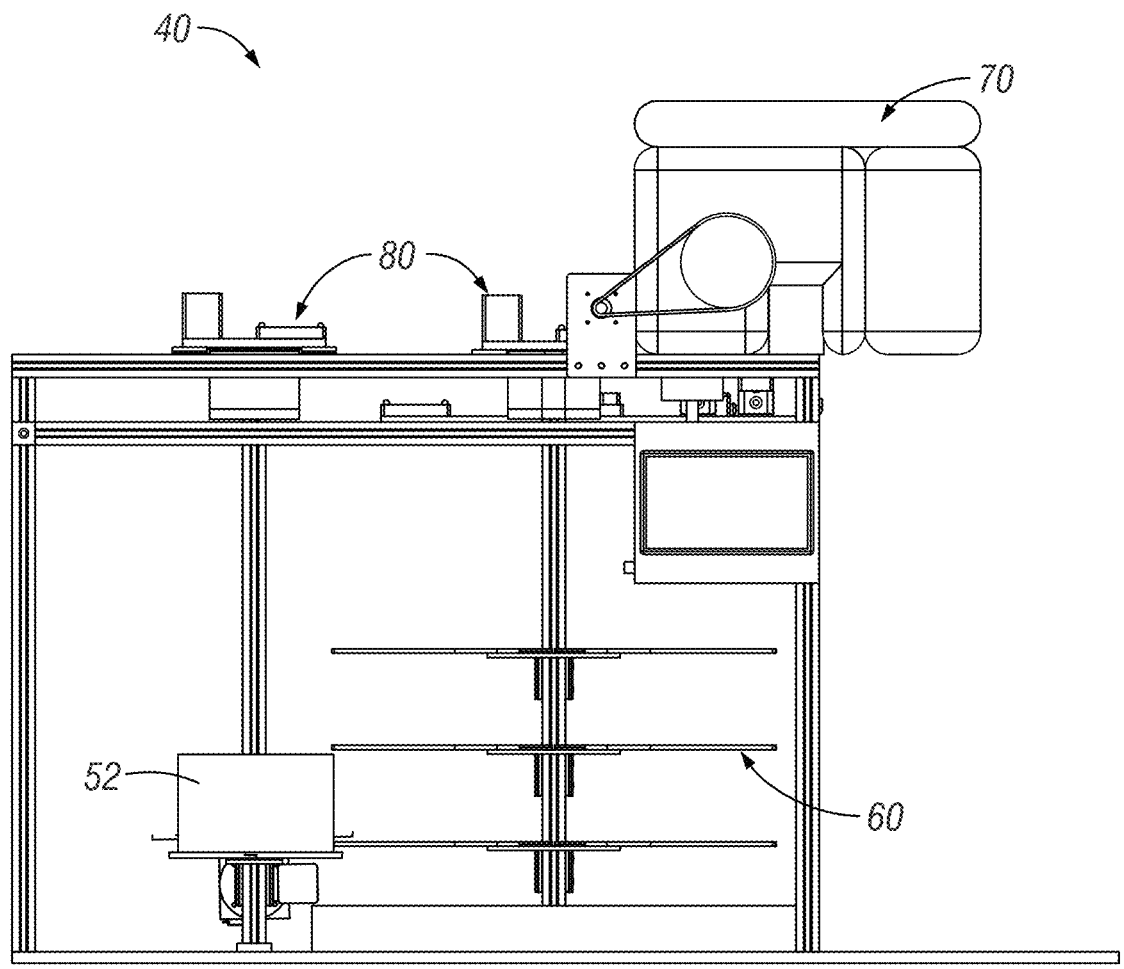
Figure 4D:
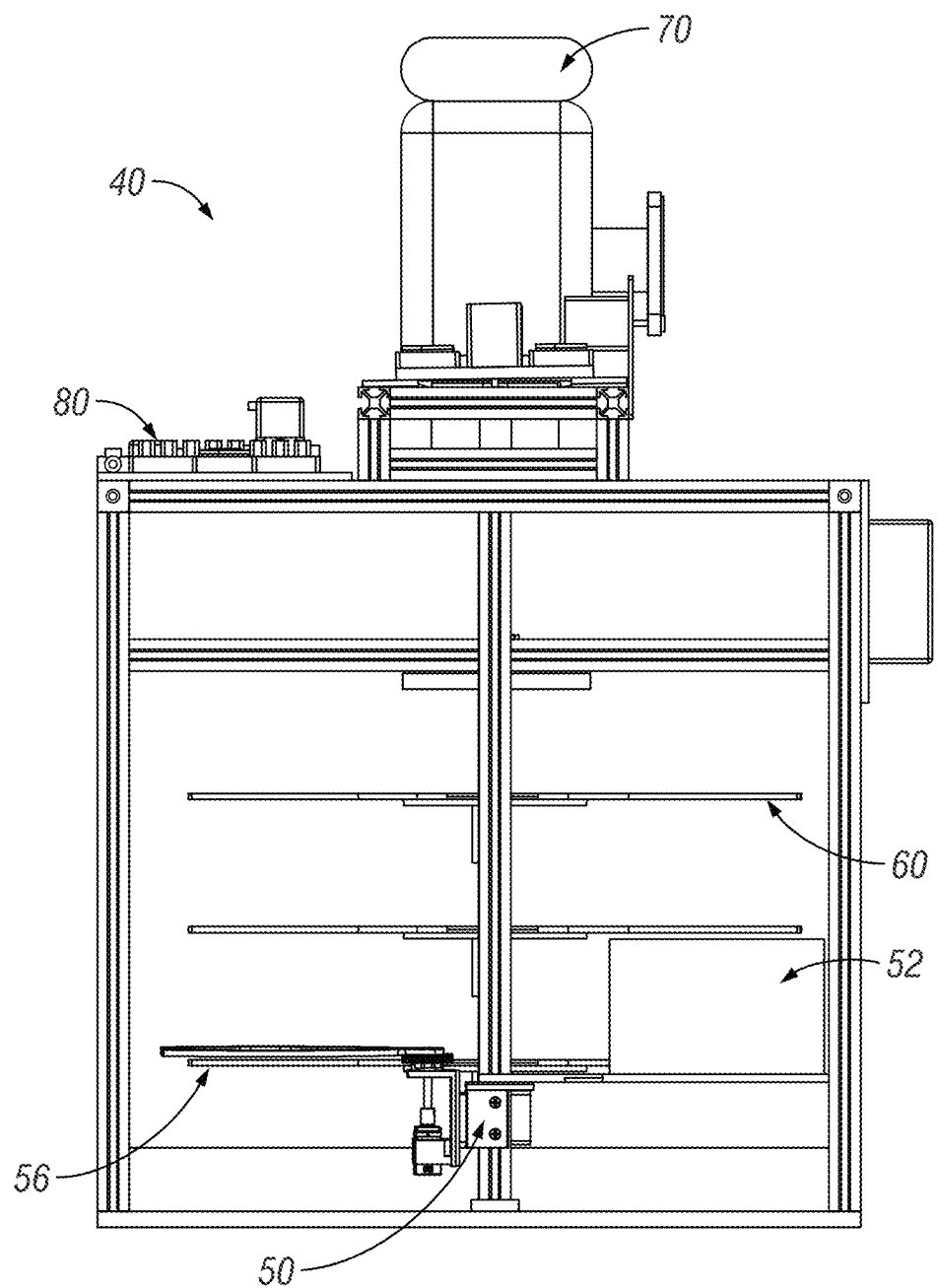

FIGS. 4B-D show various view angles of extraction station 40 of FIG. 4A. As will be appreciated by those skilled in the art, extraction station 40, in an integrated fashion, provides not only high flexibility but specific functionalities to enhance speed, accuracy, repeatability, and precision of extracting SCN eggs from a raw soil sample. As will be further appreciated, variations obvious to those skilled in the art will be included within this example. The arrangement, specific tools, specific operation parameters can be set up as desired or needed by the designer.

Details about each sub system or tool in extraction station 40 follow.

3. Vertical and Rotational Control Features of Gripper and Washing Tools (FIGS. 5A-B)

a. Function

Figure 5A:
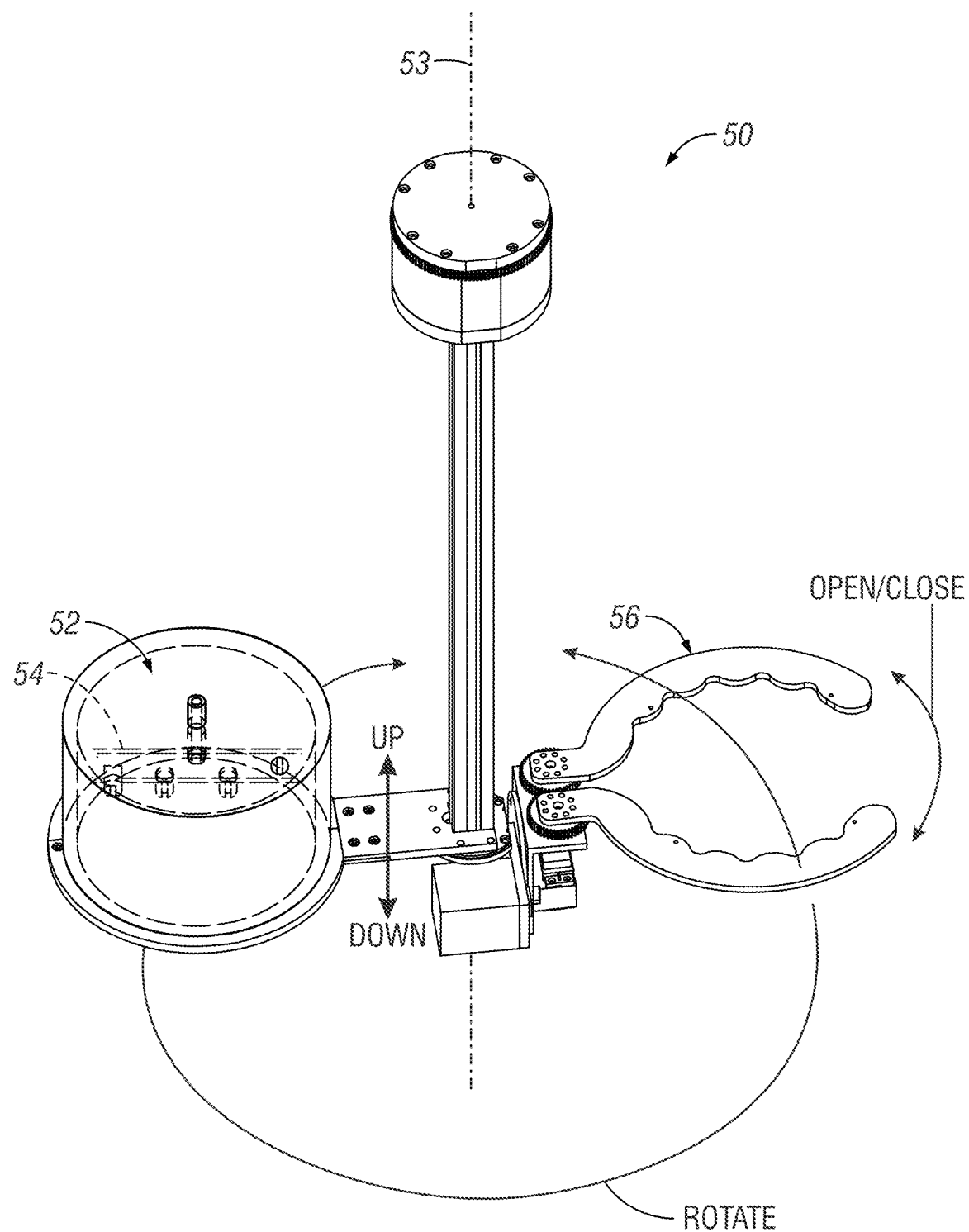
FIG. 5A is an isolated, enlarged perspective of a robotic, multiple-degree freedom of movement subassembly of FIG. 4A, namely a combined robotic gripper tool and washing tool according to the system of FIG. 4A.
Figure 5B:
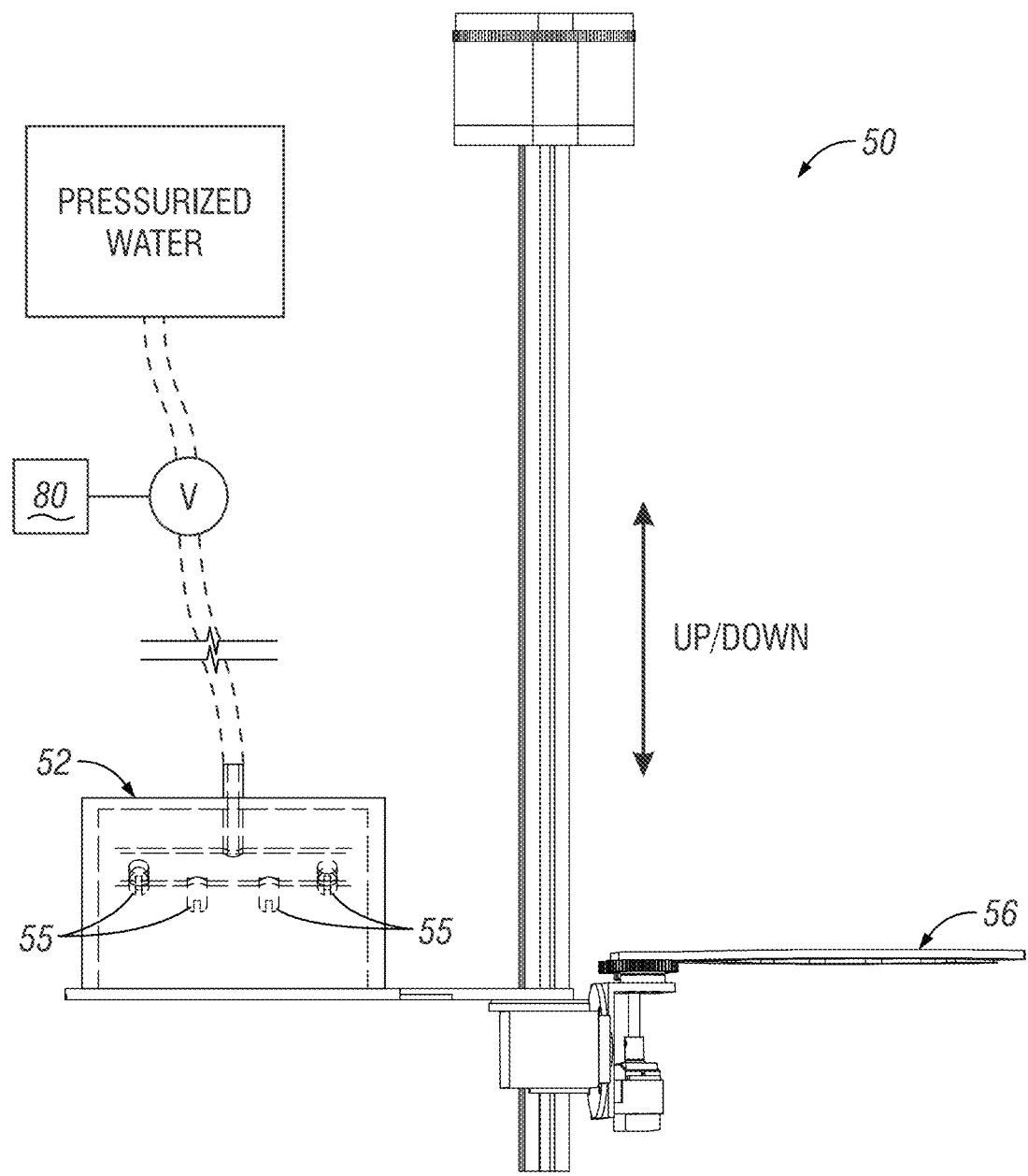
FIG. 5B is a front elevation of FIG. 5A.
Figure 5C:
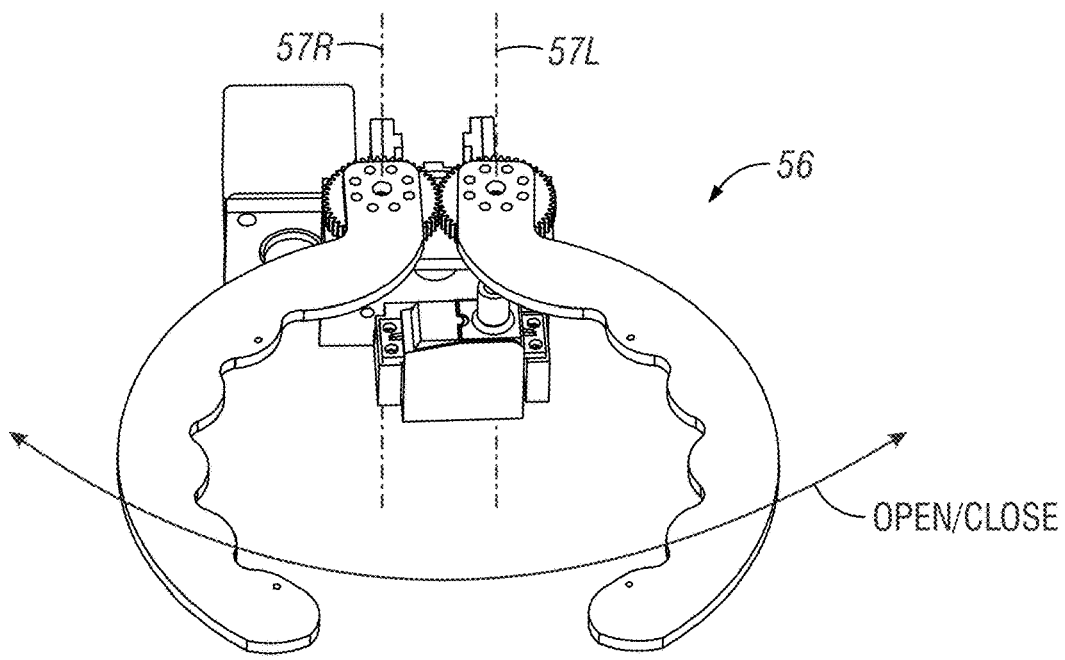
FIGS. 5C and D are perspective isolated views of the gripper tool of FIGS. 5A and B from two perspectives.
Figure 5D:
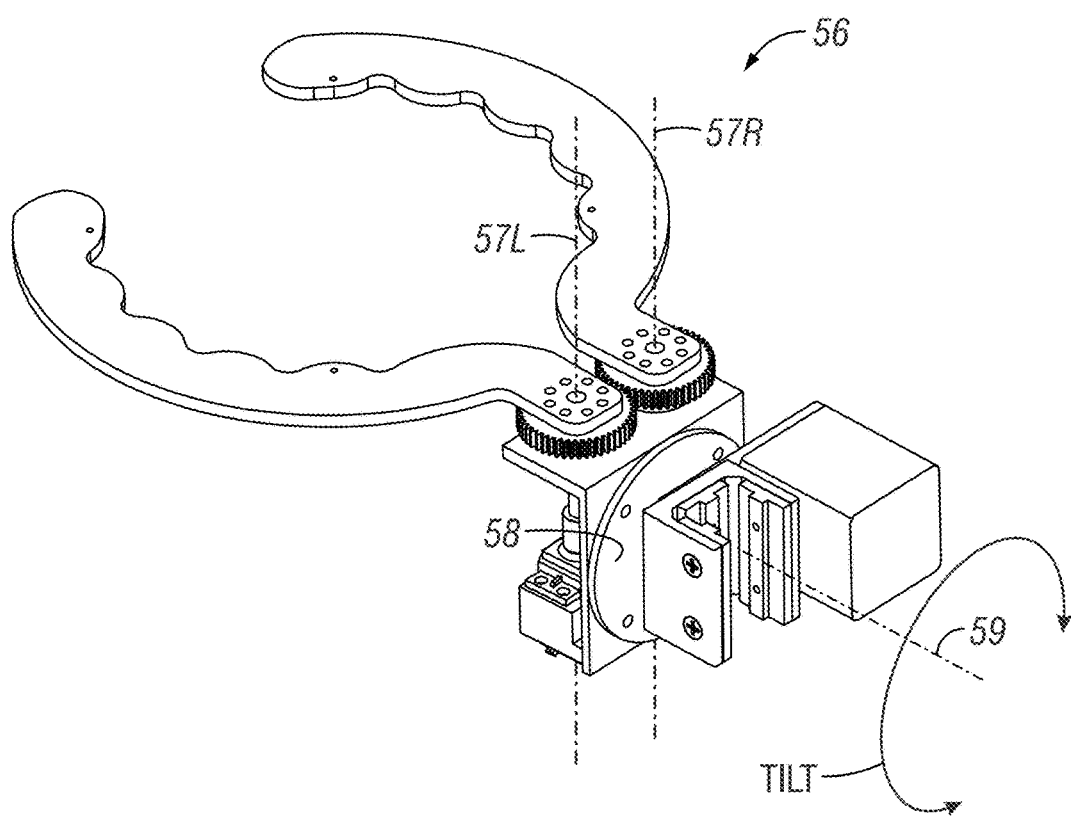

The fundamental functionalities of combined gripper and washing tools 50 of FIGS. 5A and B are in multiple degree freedom of movement by motion control to move sieves and to wash sieves.

Using motion control, combined tool 50 is positioned in frame 41 at the periphery of multilevel rotatable turn table 60. It can interact with any level and position turn table 60, as well as grab a sieve or sieve-sized container with a raw sample at input and retrieve a sieve and unload it to an output container or location.

b. Apparatus

One non-limiting example of combined tool 50 is shown at FIGS. 5A-H. Variations are possible.

Vertical motion control is accomplished by mounting the combined tool 50 on a linear bearing that moves with the screw nut of a lead screw or ball screw in a vertical post along axis 53.

Non-limiting examples of principal components to allow vertical motion control are as follows:

Vertical Linear Motion Control of Both Gripper/Washer Tool Combination and Turntable.
  Lead Screw. Part #:634052 from Servocity. Thread Size: 8 mm. Length: 24". See URL: https://www.servocity.com/lead-screws#371=326
  Linear Bearing. Part #6415 from 80/20 Inc. See https://8020.net/shop/6415.html (incorporated byer reference herein).
  Set Screw Shaft, Part #: 625224 from Servocity. Bore: 5 mm to 5 mm. See https://www.servocity.com/set-screw-shaft-couplers.
  NEMA 17 Stepping Motor. Step angle: 1.8°.

As can be seen at FIGS. 4A-D, this allows access either of the tools to any level of the turn table.

c. Features

Rotation of the combined tools 50 about axis 53 is accomplished with a rotary geared bearing with onboard motor mounted on the linear bearing that supports both the tools 52 and 56 of combined tool 50. An example is Vex turntable bearing kit. See https//www.vexrobotics.com/276-1810.html. This allows either the gripper or washing tool to address the turntable at any level or other locations on frame 41.

Therefore, as can be seen in FIGS. 5A and B, there is both up/down motion control of the combined tool 50 as well as rotational motion control.

Motion control motors can be operatively connected to control circuit 80 and, via software, respond to a preprogrammed sequence of motion instructions for desired rotation and vertical movement. These motions can be controlled to approximately an acceptable degree of precision for these functions in a repeatable manner.

4. Washing Tool Features FIGS. 5A-D a. Functions

The primary function of washing tool 52 is to present water to any sieve at any accessible location of tool 50. This allows not only assistance in sieving action by moving water through material on a sieve but can also help wash off sieve sidewalls during sieving so that items of interest are not left behind. Furthermore, it can be utilized to clean out used sieves in preparation for processing of the next sample.

b. Apparatus

As shown in FIGS. 5A and B, washing tool 52, in this embodiment, includes basically a hood enclosing a spray arm 54. As diagrammatically illustrated in FIG. 5A, spray arm 54 would be in fluid communication with a source of pressurized water. On/off and flow rates can be controlled through control circuit 80. Tubing would be long enough to allow for up/down and rotation of tool 52.

c. Features

The washing tool can have a diameter that fits over any of the sieves' upper lip to retain spray when installed over a sieve.

Nozzles 55 (FIG. 5B) on a spray arm can be designed to direct a spray pattern that, by reaction forces on the interior of the hood, causes arm 54 to spin on its own. This can also distribute the spray in an effective pattern to continuously clean the sieve sides. Spray arm 54 freely rotates in response to that action. The designer has flexibility such as building into washing tool 52 custom spray patterns for achieving needed functions, use of water pressure to power rotation of the spray arm, and optimized spray pattern for both rotation and spray coverage for best results.

Controller/software 80 can operate appropriate valving from a pressurized water source to spin spray arm 54. This can enhance a washing action relative to a raw soil sample to promote passage of cysts and eggs through a first sieve of #20 mesh size. The washing action of the rotating arm 54 can continually try to influence that action, as well as wash off the sides of both the sieve and the hood, to attempt to move all cysts and eggs in the raw sample to and through the first sieve, to improve the accuracy of the ultimate quantification. In other words, the design of washing tool 52 not only helps separate, in a first stage, the materials that are or include the SCN eggs from larger particles, but also ensure that the whole raw sample is processed at this sieve to recover as many of the eggs as possible (e.g. not leave a significant number stuck to the side of the sieve or hood, or on the sieve screen). Without the same, some can be retained along the sieve walls or not pass through the sieves.

As can be further appreciated, washing tool 52 can be used in other ways. For example, it can provide washing action to other sieves to further influence sieving action and promote full collection of articles of interest.

But furthermore, because station 40 can be used to efficiently process, in a serial manner, multiple different samples, washing tool 52 can also be used to clean or wash out sieves after they are used and prepare them for a next sample. For example, after a first soil sample is processed with a set of sieves, each could be serially moved by gripper arm 56 to a position on turntable 50 accessible by washing tool 52, and then proceed to wash each (including by tipping if needed), to help reset that set of sieves by removing artifacts from the last sample which could contaminate the next sample, before using the same sieves for the next sample.

5. Gripper Tool Features FIGS. 5C-D a. Function

The fundamental use of gripper tool 56 is movement of sieves to, within, and from station 40. Importantly, with particular reference to FIGS. 5C and D, an additional freedom of movement with motion control is built-in to tool 56.

It can be rotated around a horizontal axis 59 for essentially a tilt function.

Thus, it also has open/close motion control of its jaws around jaw axes 57 R and L. This allows gripping but also other such things as oscillation during sieving or washing, dumping or pouring, or otherwise.

b. Apparatus

The jaws of tool 56 are supported on meshed gears, each of which rotates around an axis 57 R or L. A motor driven shaft connected to one of the gears allows motion control of one gear. Because they are meshed, they work together, and oppositely, for the open/close movement.

Tool 56 is carried on a base mounted on gear 58 that rotates around axis 59 relative to the linear bearing that moves up and down the vertical post of the combined tool 50. By motor and drive gear attached to that linear bearing (see FIGS. 5C and D), the larger gear 58 responds to rotate the whole gripper tool 56 around axis 59 for the tilt function. It can include 360° rotation in either direction.

c. Features

Inside profiles of the gripper jaws are specifically designed with a wavy profile to help center a sieve that is grasped by the gripper. Minor variations in sieve diameters are possible. Most sieves have a top edge lip that would allow the gripper arms to open and that close around the diameter of the sieve body, while the larger diameter top lip is a mechanical stop against the sieve falling through those closed arms when sufficiently closed.

The gripper jaws can open sufficiently to laterally pass by the greatest diameter of the sieve and then close to gently surround a sieve yet retain it for vertical movement or tipping purposes. The jaws are then reopened to slide pass the greatest diameter of the sieve and release it in a given position.

Non-limiting examples of components that can be used to implement the foregoing for gripper 56 are as follows:

- 1.00" Bore 32 Pitch Aluminum Hub Gears. Part #: 615234 from Servocity. Diameter: 3.125". Number of Teeth: 100. See https://www.servocity.com/32p-1-00-bore-aluminum-hub-gears (incorporated by reference herein)
- Motor. S3305 Servo from Servocity. Specifications: Dimensions: 1.6"×0.8"×1.5" (41×20×38 mm). Product Weight: 1.64 oz. (46.5 g). Output Shaft Style: 25 Tooth (3F) Spline. Voltage Range: 4.8V-6.0V. Stall Torque (4.8V): 99 oz/in. (7.1kg.cm). Stall Torque (6.0V): 124 oz/in. (8.9 kg·cm). Pulse Amplitude: 3-5V. Motor Type: 3 Pole Ferrite. Potentiometer Drive: Indirect Drive Output Shaft Support: Dual Ball Bearings. See: https://www.servocity.com/s3305-servo (incorporated by reference herein).
- ¼" Stainless Steel Precision Shaft. Part #: 634160 from Servocity. Length: 2". See: https://www.servocity.com/0-250-1-4-stainless-steel-precision-shafting#371=246
- 5 mm Bore 32 Pitch, 16T Shaft Mount Pinion Gear. Part #: 615342 from Servocity. Number of Teeth: 16. See https://www.servocity.com/5 mm-bore-32p-16t-shaft-mount-pinion-gears.
- Swivel Hub. https://www.servocity.com/swivel-hub.
- 0.770" Pattern Set Screw Hubs. Bore: ¼". https://www.servocity.com/770-set-screw-hubs
- ½" Bore 32 Pitch Aluminum Hub Gear. Part #: 615190 from Servocity. Diameter: 1.5". Number of Teeth: 48. https://www.servocity.com/32-pitch-50-bore-aluminum-hub-gears.

As will be appreciated, the open/close and tilt functions can be accomplished in other ways.

6. Turntable Stages Features FIGS. 6A-B a. Function

The primary function of turntable 60 is to provide vertical co-location of sets of sieves of increasingly smaller screen size. To do so, turntable 60 is designed to rotate plural levels 62 T, M, and B (FIG. 6B) around a vertical axis 63. As will be discussed below, programmed sequenced operation, by motion control, allows manipulation of a set of sieves 27 for this purpose.

b. Apparatus

Figure 6A:
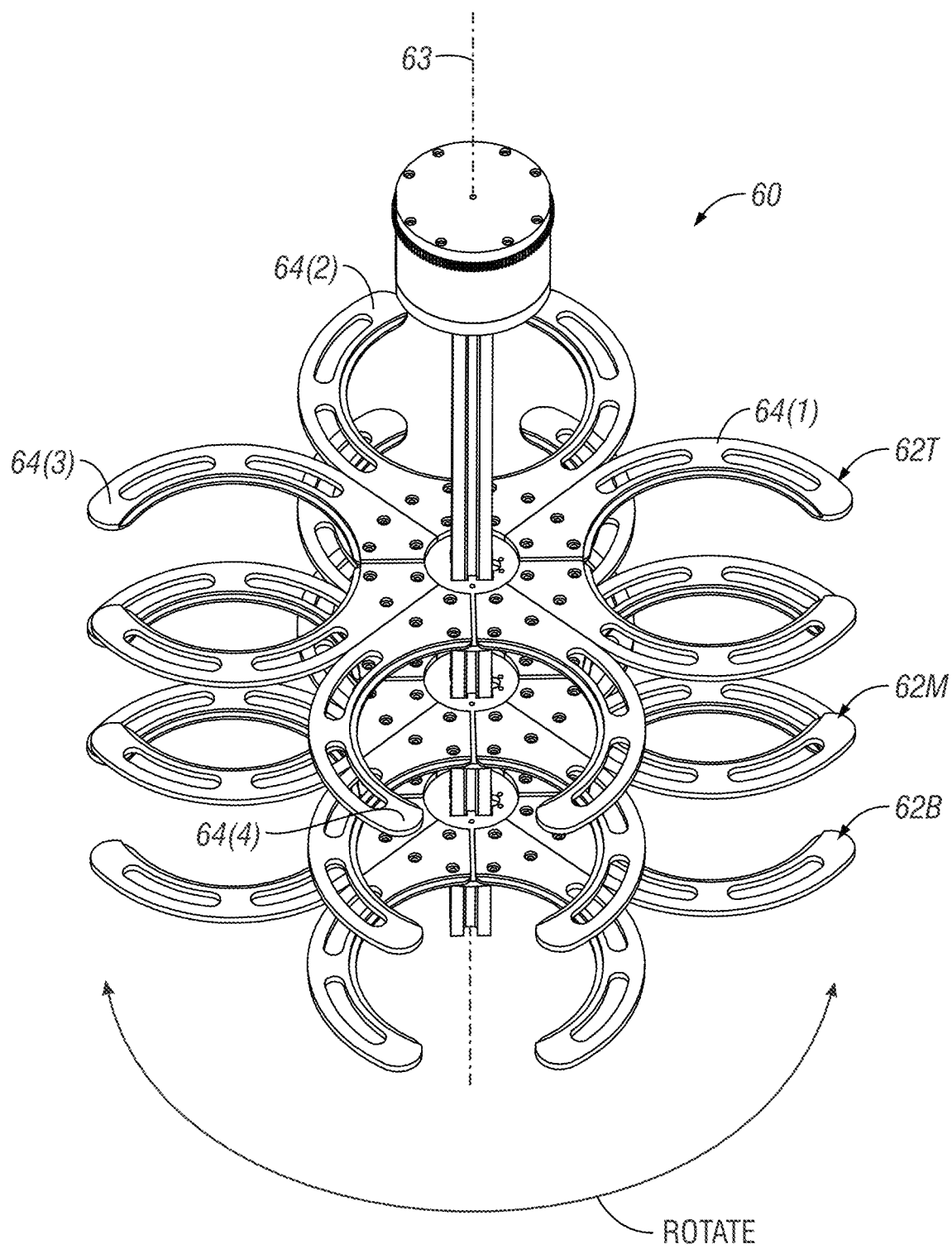
FIGS. 6A and B are enlarged isolated perspective and front plan elevation views of a turntable assembly of the system of FIG. 4A according to a specific exemplary embodiment.
Figure 6B:
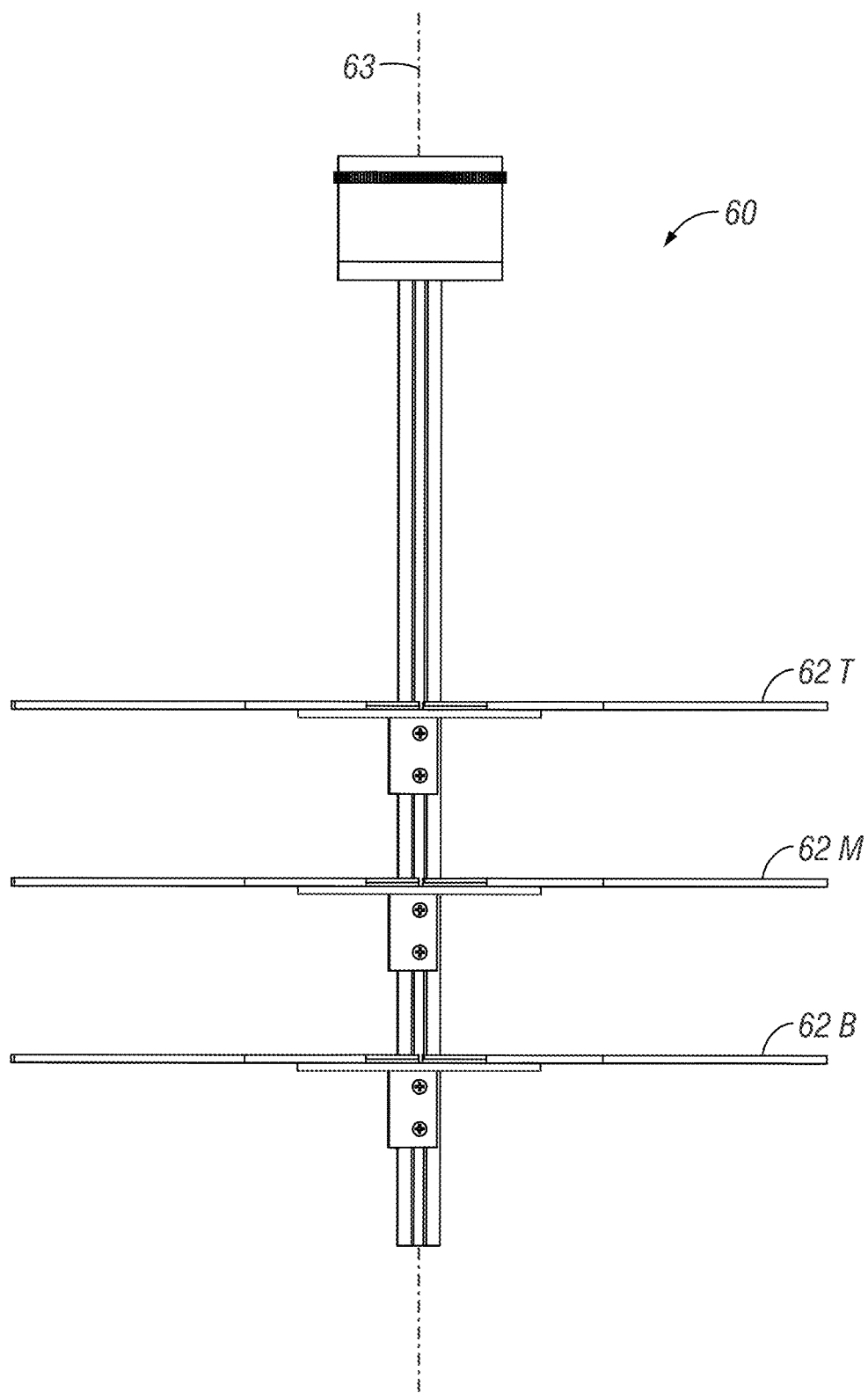

The nonlimiting example of a turntable in FIGS. 6A and B shows how each level 62 can be mounted on its own linear bearing along vertical post. In a similar fashion to up/down movement of combined tool 50 on its vertical post, a similar rotary geared and motorized bearing could be operatively installed on the linear bearing at each level 62. Motors could turn the entire combination in synchronization. Alternatively, each level 62 could have independent rotation.

FIG. 6A shows this embodiment has four sieve receiving jaw sets 64 (1)-(4) at each level 62. Each receiver 64 is sized to receive and hold a sieve 27.

c. Features

Each level 62 has multiple receivers designed to each receive and hold a sieve 27. In this example there are four different receivers 64 per tray 62. That can vary and be more or less than four. Each level thus can hold four sieves in this embodiment. But it is noted that not all receivers need to hold a sieve for a cycle of operation of extraction station 40.

The jaws of each receiver 64 are fixed to allow a sieve to be dropped vertically into the complementary space of each receiver.

As can be appreciated, the number of levels 62 and the number of receivers 64 can vary according to need or desire. In this example, three levels are used with four sieve receivers each, which is deemed sufficient for processing SCN cysts and eggs according to the present embodiment.

As can be further appreciated, each receiver 64 and each level 62 cooperates with gripper tool 56 such that any receiver 64 can be rotated to have its center axis aligned with the center axis between the gripper jaws when gripper tool 56 is appropriately rotated. This allows gripper tool 56 to place or remove a sieve from any receiver 64 from any level 62 by correlated vertical movement and rotation of the whole turntable 50.

Likewise, washing tool 52 can be operatively positioned on center to any receiver 64.

Non-limiting examples of components that can be used to achieve the foregoing functions include:

Turntable Stage System

Motor. Vex Robotics, 2-wire Vex Motor 393. See https://www.vexrobotics.com/motors. html (incorporated by reference herein). Specifications: Free Speed:100 rpm. Stall Torque:1.67 N-m (14.76 in-lbs). Stall Current: 4.8A. Free Current:0.37A.

Vex Turntable Bearing Kit. See https://www.vexrobotics.com/276-1810.html

Used in: Linear Motor System, Turntable Stage System

7. Grinder Tool Features FIGS. 7A-B a. Functions

The primary functions of grinder 70 are to provide rotary press action on top of material on a sieve. In the specific example of SCN, it is particularly valuable in influencing the bursting of the cysts to release their eggs. By bringing a rotating grinding pad 72 towards the sieve screen, calibrated to come no closer than a minimum distance, the rotary grinding and up-and-down pressing action on the cysts have been found to promote such egg release.

In the present embodiment, grinding system 70 can both provide grinding pad rotary motion around axis 73. But it can also, through a gearing arrangement, provide up/down movement of pad 72.

b. Apparatus

Figure 7A:
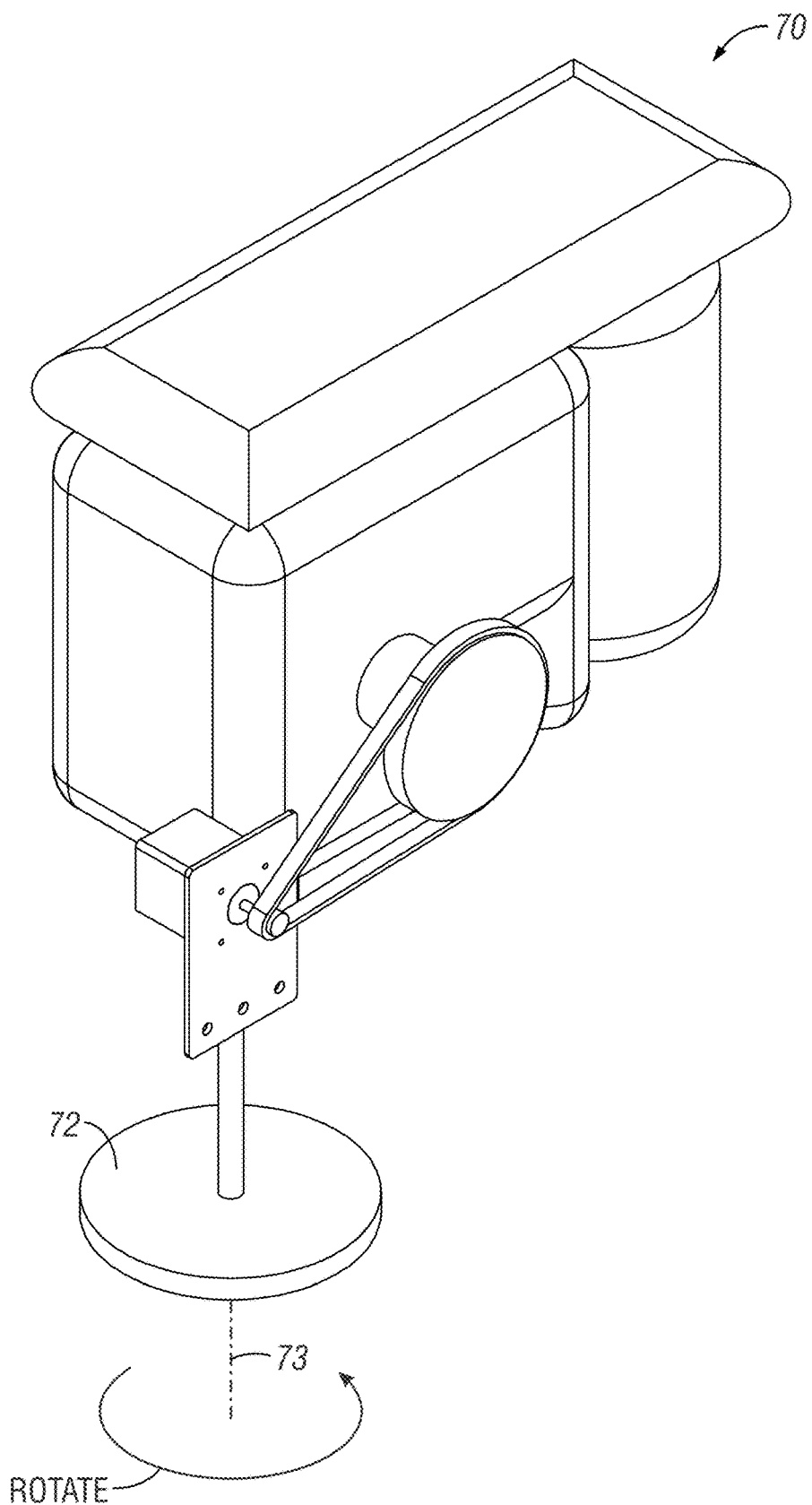
FIGS. 7A and B are enlarged isolated perspective and side views of a grinding tool according to a specific embodiment of the system of FIG. 4A.
Figure 7B:
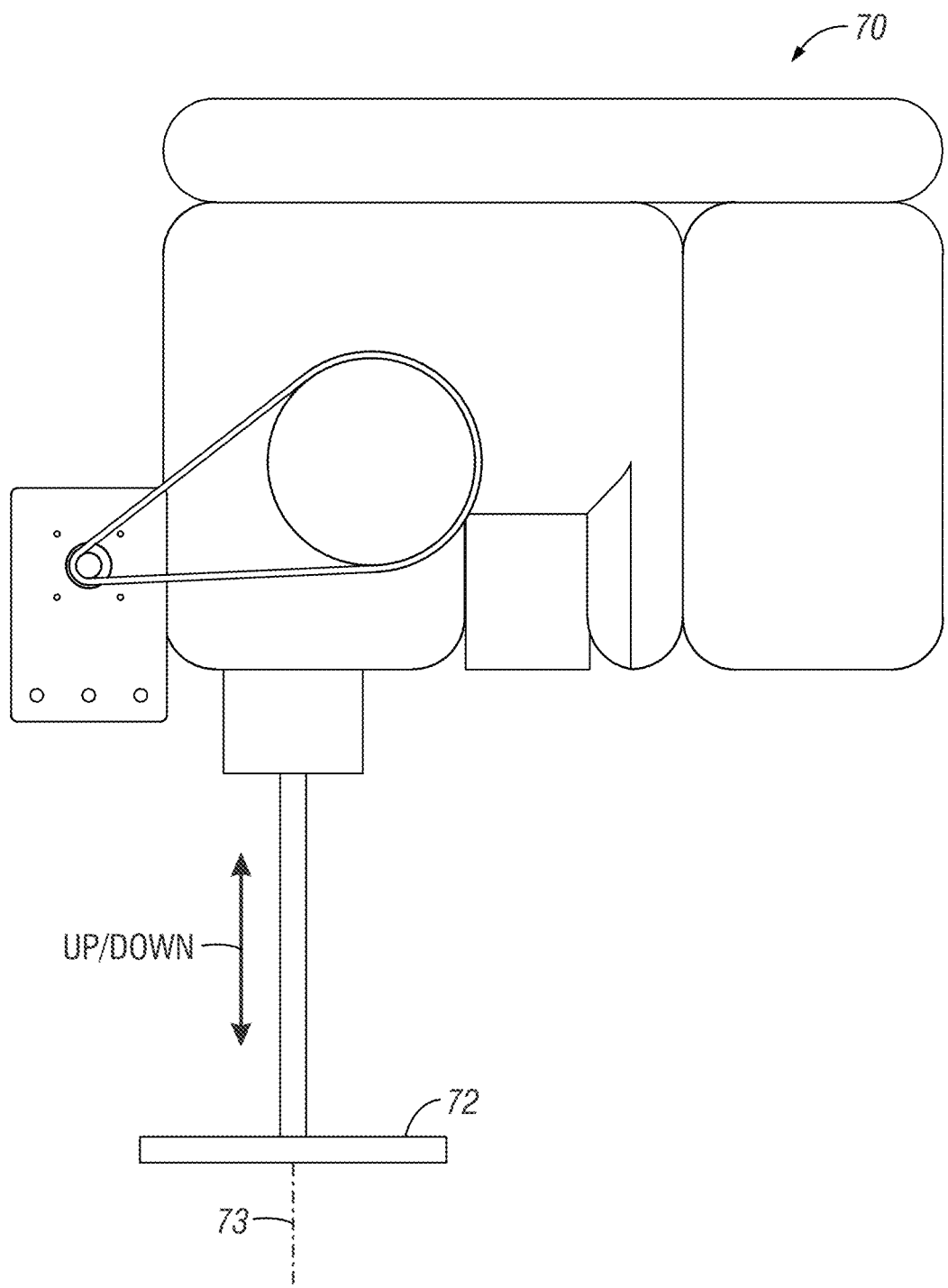
Figure 8A:
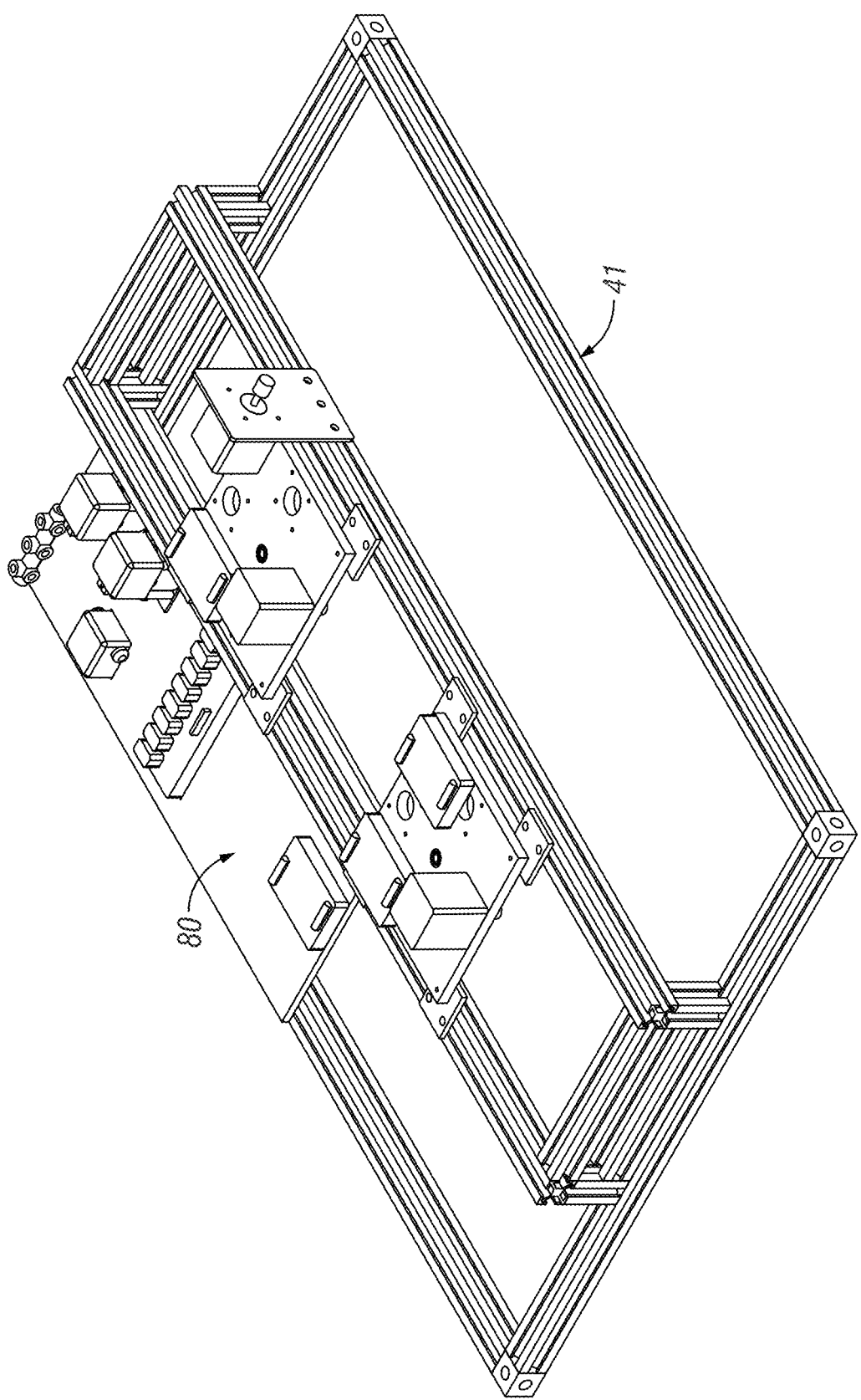
FIG. 8A is a perspective, isolated view of a control subsystem and circuit arrangement for the system of FIG. 4A.
Figure 8B:
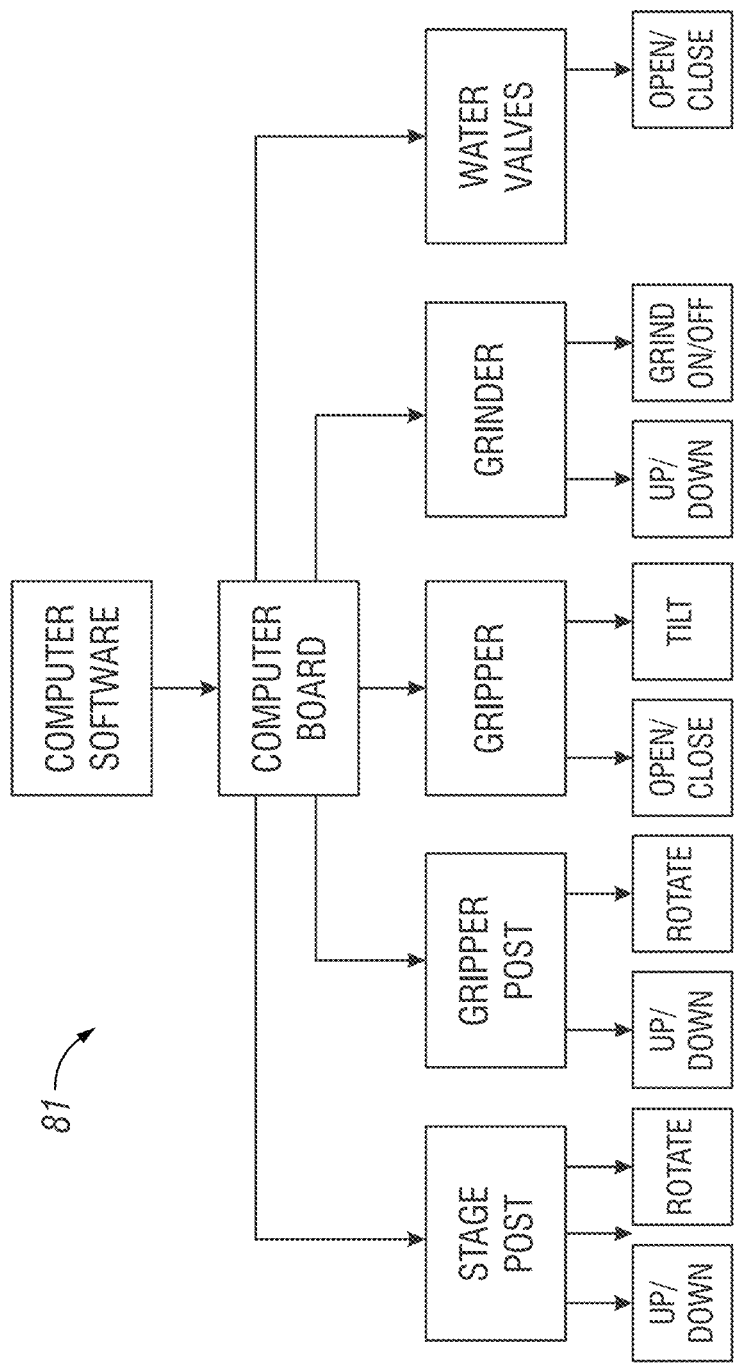
FIG. 8B is a diagrammatic view of the functional attributes of software used with the control subsystem of FIG. 8A relative to operation of the extraction station of FIG. 4A.

As indicated in FIGS. 7A and B, both rotation and up/down movement of pad 72 are accomplished through mechanical means. A motor provides rotary action that can be converted by gearing to the pad rotation. It can also have a controlled up and down travel range. This can be calibrated relative to a grinding vertical axis generally along 73 to automatically move down into a sieve but not get closer than a minimum distance.

One non-limiting example is utilization of essentially a drill press. This provides both rotary and up/down movement at its working tool end.

c. Features

Features of the grinder can include the following:
a. Not only is there rotational action of pad 72, there can be an up-and-down motion of pad 72 by gearing raising and lowering the rotational axle of pad 72 during operation.
b. There can be up motion of top level 62T of turntable 60 towards grinder pad 72, if enabled at turntable 60.
c. Motor and a gear system can allow selection of rotational speed of pad 72 over a range.

Grinding tool 70 location on frame 41, and appropriate control of placement and motion control of a set of sieves on turntable 60, allows grinder tool 60 to enhance separation of SCN eggs from cysts to better produce an accurate account of eggs from the sample.

As can be appreciated, any sieve placed on top level 62T of turntable 60 can be rotated to a position directly below grinding pad 72. By controlling the vertical movement of pad 72 and/or level 62T, the pad 72 can be gradually converged to the surface of the sieve, while spinning.

In this embodiment, a rubber pad (~6 inch dia. to match internal diameter of sieves 27 and the consistency of rubber stoppers used in laboratory flasks) is fixed to the grinder rotating plate 162. As noted, it is slightly offset (0.0050 in.) from the rotational axis 73 of the grinder rotating shaft. It works like an orbital sander or grinder.

At 500 rpm, rubber pad 72 is moved towards and away from the material on the sieve screen in an up/down press action. In one example, grinding occurs for 30 seconds and then pad 72 is lifted. This is repeated two more times. Importantly, it is calibrated to never converge to the sieve screen surface. Cysts are approximately 200 μm in largest dimension, whereas eggs are much smaller, more on the order of 20 μm. Therefore, pad 72 vertical movement is calibrated to move closer than 200 μm but never get closer than about 20 μm or so (usually a bit larger), to influence the bursting or release of eggs from the cysts without destroying the form factors of the eggs so they will better be counted, and also to avoid damage to the sieve screen. This distance control also protects against significant damage risk to the expensive and sometimes very sensitive sieve screens and small pore sizes. By distance control, keeping the orbital pad 72 from coming into substantial contact with the top of the screen of the sieve deters the forces of the grinder from deforming the screen pore sidewalls or mesh. Consistent and correct pore size openings are critical to good filtering. Also, replacement of these expensive components is deterred.

Such overall grinding process can take around can take several minutes (in this example around 6 minutes total). It is working with a still somewhat "dirty sample" in the sense that it is a raw soil sample that has gone through only one sieve at that point.

One technique that can enhance this operation is as follows. After each press action, the sieve and rubber grinding surface can be separated sufficiently that the top level 62T of turntable 60 is rotated to the side of the washing station, washing station 52 is lifted, rotated, and then pressed down on the sieve, and a washing action occurs. Since the #200 sieve screen remains below the #60 screen during this action, it influences eggs that have been released from the cysts through the #60, by gravity and with flow of the water, into the #200. It also tends to remove material from the side of the #60 sieve. This also enhances quantification by promoting capture of all or as many of the eggs as possible from each sample. Once washing has completed, the hood of washing tool 52 is lifted from #60 sieve and turntable 60 rotated back in line with the grinder for the second and third press actions, with the rinse between each.

An optional enhancement could be vibration. By eccentric weighted motors appropriately mounted and operated, entire turntable 60 or the entire extraction station frame 41 could be vibrated intermittently or continuously during the grinding process to also promote movement of released eggs to the #200 screen.

Alternatively, there could be a dedicated sprayer installed at grinder 70 such that upon lifting or separation of grinder 70 from #60 sieve, the washing action could occur without having to rotate the turntable and operate the washing tool 52.

It is understood that both the up and down movement and rotation around the vertical posts on frame 41 can be accurately and minutely controlled with such things as stepper motors.

Additionally, it is noted that grinder 70 has an almost infinitely adjustable set of operating parameters. For example, pad rotation, distance of raising and lowering, and speed of raising and lowering can be adjusted according to need or desire.

8. Control Subsystem Features FIGS. 8A-B a. Function

The overriding function of the control sub circuit 80 is motion and other control (see also FIGS. 3A and B) to effectuate a sample cycle according to this embodiment. Conventional techniques of programming can be accomplished by the designer to adjust operating parameters.

b. Apparatus

FIGS. 8A and B present details about a control subsystem 80 with software programmable to accomplish the foregoing functions as indicated at FIG. 8B.

In this embodiment, electronics 80 are mounted at the top of frame 41. Software is selected with the components of circuitry 80 to effectuate the functions described herein.

FIGS. 8A and B provide more details regarding the control circuit 80.

c. Features

Control circuit 80 can have discrete sections that are mounted at top of frame 41. This allows separation from water and mechanical movement. It can also make them more accessible for testing and maintenance.

FIG. 8B illustrates the type of functionalities 81 which circuit 80 can perform. Software is used in conjunction with components in circuitry 80.

Those skilled in the art will appreciate that the functions can be achieved in different ways with different components. The designer can select those according to need or desire. Non-limiting examples of components that might be used to implement configurations such as described are indicated by vendor and model and/or selected relevant operating specifications.

Example of Controller 80
Arduino Uno Controller Board from Arduino. Specifications:

| | |
|---|---|
| Microcontroller | ATmega328P |
| Operating Voltage | 5 V |
| Input Voltage (recommended) | 7-12 V |
| Input Voltage (limit) | 6-20 V |
| Digital I/O Pins | 14 (of which 6 provide PWM output) |
| PWM Digital I/O Pins | 6 |
| Analog Input Pins | 6 |
| DC Current per I/O Pin | 20 Ma |
| DC Current for 3.3 V Pin | 50 Ma |

-continued

Example of Controller 80
Arduino Uno Controller Board from Arduino. Specifications:

| | |
|---|---|
| Flash Memory | 32 KB (ATmega328P) of which 0.5 KB used by bootloader |
| SRAM | 2 KB (ATmega328P) |
| EEPROM | 1 KB (ATmega328P) |
| Clock Speed | 16 MHz |
| LED_BUILTIN | 13 |
| Length | 68.6 mm |
| Width | 53.4 mm |
| Weight | 25 g |

See https://www.arduino.cc/en/Main/ArduinoBoardUno (incorporated by reference herein).

Arduino Adafruit Motor/Stepper/Servo Shield for Arduino v2 Kit—v2.3.

PDF of Spec Sheet: https://cdn-shop.adafruit.com/datasheets/TB6612FNG_datasheet_en_20121101.pdf URL: https://www.adafruit. com/products/1438

Controller Communication.

Bluetooth Module. Transceiver Module HC-06 from Sunfounder. See:

https://www.sunfounder.com/bluetooth-transceiver-module-hc-06-rs232-4-pin-serial.html and https://www.sunfounder.com/wiki/index.php?title=Bluetooth_Transceiver_Module_HC-06 (both incorporated by reference herein).

D. Operation

One example of SCN extraction using extraction station 40 is diagrammatically depicted at FIGS. 9A-9F. Is to be understood that FIG. 9A, in a single drawing, shows the sequential steps. FIGS. 9B-9F are enlargements in isolation of each step.

1. Raw Sample into #20 Sieve—FIGS. 9A and 9B

Figure 9A:
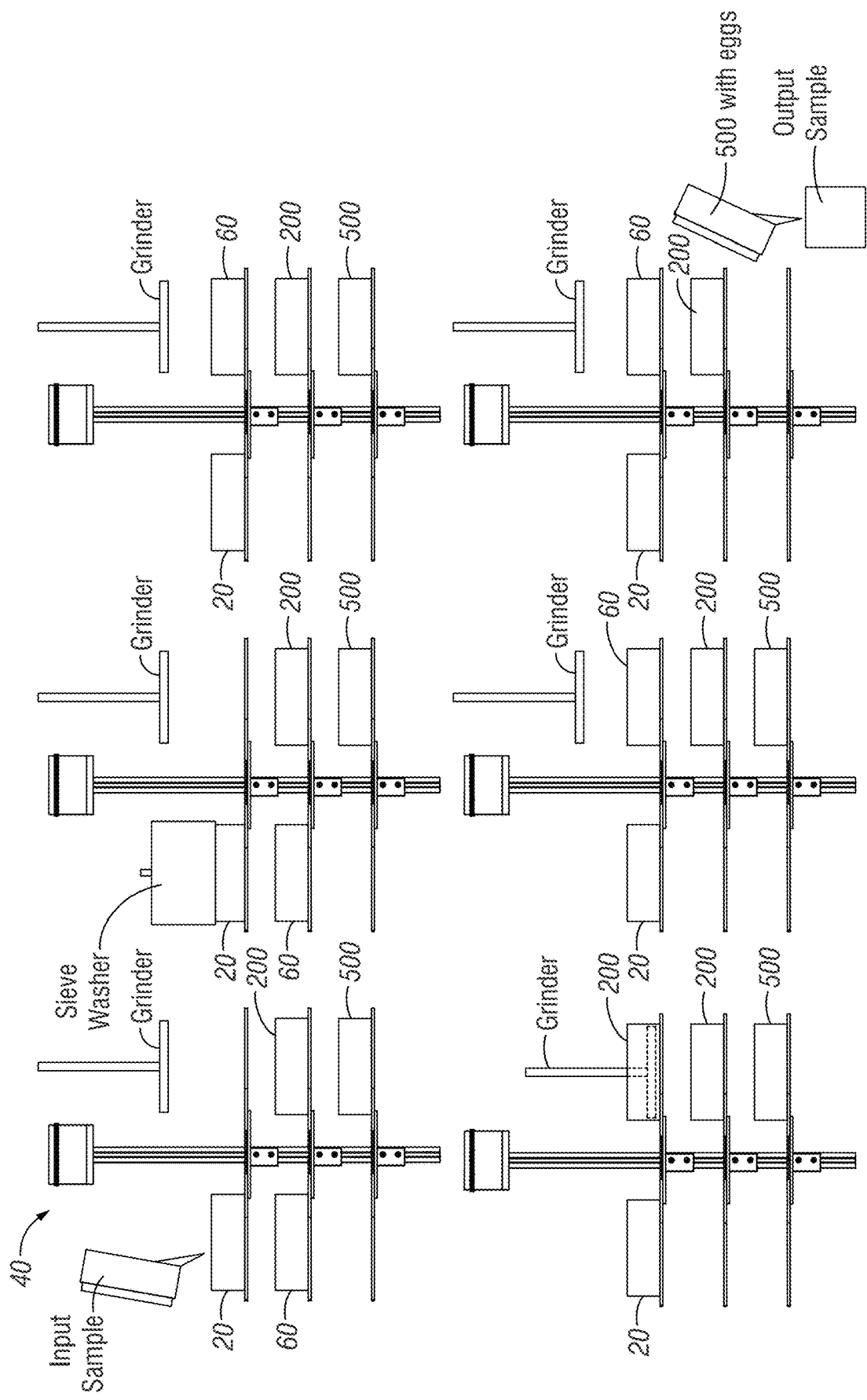
FIG. 9A is a simplified diagrammatic illustration of a sequence of operations for extracting SCN eggs from a soil sample using the station of FIG. 4A.
Figure 9B:
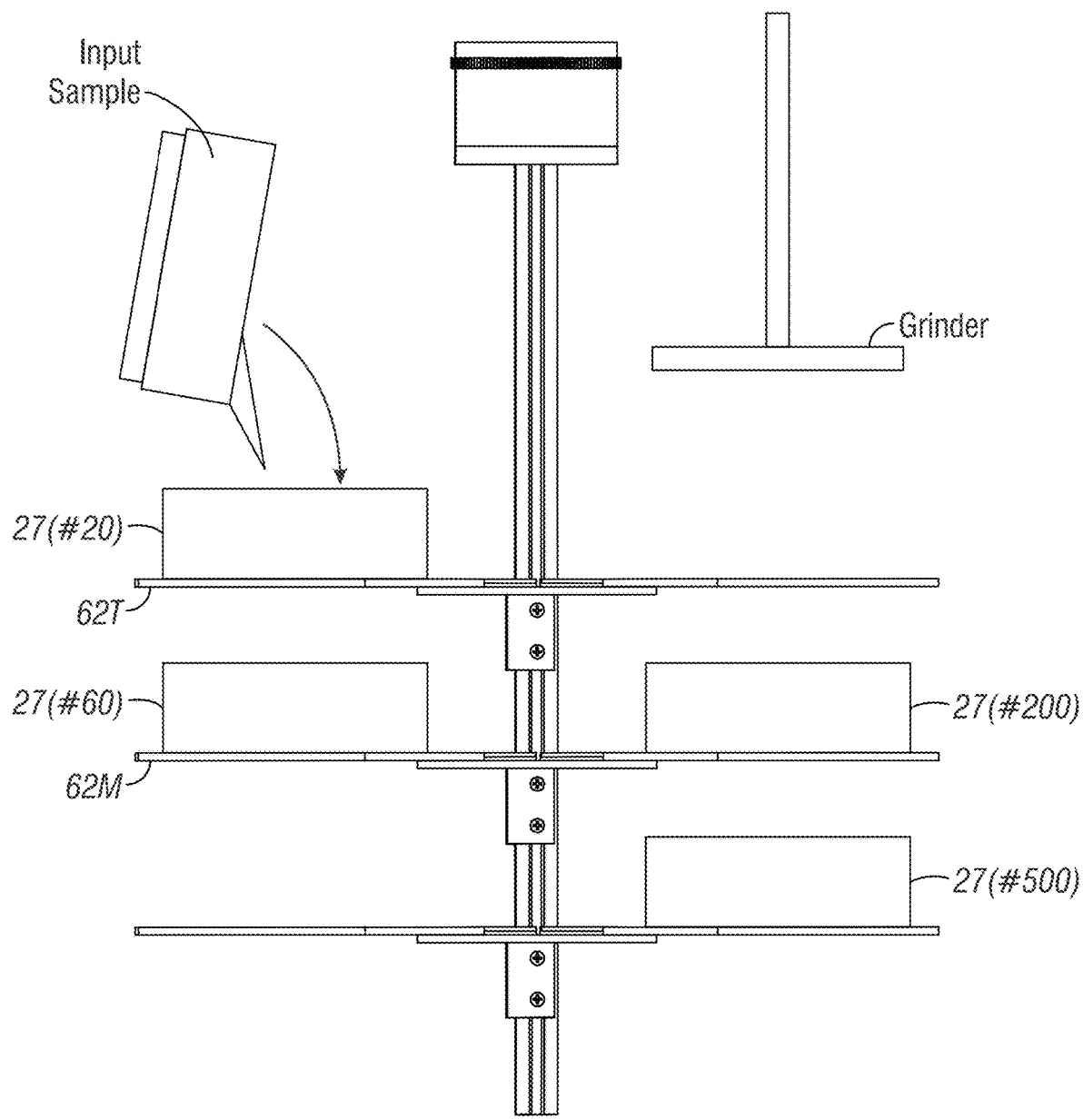
FIGS. 9B-G are isolated views of each of the sequence of the steps of FIG. 9A.

A sample container 56 holding an input sample of raw soil of a consistent volume can be grabbed by gripper tool 56 and moved and tipped to pour its contents into a sieve #20 rotated, as shown in the upper right-hand of FIG. 9A and in FIG. 9B. As can be seen, sieve #60 is automatically underneath on the second level 62M of turntable 60. Once sample is poured into top sieve, the sample container is removed, and the extraction process continues.

As can be appreciated with reference to FIGS. 3A, 3B, and 4A, controlled movement and operation of each tool relative to the sieves and their contents can automate extraction of SCN eggs from a raw soil sample.

As will be further appreciated, enhancement of such processes with the rinsing tool 52 and other optional uses of water would require operative connection to a source of water and controllable delivery as to pressure and quantity at those locations of extraction station 40 (see diagrammatic depiction at FIG. 5A).

Figure 9C:
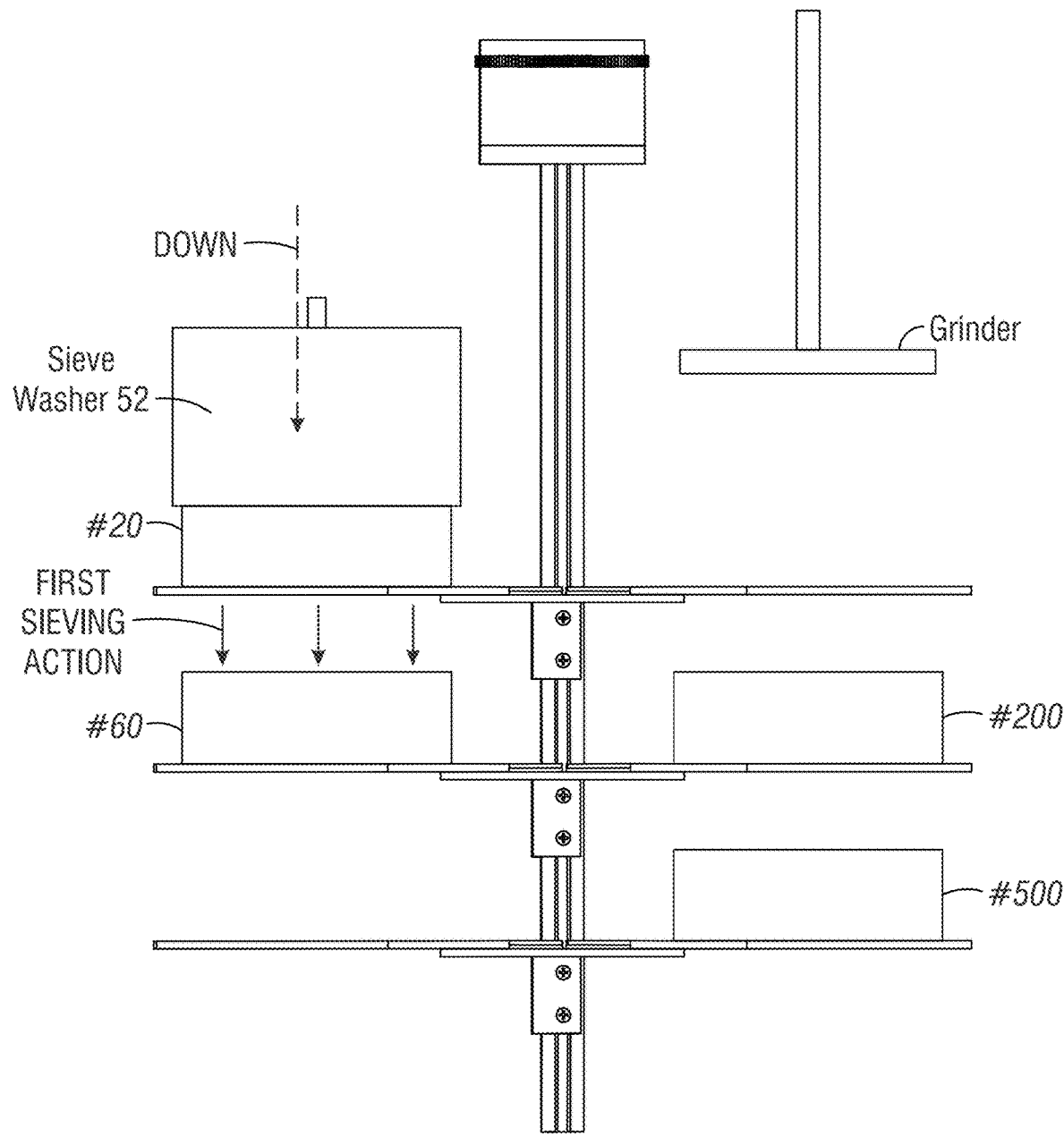

2. FIGS. 9A and 9C

With reference to middle and top of FIG. 9A and FIG. 9C, sieve washer tool 52 is rotated and raised, and then lowered over sieve #20. Spray arms are activated with valved water. The raw soil sample is wetted, and the sides of the sieve are cleaned off to instigate a first sieving step through the #20 screen. As is well known in the art, this tends to pass nematode cysts and eggs, as they exist in soil, to #60 sieve. The washing tends to suspend the larger, non-SCN items such that cysts and eggs pass through and are caught on #60 sieve. Water and smaller particles pass through the #60 to a recovery tray or tank.

Figure 9D:
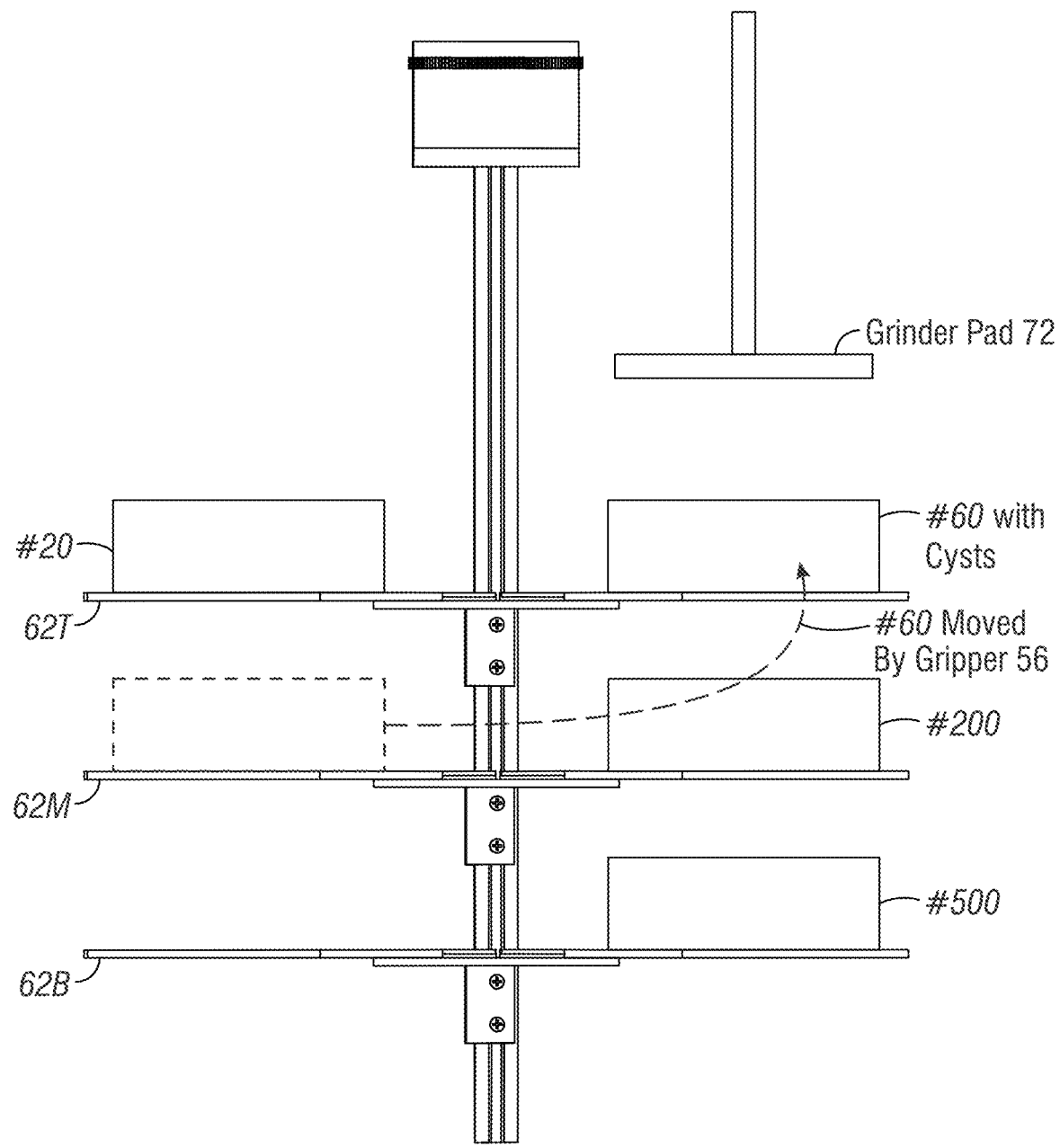
Figure 9E:
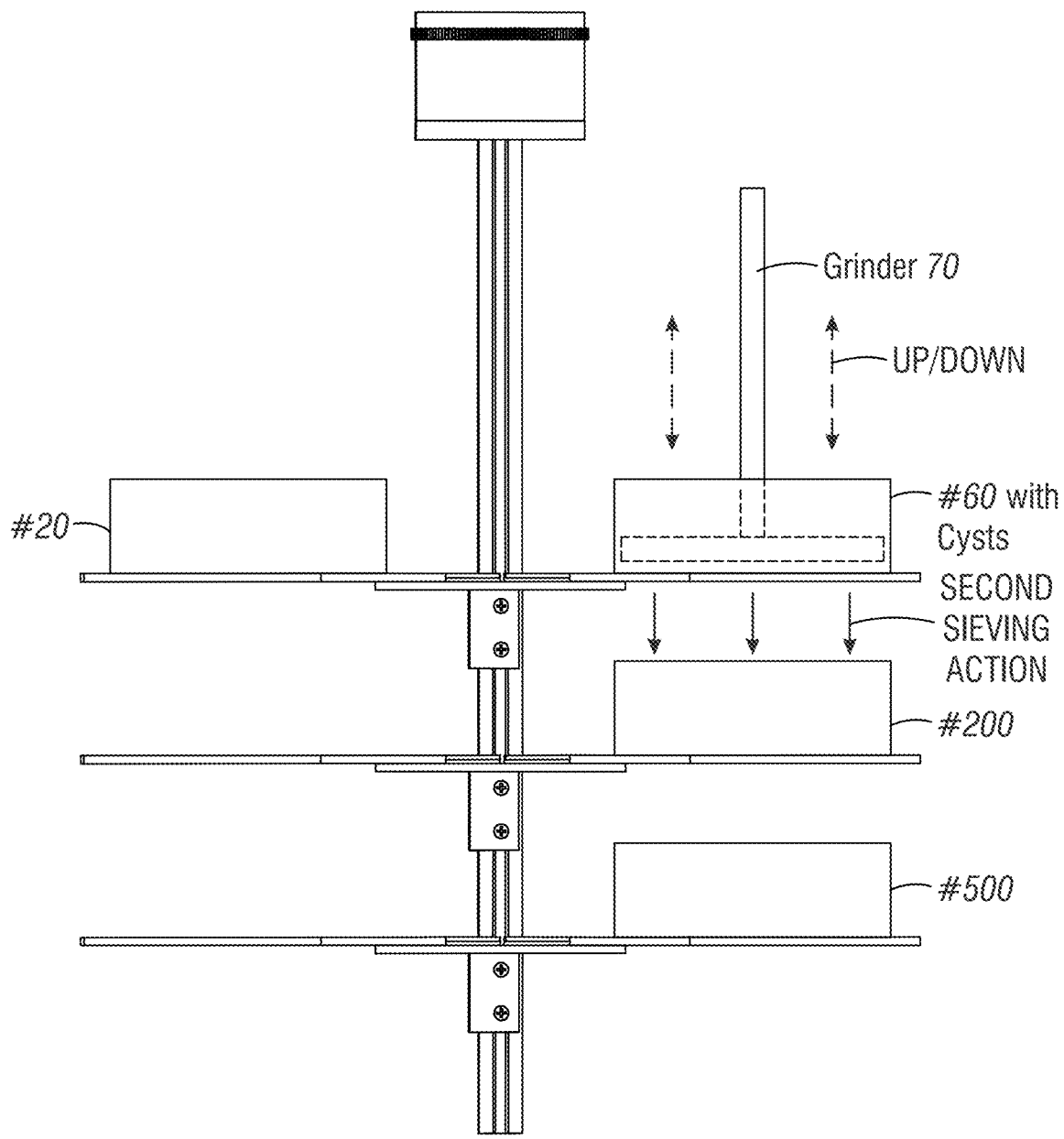
Figure 9F:
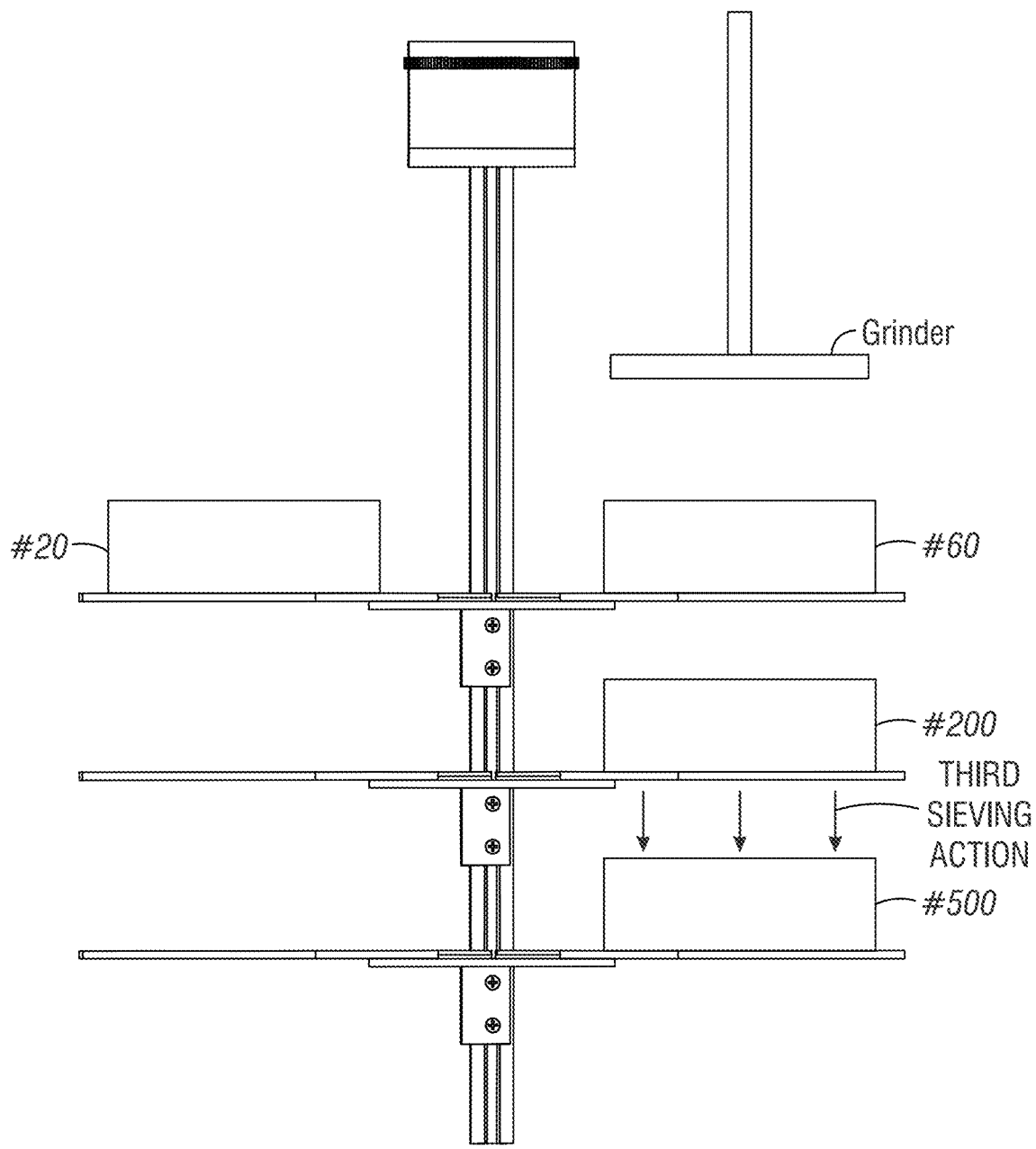

3. #60 Sieve Moved by Gripper to Under Grinder at Top of Turntable—FIGS. 9A and 9D

As shown in dashed lines, the next step is to have gripper tool 56 grab and lift #60 sieve with the cysts from the middle turntable level, rotate #60 away from the perimeter of turntable 60, and then rotate turntable and raise #60 into the top empty receiver on the top level 62T. The #60 sieve is then rotated opposite from the side of gripper tool 56 to directly below grinder pad 72. The #200 and #500 sieves are in position underneath the #60.

4. Cysts on #60 Release SCN Eggs under Influence of Grinder to #200 Sieve Below It—FIGS. 9A and 9E

As explained, vertical distance between the #60 and rotating grinder pad 72 can be minutely adjusted during grinder pad rotation to effectively burst the cysts contained in the #60. This spills out the SCN eggs from the cysts. The #60 is intentionally selected to pass the eggs to the #200 below it but retain larger, non-egg objects and debris in a substantial manner.

5. Washing Influences Eggs Through #200 to #500 Sieve Below It—FIG. 9A and FIG. 9F.

Grinding and washing influences sieving of materials through #60, onto #200 below it, and then to #500 below it. The sieve sizes are selected to promote passage of SCN eggs to the top of #500, where they would not pass.

To optionally assist the foregoing step, some vibration can be imparted to either the #60 sieve or entire turntable 60 (or overall frame 41). One example is an eccentric vibratory motor operatively connected to effectuate the same.

Another option is to rotate the #200 over to washing tool 56.

In any event, and it has been found that grinding and gravity are effective to consistently filter SCN eggs into the #200 sieve below the #60, and then further filtering SCN eggs through #200 into #500, where they would not pass.

6. Eggs Collected on #500 are Dumped into Container by Gripper Arm-FIG. 9A and FIG. 9G.

As shown, the final step is, using rotation of turntable 60 over to gripper arm 56, grabbing the #500 and pouring into an output sample container.

As can be seen, extraction station 40 can take a relatively dirty sample, meaning a soil sample without substantial pre-processing, and in a relatively short time (~6 minutes total) after merely suspending the soil sample and water and letting it rest for 5 to 10 minutes, strain out a substantial amount of irrelevant material at #20 with the washing tool 52. Washing tool 52 can be compressed and clamped over the top of #20, and with water flow control, wash the eggs through and deter sieve damage. A minimum flow rate is basically enough to spin the washer spray nozzles.

The first strained material is moved to the top of the turntable 60 by gripper 56, grabbing and removing it from level 62M, rotating turntable 60, and gripper 56 placing the #20 in the top level 62T and aligned with the grinder 70.

Then, grinding action, both rotary and up-and-down but never down to the sieve screen, bursts the cysts on the screen and forces SCN eggs through #60 down to #200 below it. Furthermore, #200 passes eggs to #500 below it for a further straining or purifying step. Smaller debris and water passes through #500. The eggs on #500 are collected and moved into an output sample container.

E. Quantification Station 29 (FIG. 2B and FIGS. 10-19)

As indicated, another feature according to the embodiment is quantification of items of interest, if desired. It can also be used with any starting collected sample. It does not require use of extraction station 28. Non-limiting examples of several techniques are now described.

1. Example Overall Method (FIG. 10)

Figure 9G:
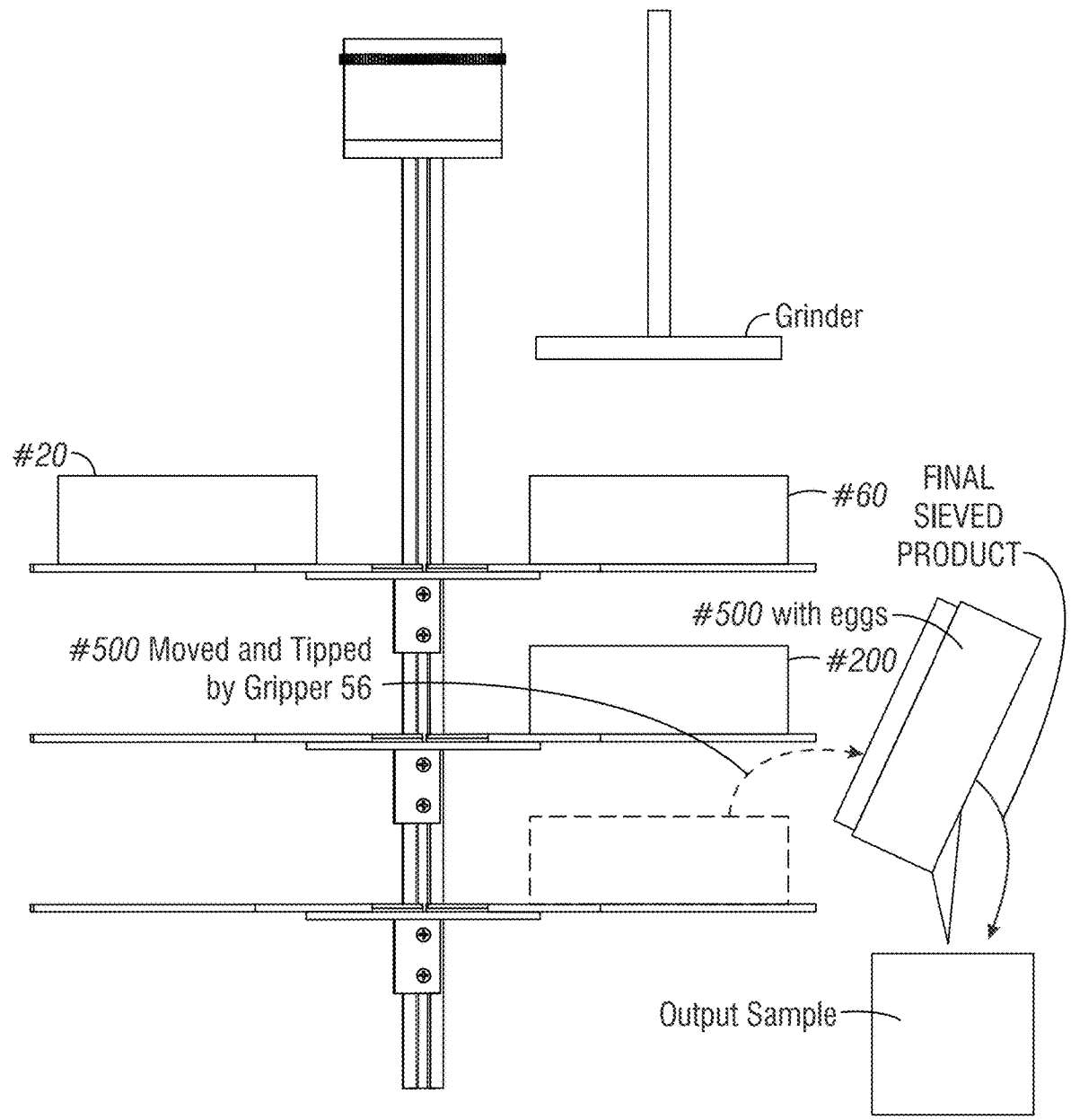
Figure 10:
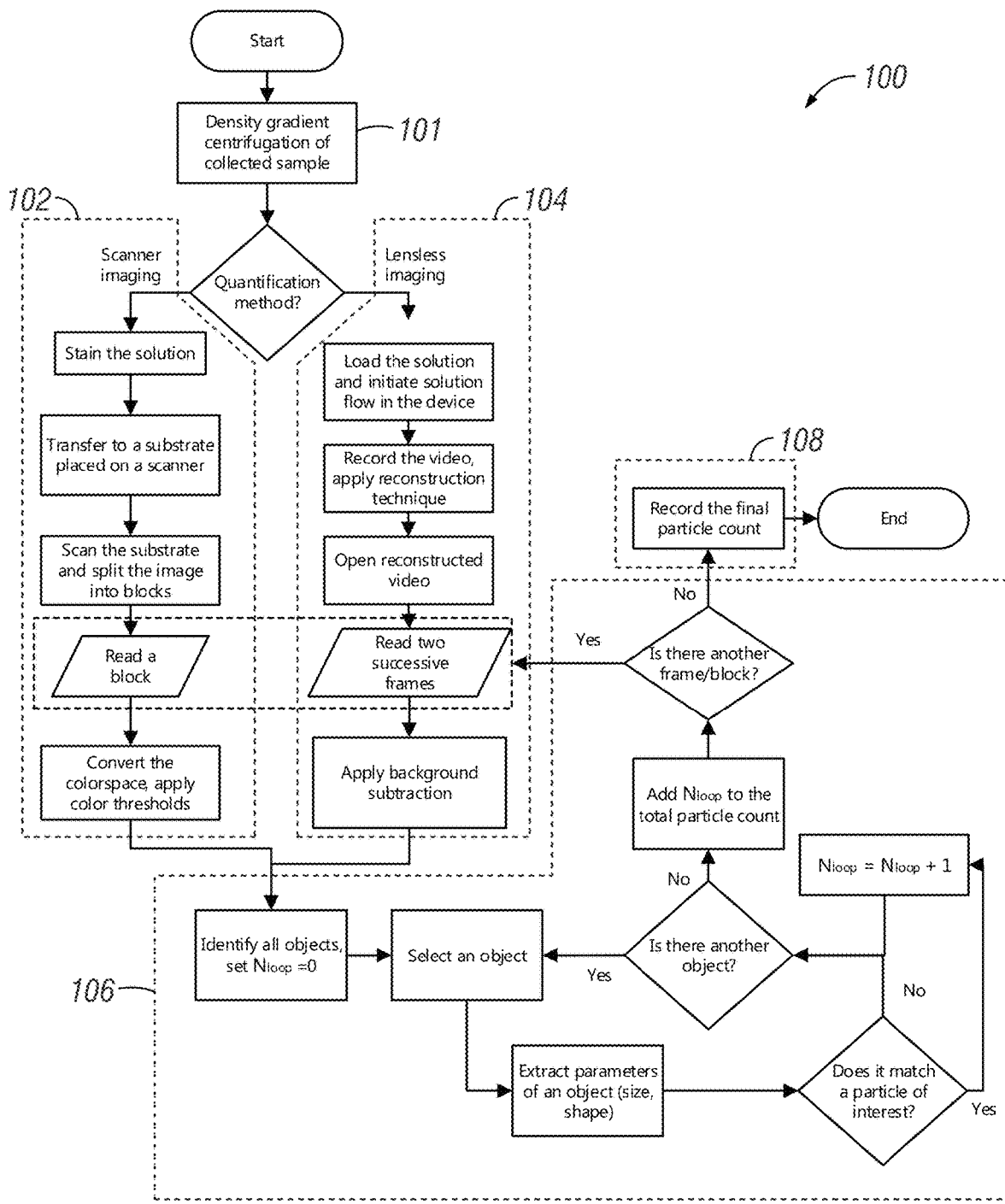
FIG. 10 is a flowchart of possible functional operations of the quantification station of FIG. 2B according to a specific embodiment of the invention.

FIG. 10 illustrates a specific method 100 of how the output sample from FIG. 9G can be quantified to produce an estimated SCN egg count related to the starting given volume soil sample. Method 100 includes two different counting options. One is a scanner-based technique 102 to use image recognition to count SCN eggs in an automated fashion. Another is a microfluidic lens-free or lensless photo detector array video technique 104. FIG. 10 sets forth the basic steps of each.

The fundamental purpose of quantification method 100 is to produce an automated estimate of objects of interest from an extracted sample. Nonlimiting examples are sub routines 102 (scanner-based image recognition) and sub routine 104 (microfluidic video image reconstruction).

Basic steps of each are set forth in FIG. 10. Both follow basic pattern recognition through an acquired digital image or images.

Certain aspects developed by the inventors enhance either of these processes, as will be discussed below.

The end result is an automated way of producing a count of objects of interest automatically that can be put to beneficial use.

As indicated in FIG. 10, either approach 102 or 104 is conducted in an iterative fashion. Pattern recognition of discrete portions of the static image or by comparison of frames of video enhance the accuracy of counting small objects of interest. At each iteration, a count is made, an inquiry is made of whether a further loop is needed. See sub routine 106. Once all relevant images are reviewed by the software, a final count from the iterations is made. Sub routine 108.

Figure 13:
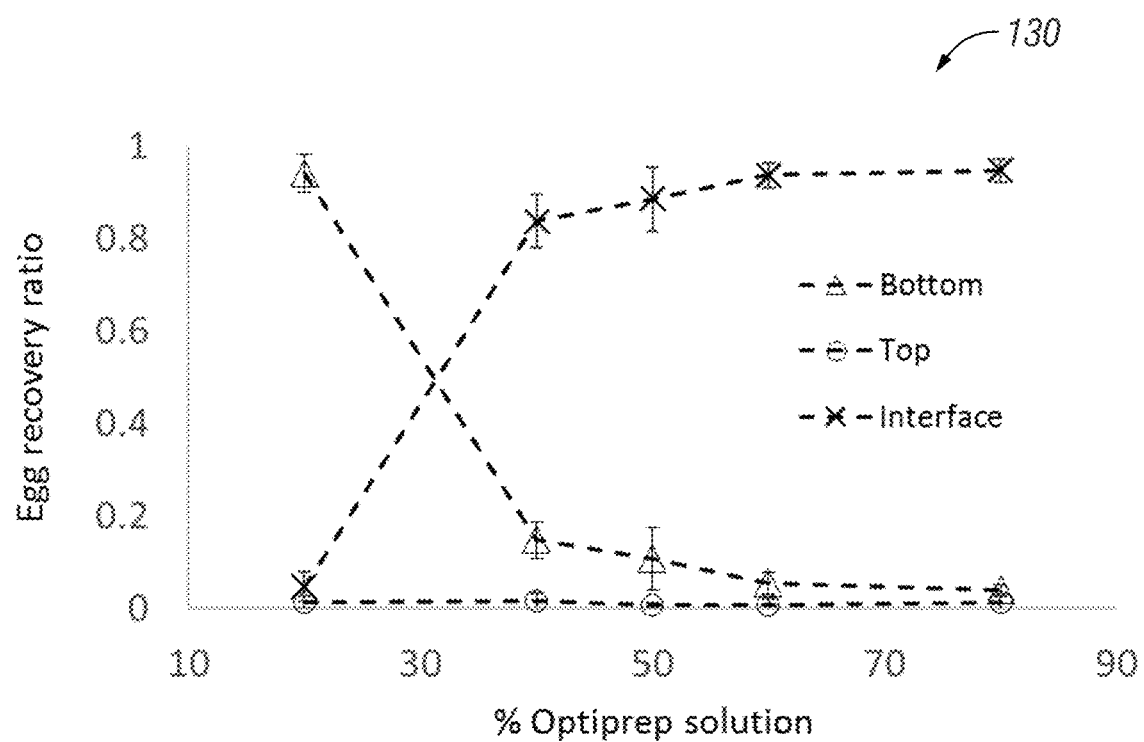
FIG. 13 is a graph showing proof of concept of consistent recovery of SCN density-separated eggs from other portions of the solution in the vial of FIG. 11A.
Figure 14A:
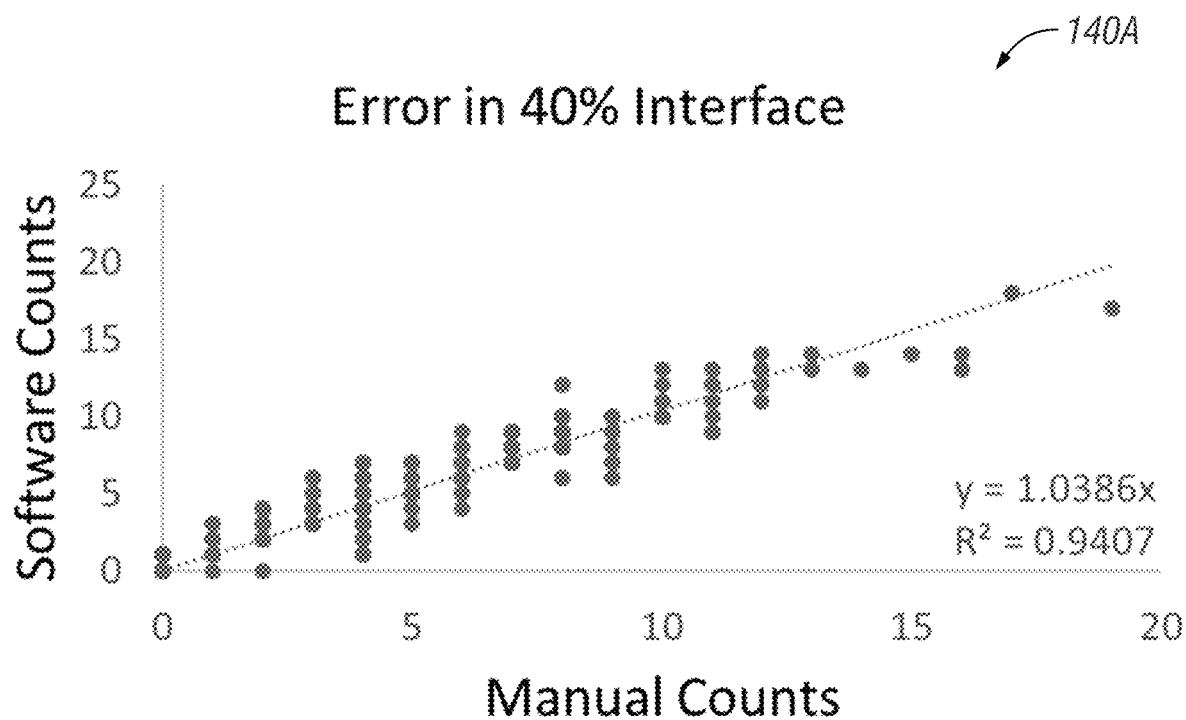
FIGS. 14A-D are graphs showing proof of concept of using imaging recognition software for counting SCN eggs on the filter paper of FIG. 11B compared to manual counts.
Figure 14B:
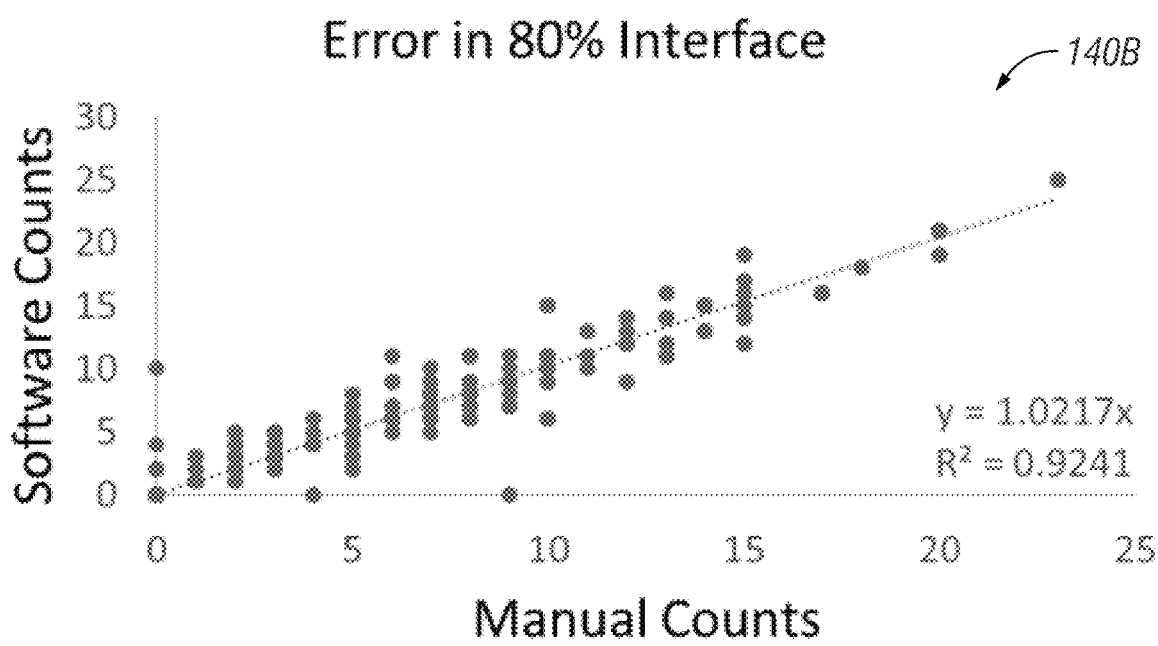
Figure 14C:
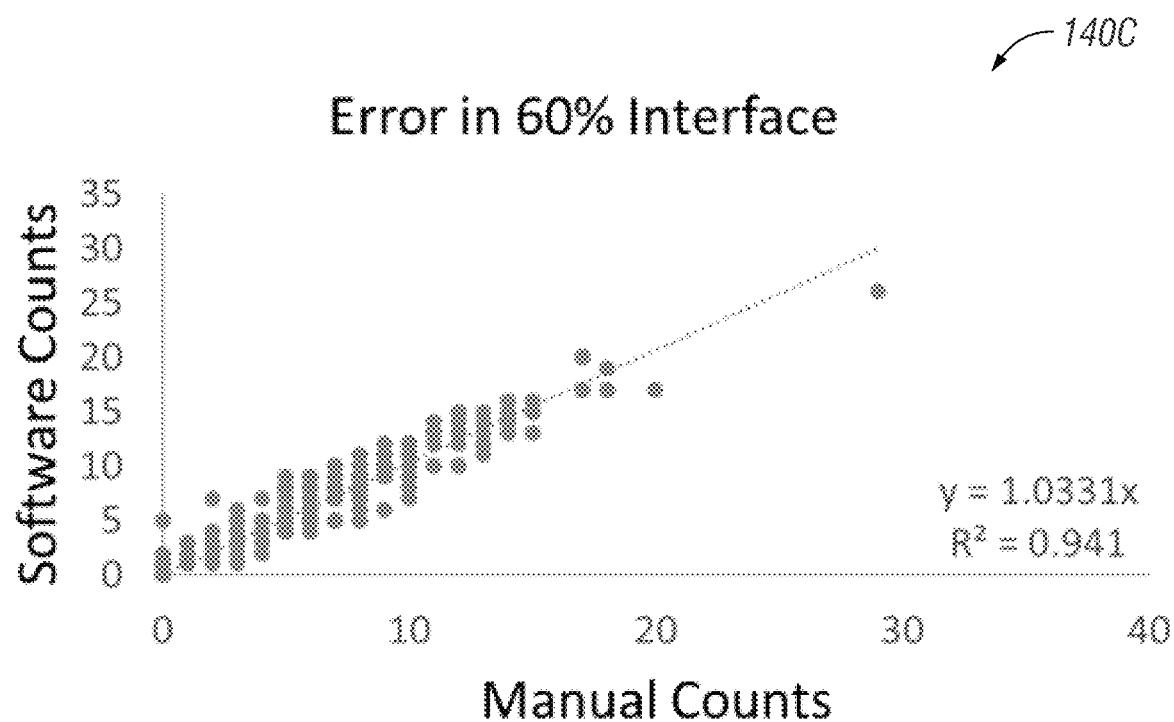
Figure 14D:
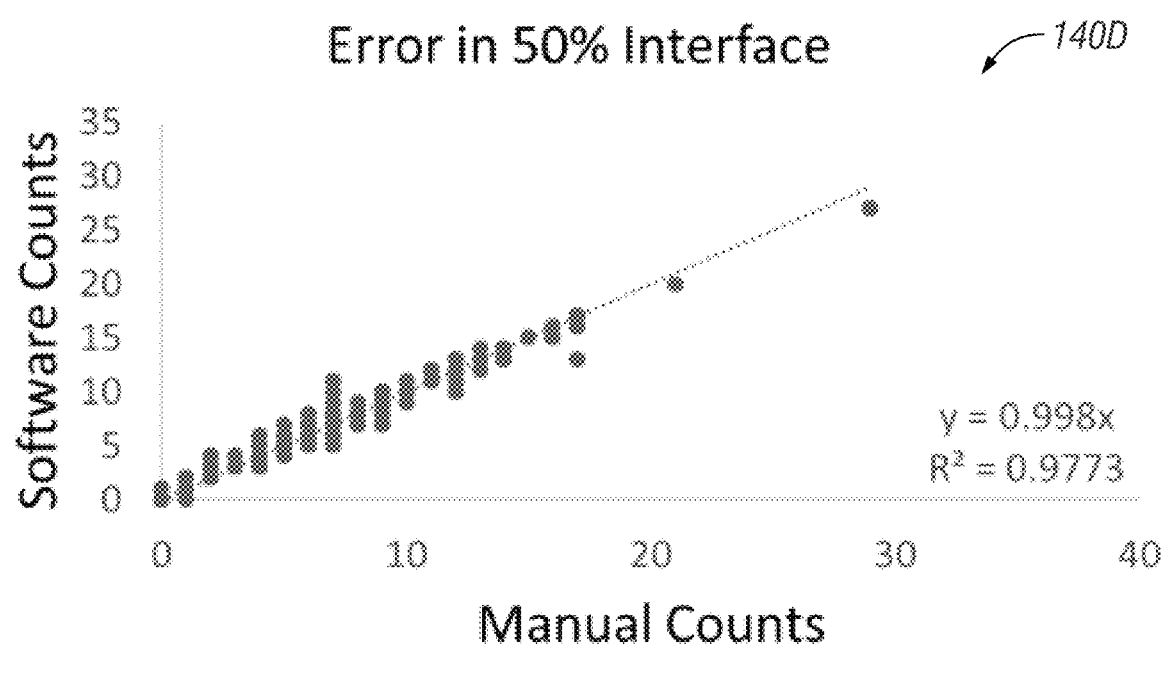

As illustrated in FIG. 13, proof of concept on the 80 to 90% recovery of eggs is shown.

A description of quantification techniques 102 and 104 from FIG. 10 follows.

2. Counting by Static Image Recognition (FIGS. 11-16)

a. Function

The fundamental technique of scanner-based pattern recognition technique 102 of FIG. 10 is preparing the sample to be imaged in a way beneficial to good image recognition. A static substrate on a scanner bed with the sample to be processed proceeds according to conventional image recognition procedures. This will be discussed below.

b. Apparatus

Figure 15A:
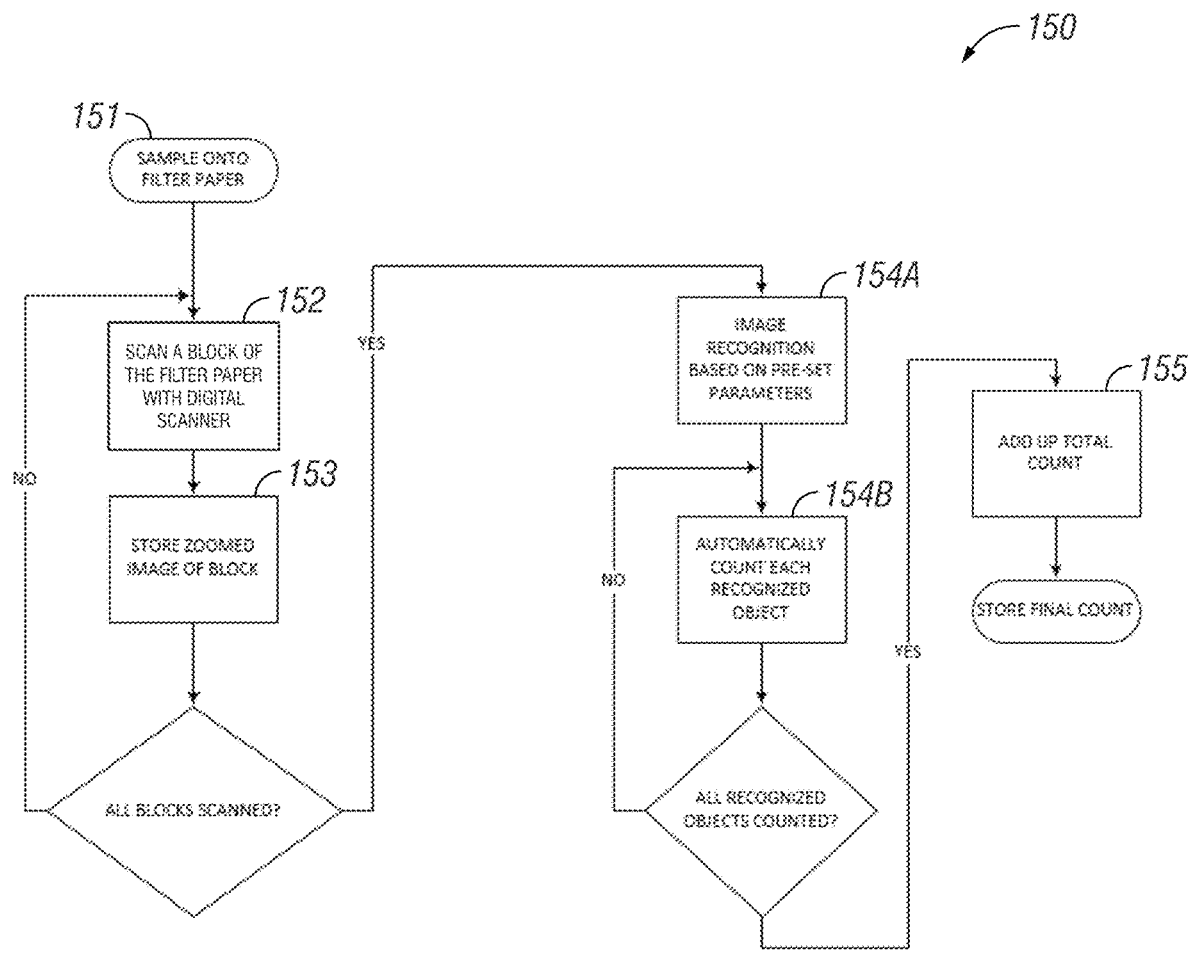
FIG. 15A is a high-level flow chart of quantification using the filter paper of FIG. 11B with a digital scanner and image recognition software, according to one option in FIG. 10.

FIGS. 15A and B illustrate in a highly diagrammatic manner a non-limiting example of such a method 150 and a set-up 156 for scanner-based imaging and its operation.

c. Features

In this example, several pre-processing enhancements are utilized.

Figure 11A:
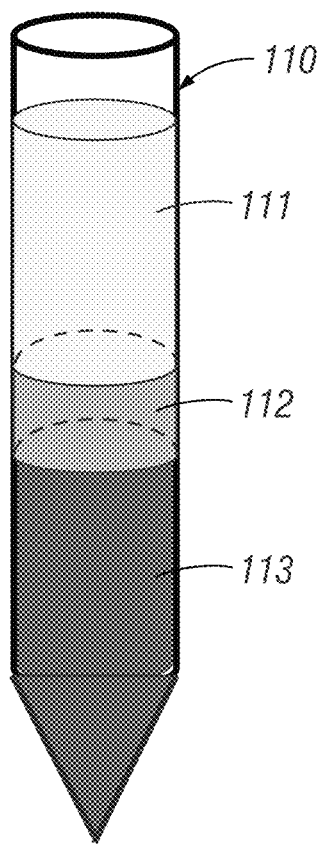
FIG. 11A is an enlarged diagrammatic view of a vial used in an optional technique for separating by density SCN eggs from other materials in solution prior to quantification by any of the techniques of FIG. 10, including showing how density separation through centrifuging occurs.

First, the extracted sample (sieved sample with objects of interest) is suspended in solution. In one example, it is mixed with water and placed in a vial 110. FIG. 11A. That solution is then centrifuged (~2 min.). It has been found that good separation of items of interest from water and other materials can be achieved. As diagrammatically illustrated in FIG. 11A, in the case of SCN eggs, they tend to float relative to water and other materials. Centrifugal action tends to stratify them between water 111 at the top of vial 110 and denser materials at the bottom at 113. Thus, an intermediate zone 112 contains most of the SCN eggs.

Testing has validated the same. The photos and associated graphs 120 of FIGS. 12A-F show various results. In each, the starting mixture prior to such centrifugal action is shown to the left. After centrifugal action the density separation is plainly apparent. The graphs show that a large majority of SCN eggs fall in the same distance from the bottom of vial 110 (e.g., in this example approximately 20 to 40 mm from the bottom). Comparison to controls have revealed this stratification occurs over a range of test conditions. Filter papers 116 with samplings from vial strata 111, 112, and 113 are also shown.

Thus, this pre-processing step can essentially provide a relatively quick and non-complex way of isolating the objects of interest. This can improve image recognition by eliminating a lot of other particles that could produce false negatives.

An optional feature is to utilize other fluids (e.g. sucrose or other density gradient solution) in the sample solution. Graph 130 of FIG. 13 shows how utilizing OPTIPREP™ (commercially available) as a part or percentage of the solution can enhance egg recovery ratio from that strata 112 after centrifugal action. OPTIPREP™ is a gradient density chemical. FIG. 13 shows how it can improve density separation in the case of SCN eggs. It is noted that following the pre-processing density separation technique described above likely will not recover 100% of the SCN eggs in vial 110. But through calibration and control procedures, FIG. 13 shows that even with manual removal with a pipette, a consistent 80 to 90% of eggs are recovered. This is important because testing indicates this is consistent enough to use as a compensation factor when estimating the final SCN count for the starting soil sample. A 20% count is added back in to each final count. Because absolutely accurate quantification is not required for usefulness of this embodiment (but rather placement of the count within a set of ranges that have relatively large distributions), using this compensation factor allows not only acceptable, but statistically significant estimations of actual egg quantity from a given soil sample by that adjustment.

Figure 11B:
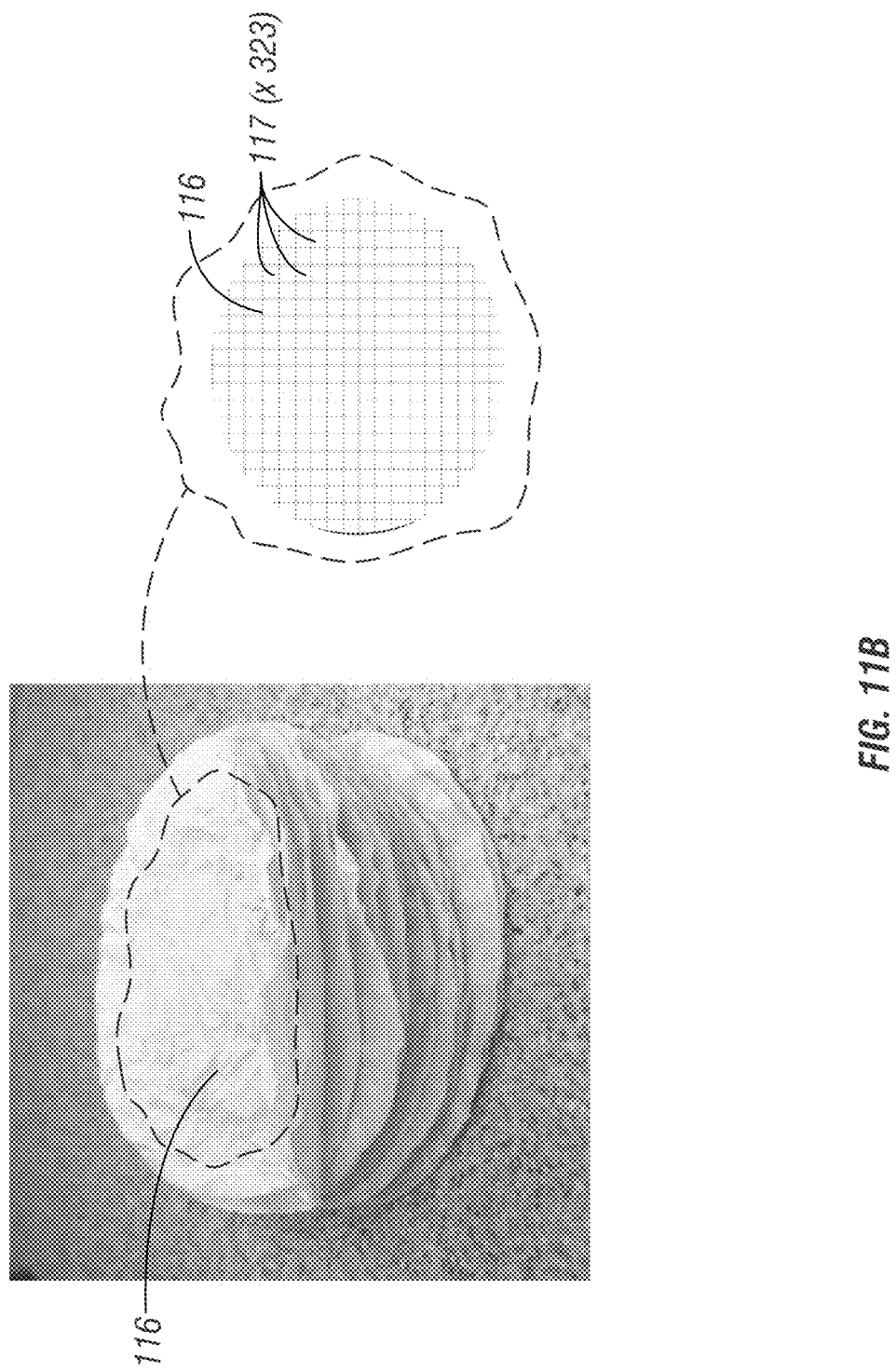
FIG. 11B is a perspective view of a stack of filter paper disks for receiving a sample for quantification, with diagrammatic isolated illustration of one such disk with superposed imaging zones or blocks when scanning a static digital image of the surface of the disk used for imaging extracted eggs from the middle density-separated volume of FIG. 11A, deposited on the filter paper, for quantification of eggs according to an exemplary embodiment of the invention.
Figure 12A:
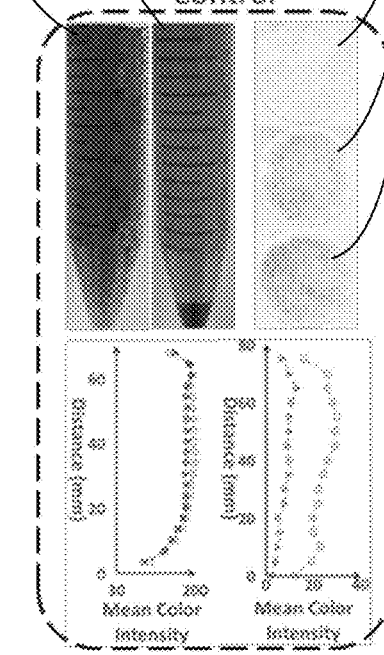
FIGS. 12A-F are photos and graphs showing proof of concept of effective separation of SCN eggs in the centrifuged vials of FIG. 11A.
Figure 12B:
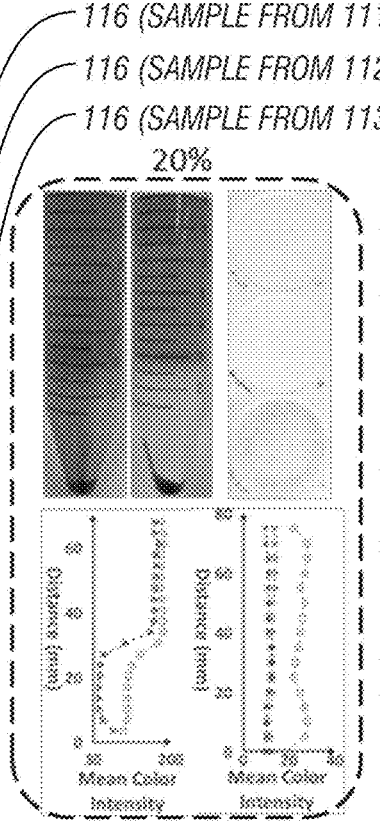
Figure 12C:
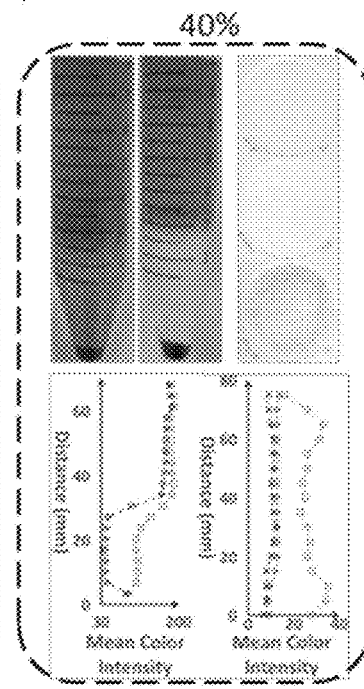
Figure 12D:
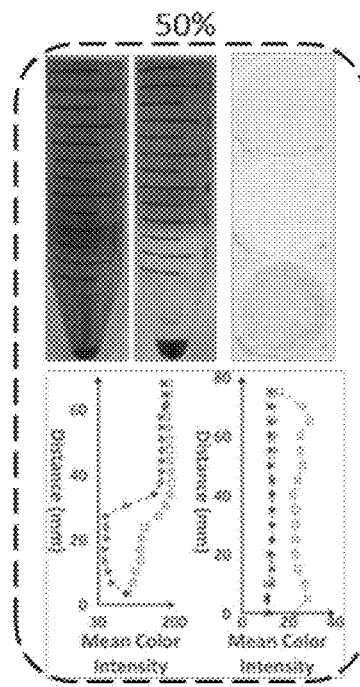
Figure 12E:
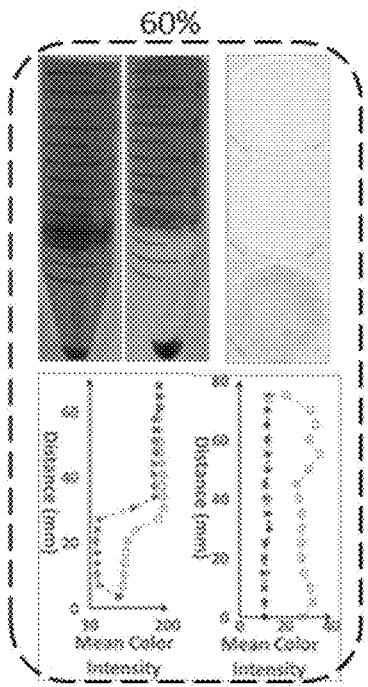
Figure 12F:
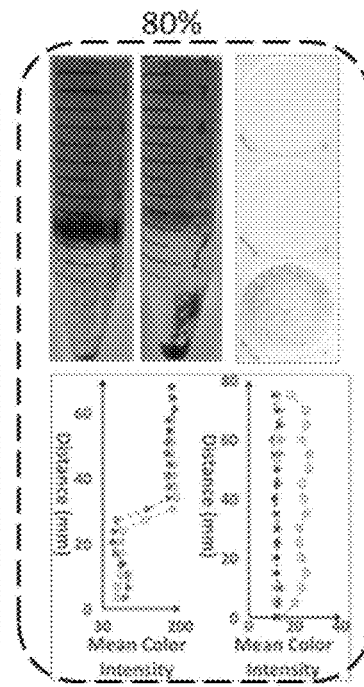

In preparation for scanning, this embodiment distributes extracted solution from strata 112 of vial 110 across commercially available filter paper 116. FIG. 11B. Serving as an imaging substrate, these inexpensive sheets (a stack of them is shown to the left in FIG. 11B) have a pore size smaller than SCN eggs but would absorb fluid in the solution as it is distributed across its surface.

Figure 15B:
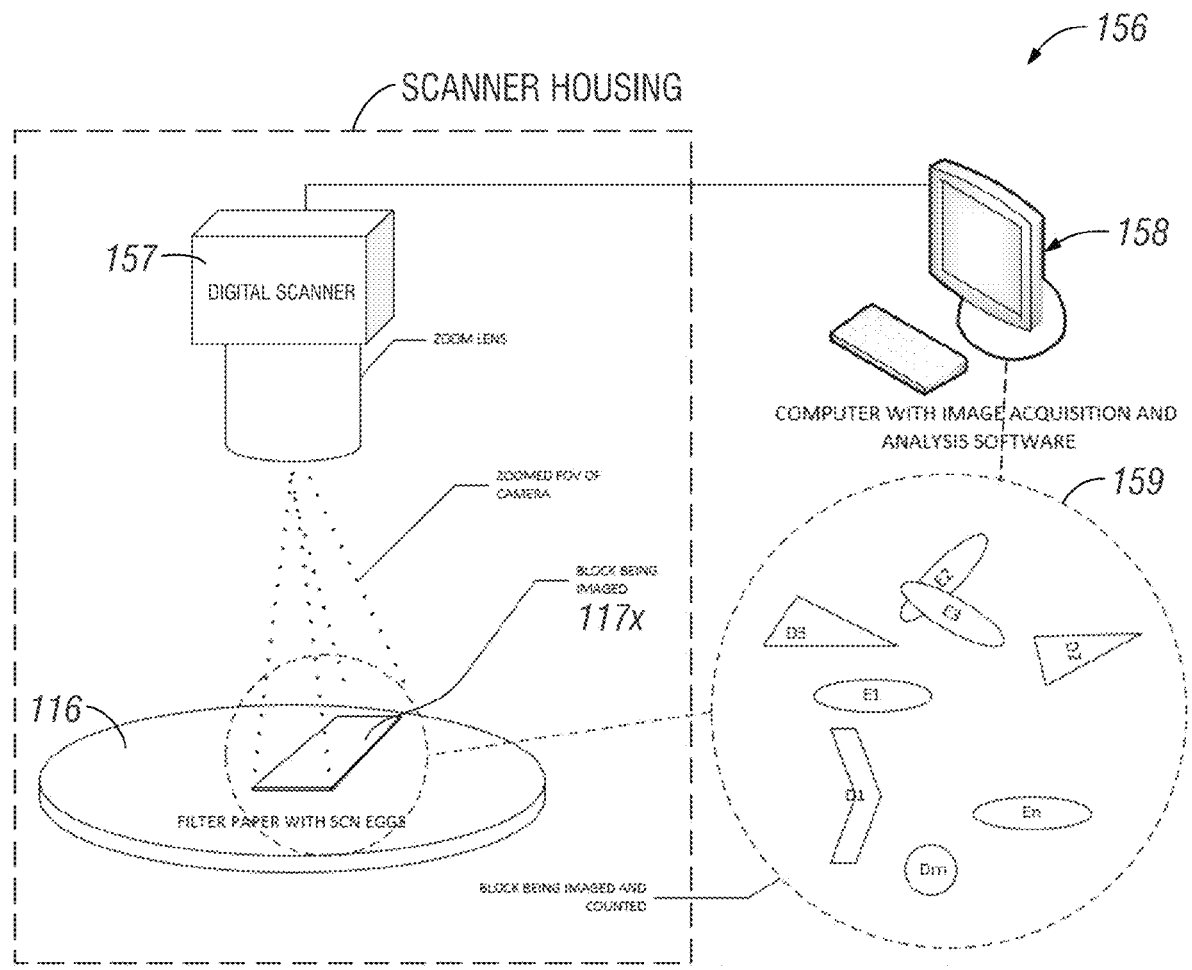
FIG. 15B is a diagrammatic example of one possible imaging subsystem for imaging filter papers of FIG. 11B and then processing with image recognition software for counting SCN eggs on filter paper as in FIG. 15A.

As indicated in method 150 of FIG. 15A, quantification would proceed by loading the filter paper with the distributed sample into a scanner housing (FIG. 15B). As diagrammatically illustrated in FIG. 11B, scanner 157 can be programmed to zoom in on discrete areas of the surface of filter paper 116. Static images of each such block 117, (1, 2, . . . , x) (for example 323 across the surface), one at a time, to enhance resolution of shapes for pattern recognition.

A sample on filter paper (step 151 of FIG. 15A) follows a scan sequence of a block at a time (step 152) storage of each block image (step 153) and continue until all 323 blocks have been imaged.

By appropriate pre-programming, image recognition software 158 (FIG. 15B) would evaluate each block for pre-programmed patterns indicative of SCN eggs. For each pattern recognition, a count would be incremented (steps 154A and B).

Pattern recognition would proceed for all blocks and, once complete, a final cumulative count is stored (step 155).

As diagrammatically illustrated in simplified fashion in FIG. 15B, pattern recognition techniques would allow differentiation of SCN eggs E1, E2, . . . En, from other particles or materials, denoted as debris D1, D2, . . . Dm. See reference number 159 in FIG. 15B. Parameters for shape or pattern recognition for SCN eggs can be based on criteria selected by the designer. Examples are size, shape, contour and color. Others are, of course, possible.

In this example, the filter paper is placed on the scanning bed or surface of the static imaging device 157 (e.g. an Epson Perfection V.750 Pro Set table top scale scanner from Epson America, Inc. of Long Beach, Calif. (USA), and set at 4800 DPI resolution). It is noted that quantification all the way back to the raw sample is enhanced by this process. Each step attempts to advance all of the eggs from the sample. In contrast, some state-of-the-art techniques extract a small fraction of a sample (10% or so) and then attempt to visually count eggs on a microscope counting slide in that fraction. As can be appreciated, this risks substantial error in the count. The 10% fraction may not be representative of the true number of eggs in the raw sample It also requires extrapolating that count from the 10% fraction to get to a total count. This can materially hurt accuracy. The 10% count may not be reliable for extrapolation for the whole sample.

Utilization of OptiPrep™ Density Gradient Medium (Product #D1556 from Millipore Sigma, St. Louis, Mo. (USA) or other density gradient chemicals (e.g. sucrose) as the suspending fluid is an option.

Conversely, it has been found that centrifuging does not necessarily move all eggs to middle stratus 112. FIG. 13 shows the at least most of the residual approximately 20% of the eggs are distributed in the bottom stratus 113. FIG. 13 indicates almost no eggs are recovered from the top stratus 111. Utilization of OPTIPREP solution, however, promotes recovery rates. The designer would balance the cost and need for this solution for improved egg recovery ratio.

FIGS. 14A-D illustrate in graphs 140A-D, for one exemplary embodiment, proof of concept of counting by static digital image recognition technique 102 relative to manual counts. It is to be understood that final egg count estimations can be valuable even if there is some margin of error. As will be appreciated by those skilled in the art, at least for SCN infestations, absolute quantification of eggs is not required. Rather it is whether or not estimated egg count falls within certain ranges per volume soil sample.

In particular, the table below indicates an example of those ranges. It can be seen that even with some margin and error of quantification estimation of SCN eggs from a sample, it is likely to be precise enough to fit one of these infestation levels.

| Infestation level | Range of SCN eggs per volume soil sample | Yield Loss |
|---|---|---|
| Moderate | 2,000-5,000 SCN eggs/100 cc of soil | 16-18 bu/acre |
| Severe | >10,000 SCN eggs/100 cc of soil | 50% loss |

FIGS. 14A-D suggest how quantification estimates might be improved. But egg counts only need to be sufficiently reliable to classify into one of the infestation levels in the chart above. This allows the designer some margin of error which can influence cost, resource allocation, time, and complexity factors. The designer can balance the same and it may well be sufficient to save such resources and still have results which are acceptable.

As will be appreciated, by reference to FIG. 1B and FIGS. 14A-D, SCN eggs have an oblate plan view shape. Optionally, an appropriate stain can be added to the eggs on or before distributing them on filter paper 116. Such stain would be taken up only by the eggs. This can help differentiate the eggs from other similar shaped objects or artifacts that do not take up the stain.

As is well developed in image recognition technology, even at the small scale of nematode eggs, pixel resolution is such that even a non-regular shape can be programmed for recognition with good recognition correlation to the object of interest. One non-limiting example of image recognition software uses Python programming language 2.7. See, e.g., https://pythonprogramming.net/image-recognition-python/. FIGS. 14A-D show proof of concept from testing of this technique relative to manual counting.

Adding in the 20% compensation factor discussed above gets to a final count for the known volume of raw starting soil sample. This can be correlated to an SCN infestation sub-range (see chart above) and to the field location from where the sample was taken. This can be used to inform decisions as to any remedial action.

FIGS. 16A-D illustrate aspects of such static imaging. As can be appreciated in FIG. 16A, at least between SCN eggs 14, nematodes 16, and cysts 12, there are differences in the form factors in 2-D images of the same. These can inform the parameters to be programmed for differentiating eggs from both debris and from nematodes and cysts. Zooming in on small subsection blocks of the sample on filter paper assists in that differentiation.

Figure 16A:
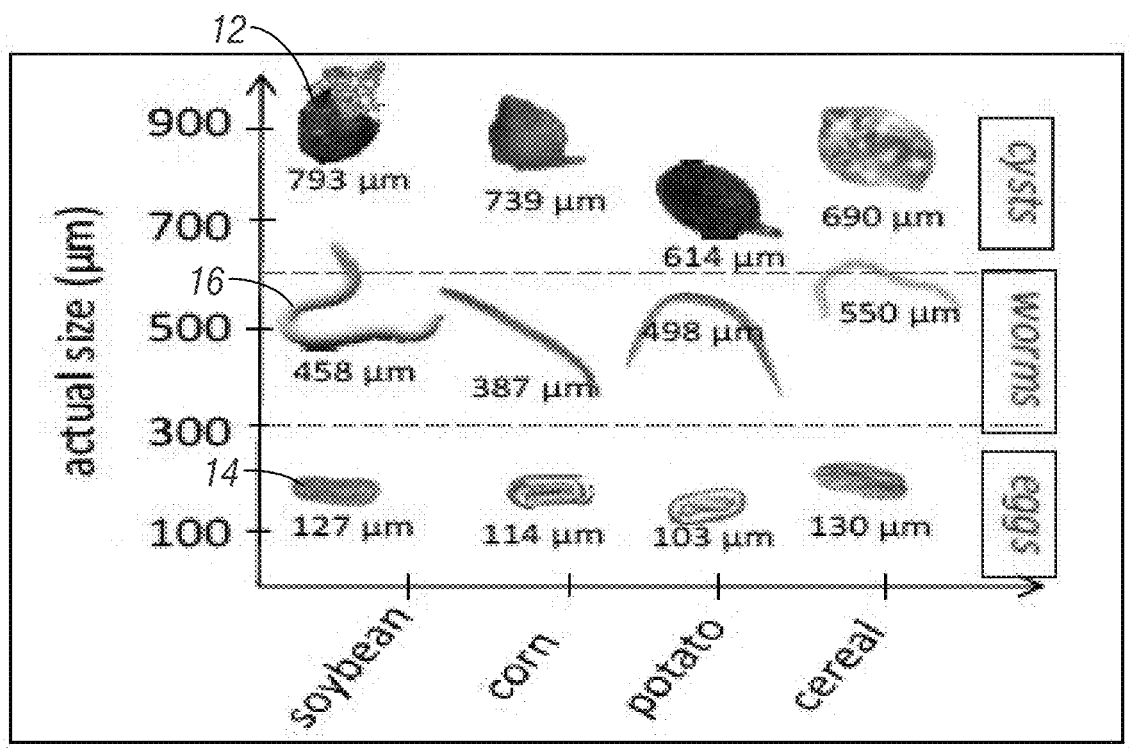
FIGS. 16A-D are illustrations and color photos showing shapes that are typical regarding SCN life stages and techniques for sample preparation for imaging and counting with image recognition software technique of FIGS. 15A-B.
Figure 16B:
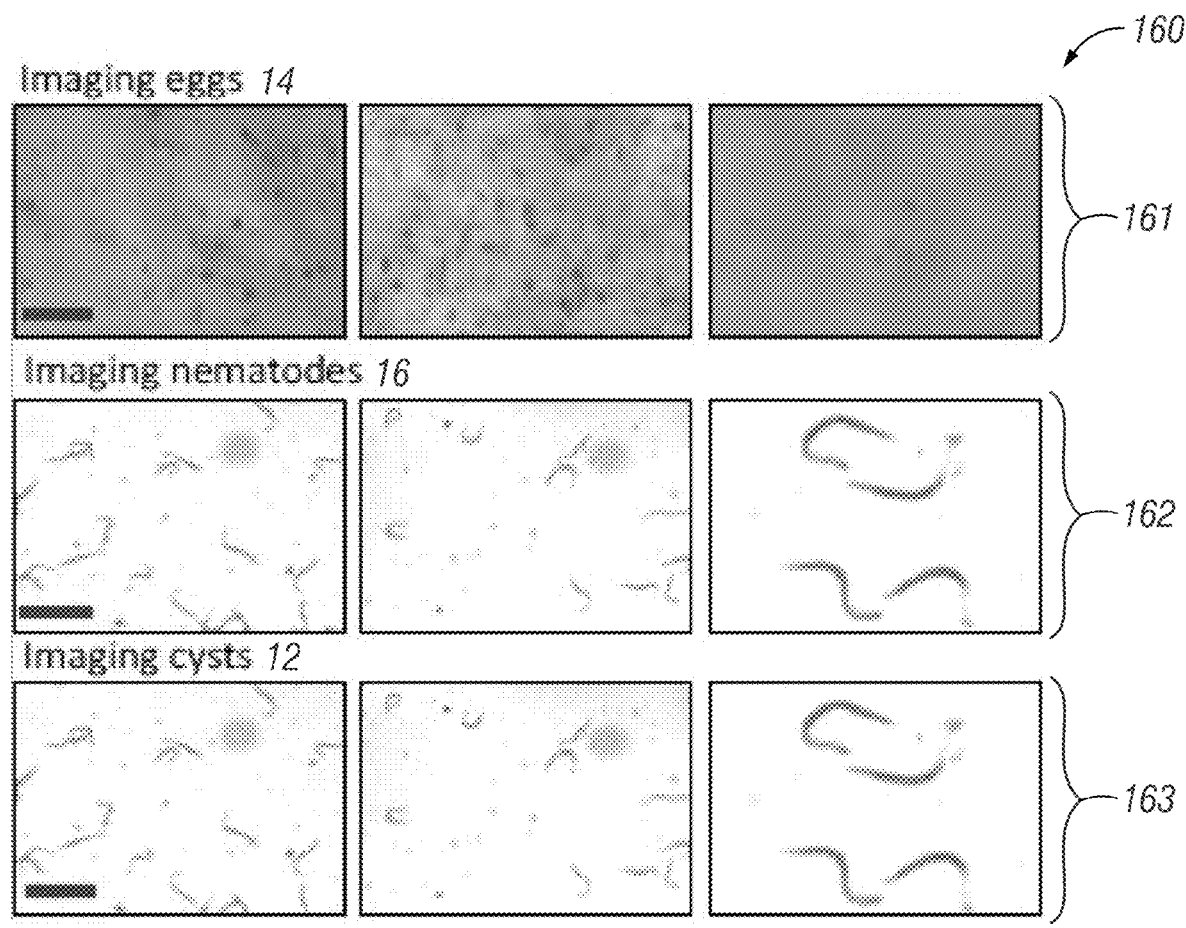

FIG. 16B gives information about these types of differences in form factors relative to several different types of nematodes by showing actual magnified images 160 of eggs 14 (images 161), nematodes 16 (images 162), and cysts 12 (images 163). It is to be understood that these image recognition differentiation techniques can apply to any of them. Further, they can be applied to other objects of interest that can be differentiated from other objects in the typical sample.

Figure 16C:
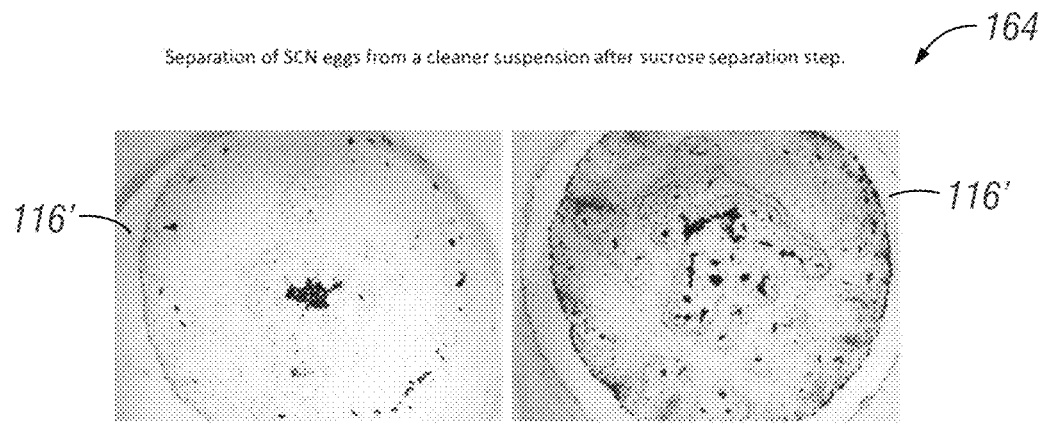

FIG. 16C illustrates at photo 164 that separation of eggs 14 on filter paper 116' can be enhanced with density separation.

Figure 16D:

FIG. 16D illustrates at photo 165 how a GFP (green fluorescent protein) and white light illumination on filter 116 can enhance imaging recognition.

3. Counting by Lens-Free Imaging of Flowing Sample (FIGS. 10, 17-19)

An alternative quantification technique is shown at 104 of FIG. 10.

a. Functions

Alternative imaging technique 104 of FIG. 10 has the following advantages. It is cost-effective because instead of using lens-based imagers like a large expensive digital scanner, a relatively inexpensive lens-free CMOS can be used to acquire video of a flowing sample including the objects of interest. Although this presents some challenges regarding image recognition, it can also be scaled down to lab-on-a-chip size.

Secondly, it can promote further automation by utilizing such things as microfluidic techniques. A starting sample solution can be added to a flow through a microfluidic channel. The CMOS can video a flow (e.g. 1-2 mL/hr at 1 frame/sec for approx. 1 hr.) that contains the entire sample. Image reconstruction of the lens-free video can be used for pattern recognition to identify objects of interest in the flow. It also presents the ability for high-throughput, parallel processing of multiple samples for quantification at one time.

b. Apparatus and Technique

Figure 17A:
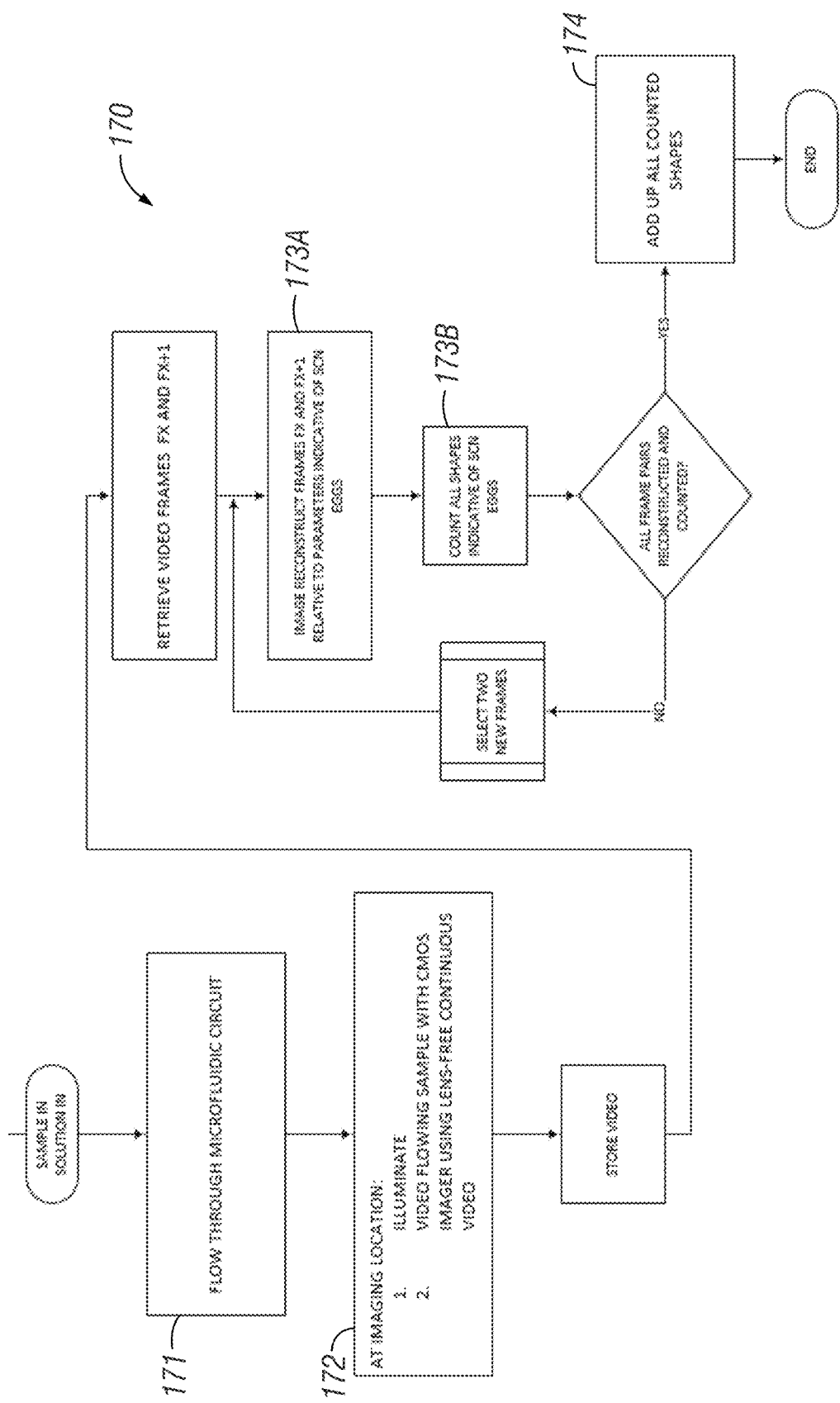
FIG. 17A is a flowchart depiction of an alternative technique of SCN egg quantification in FIG. 10, namely use of microfluidics and lens-less video imaging capture of flowing eggs in solution with an illumination source for diffraction-based image reconstruction and object-of-interest identification.

FIG. 10 at 104 sets forth the basic methodology. FIGS. 17A and B illustrate one non-limiting example of method 170 and a basic set up 175.

A microfluidic combination 175 includes a microfluidic chip 176 with a flow channel. Sample and solution can be flowed past an imaging location for a lens-free CMOS 177 right at the chip 176 (step 171, FIG. 17A). A light source and a technique such as described in U.S. Pat. No. 9,110,240, issued Aug. 18, 2015, entitled "Phase Gratings with Odd Symmetry for High-Resolution Lensed and Lensless Optical Sensing", shows how such a configuration can acquire a video and reconstruct it for reliable pattern recognition. U.S. Pat. No. 9,110,240 is incorporated by reference herein.

As explained in U.S. Pat. No. 9,110,240, by appropriate programming, even though the lens-free CMOS 177 acquires interference-pattern-type images (step 172) which render objects like SCN eggs unintelligible to the human eye, the techniques discussed within the patent describe how such images can be essentially reconstructed (step 173A) to resolve particles of interest. Alternatively, it can use pattern recognition of the Talbot shapes directly. It can computationally reconstruct the Talbot-effect images to more like actual shapes and apply pattern-recognition to count.

Figure 17B:
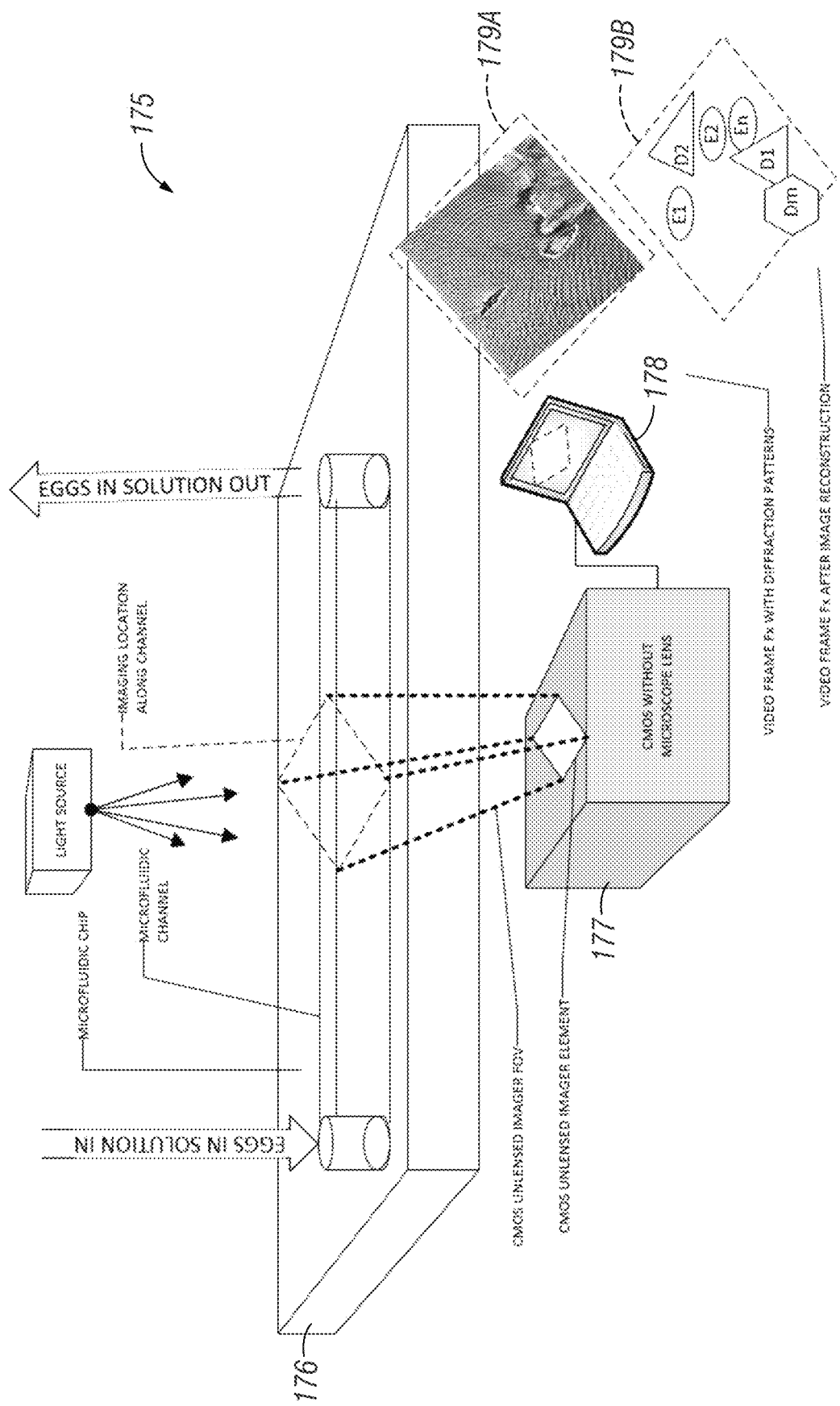
FIG. 17B is a diagram of one hardware set up for the technique of FIG. 17A.

As illustrated diagrammatically in FIG. 17B, the software and computer 178 evaluates the lens-free images 179A and reconstructs them in a manner similar to scanner imaging, pattern recognition to differentiate eggs E1, E2 . . . , En from debris D1, D2 . . . , Dm is possible. See 179B in FIG. 17B.

FIG. 17A in combination with FIGS. 18A-D show features using this technique 180.

Instead of just evaluating the video one frame at a time, in this embodiment the video is evaluated in adjacent pairs of frames. As diagrammatically illustrated in FIGS. 18A-B, a starting frame one (180A of FIG. 18A) may have no eggs or debris. Its next frame two, 180B of FIG. 18B, may have both. It has been found that comparing adjacent video frames can enhance the image reconstruction for less false positives based on pattern recognition. As shown in 180C and D of FIGS. 18C and D, the flowing sample solution can have subtle differences between adjacent frames to help that differentiation.

Each pair of frames is evaluated and item of interest counts incremented, see step 173B of FIG. 17A, until a final count, step 174, for the sample is derived.

c. Features

The software will look for matches by both pre-programmed pattern recognition parameters and comparison of the two video frames.

In this example, because such processing can occur any time of the day, flow rate is set at approximately 1 mL per hour and video rate at one frame per second. The software essentially has two close-in-time views. This can help confirm an identification. If the pairs do not match the preprogrammed parameters, they are ignored.

This method can take advantage of the density separation technique of FIG. 11A.

With the low cost of digital memory presently, a video of an entire sample flow is both possible and relatively inexpensive.

4. Operation (FIGS. 18A and B)

Figure 18A:
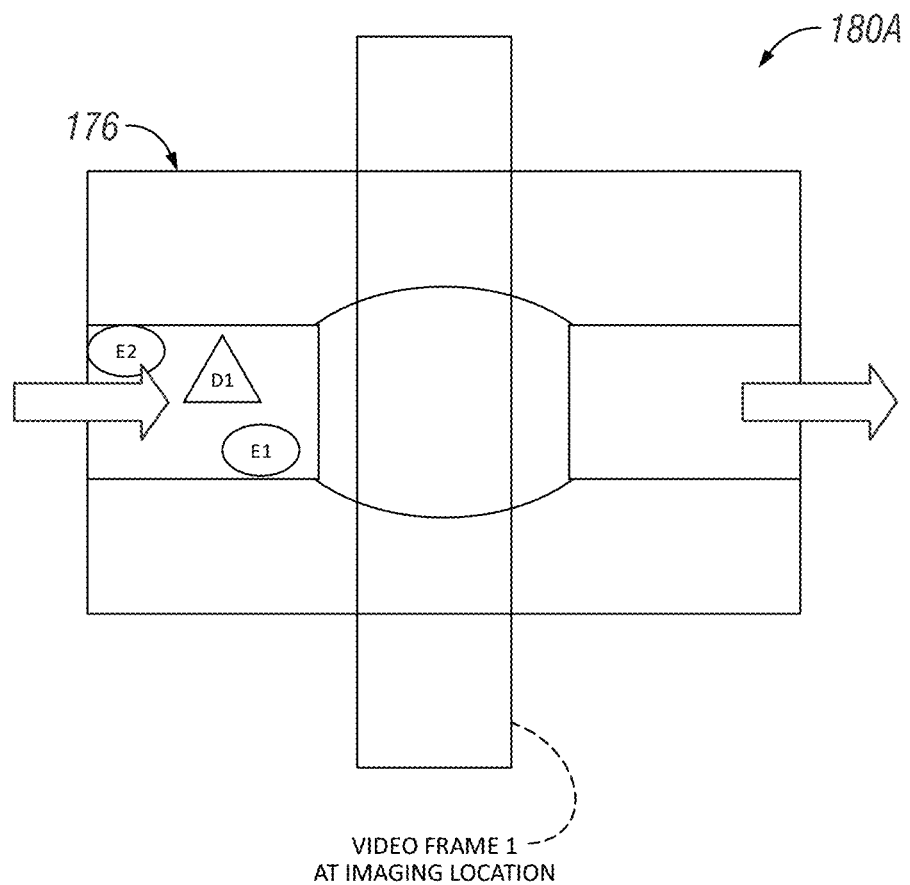
FIGS. 18A-D are simplified and highly diagrammatic illustrations of video capture with the technique of FIGS. 17A-B to obtain a count of SCN eggs in a flowing sample solution.
Figure 18B:
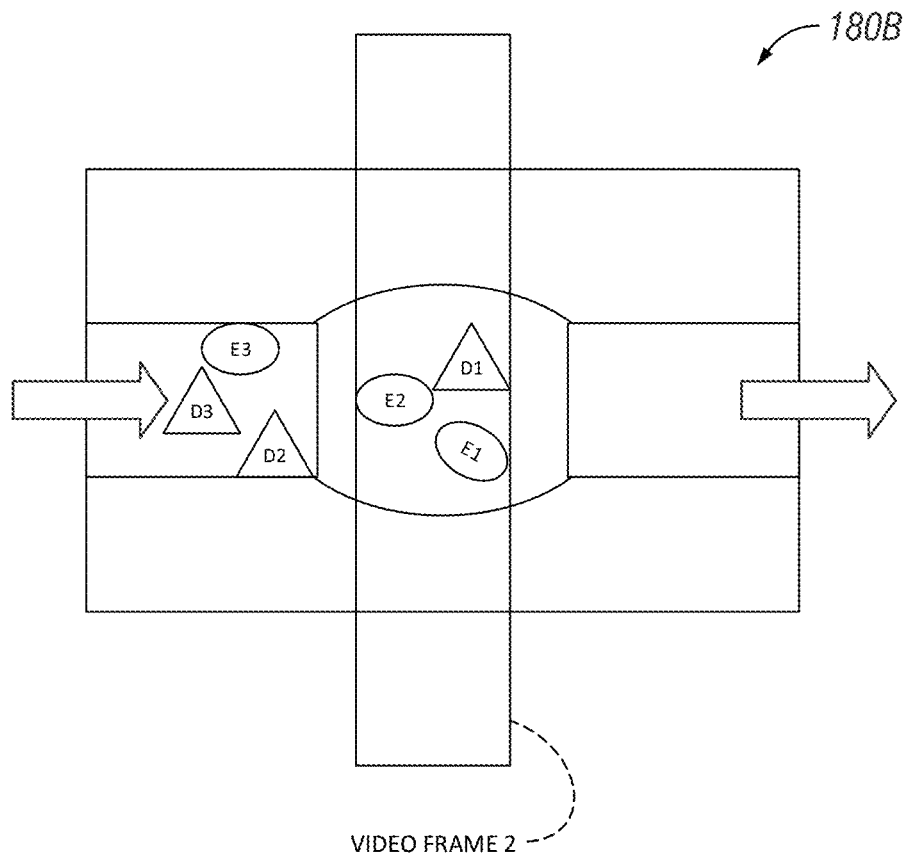
Figure 18C:
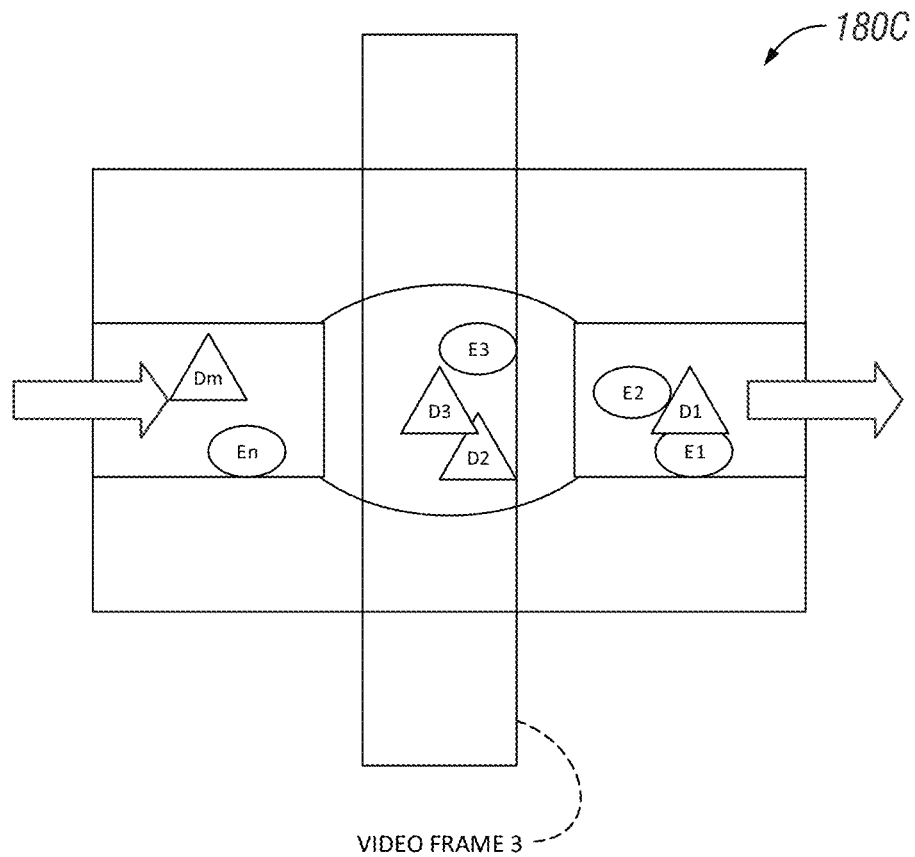
Figure 18D:
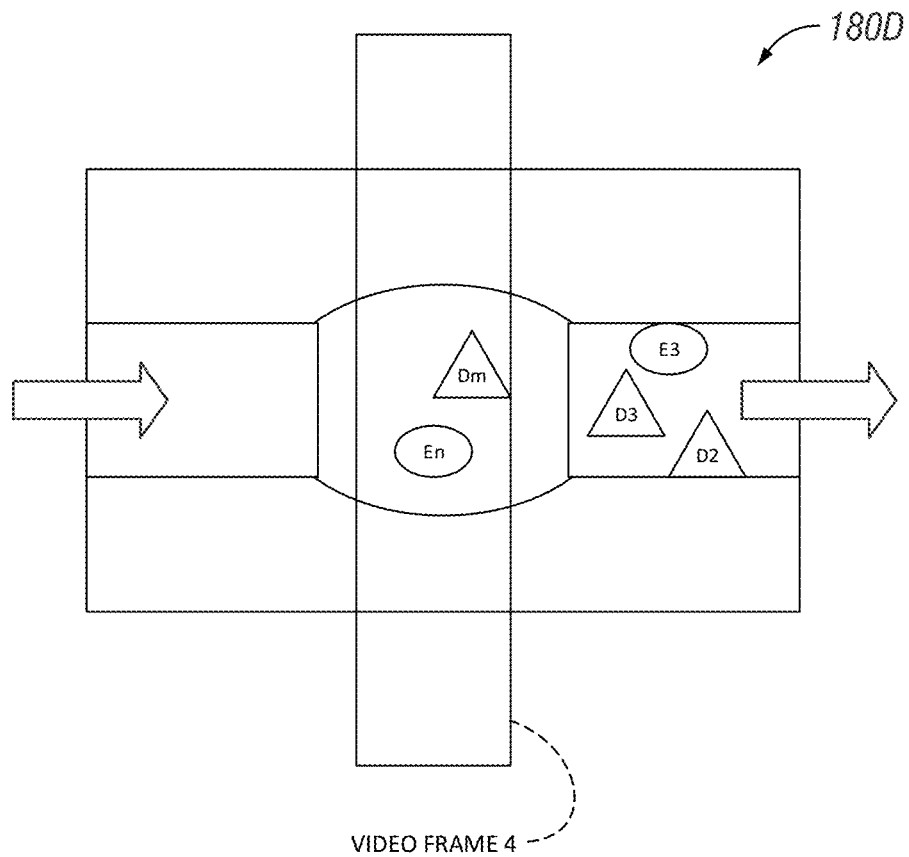

The pair of frames obtained at the times in FIGS. 18A and B could be evaluated by image reconstruction software. By a priori methods, the designer/programmer would provide the software with parameters to identify patterns in the reconstructed frames indicative of SCN eggs as opposed to non-egg particles. The software would therefore essentially convert the blurred Talbot patterns into representations close to actual optical images to differentiate (a type of image reconstruction). Each pattern identified as an SCN egg would be added to a count. The loop is repeated for a next pair of video frames until done.

See for example FIG. 18A at E1, E2, E3, . . . En. By comparing two adjacent frames of the video, step 274, and with pre-programmed parameters, the software differentiates SCN eggs from non-eggs. As diagrammatically illustrated in FIG. 18A, the image reconstruction identifies the blurred Talbot patterns (e.g. 179A) as indicative of an SCN egg and counts each. If the patterns do not match the preprogrammed parameters, they are ignored. A comparison repeats for all the video frame pairs and a count is accumulated.

Figure 19:
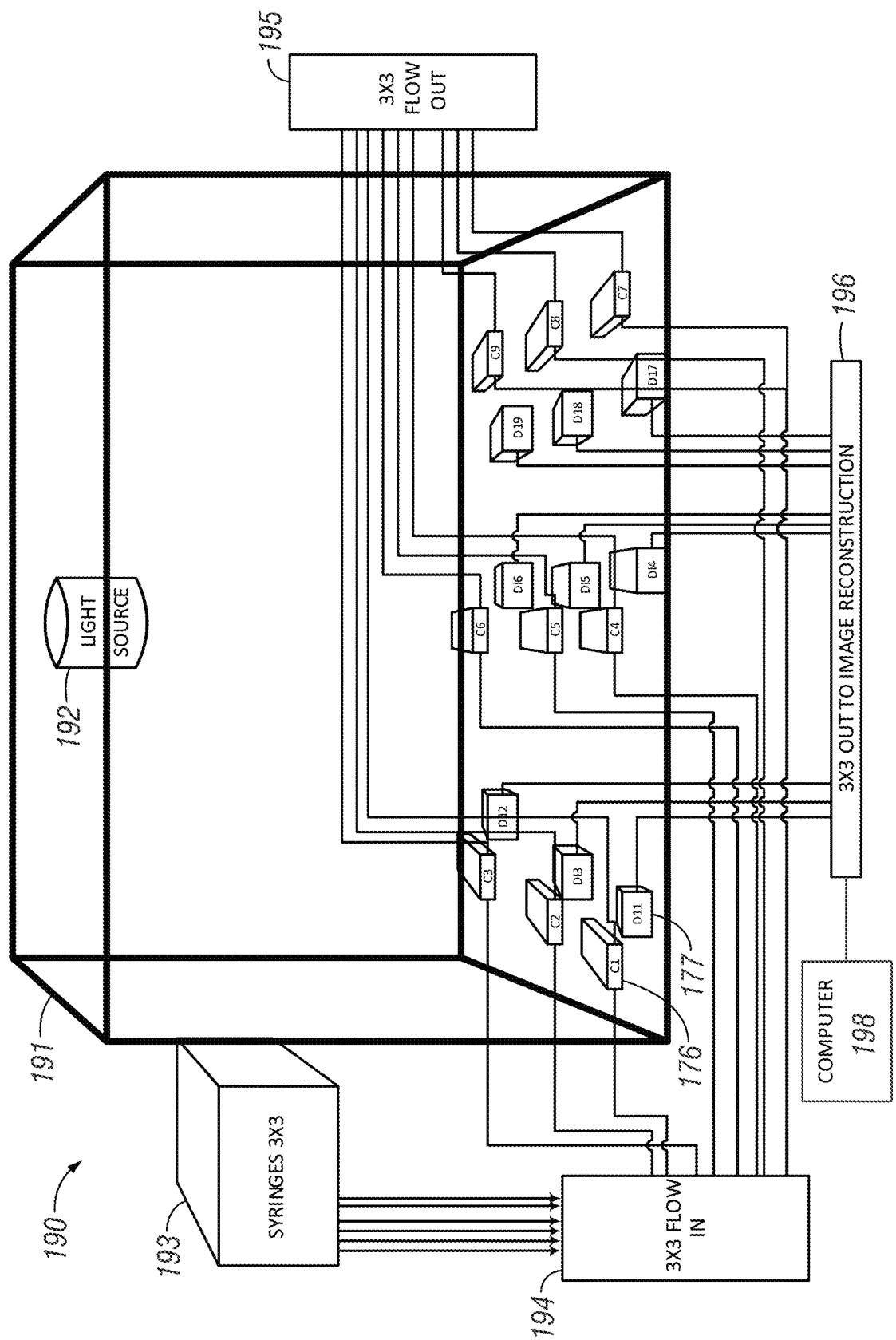
FIG. 19 is a diagram of an automated sample parallel-processing option according to another example of the invention.

As diagrammatically illustrated at FIGS. 18A-D, one frame per second for approximately 2 hours at 1 mL flow per hour can be done any time after extraction and at any time of the day in an automated fashion to produce the final quantification. That quantification can then be used as described above for intelligence or about level of SCN infestation in the starting raw sample.

a) Optional High-Throughput Parallel Processing (FIG. 19)

FIG. 19 diagrammatically illustrates that this microfluidic technique could be expanded to allow high-throughput parallel processing of multiple samples. As indicated, a system 190 could have a relatively small (tabletop) housing 191. Inside could be a plurality of chips 176 (C1, C2, . . . ). Here, only for illustration purposes, is shown a 3×3 array, but it could be scaled up or down. Utilization of relatively low cost and small form factor lens-free CMOS chips 177 (or D1, D2, . . . ) (or similar photodetector-based arrays, e.g. CCD with a diffraction grating layer to top) with well-known microfluidic technology, would allow cost-effective small scale, parallel processing. Using well-known micro sampling techniques, multiple sample solutions can be, in parallel, introduced to system 190. For example, a corresponding 3×3 syringe array 193 could take solution from strata 112 of a 3×3 array of density-separated solutions in vials 110 and, in parallel introduce them to separate chips 176 at inputs 194 and flow them through each chip 176 as described above to a parallel output header 195.

CMOS lensless sensors are relatively inexpensive, solid state, of small form factor, and have no focal length (so can be positioned at the flow). With inexpensive digital storage and processing power of even standard laptops or microprocessors, in-parallel image reconstruction and/or recognition (with illumination 192), as described above, could take place from parallel outputs 196 to a computer system 198. Thus, parallel, high-throughput automated quantification could occur.

A further option that could be used to count SCN eggs would be laser flow cytometry, as is well known in the art. However, this tends to be much more expensive.

5. Operational Features of Extraction and Quantification in Specific Example 1

It can be seen that the specific example described above meets at least one or more of the objectives of the invention. In combination, extraction station 28 with quantification station 29 (FIG. 2B), as controlled by hardware/software 80, combines into a system that provides a number of benefits that can improve this area of technology.

For example, it is not trivial how to extract minute eggs from a raw soil sample where most of the eggs are encapsulated in a nematode cyst or in a dead female. Many conventional SCN counting techniques do a number of pre-processing purification steps to try to remove impurities.

Again, a subtle benefit of exemplary embodiment 1 is a soil sample that is basically simply suspended in a quantity of water can be quickly obtained and submitted to system without time and resource-consuming pre-processing steps.

By further example, there are variations in soil throughout the world. A subtle benefit of Embodiment 1 is the ability for an automated extraction of objects of interest that are entrained in a variety of different raw sample mixtures. For example, a variety of soil types, textures, contents and the like can be accommodated by simply adjusted (if needed) the number of sieves, the pore sizes of the selected sieves, and other variations because of that ability to substitute parts or operations and the multiple degree of freedom of the sieves allowed by station 28. For example, extraction of small objects of interests other than SCN eggs could demand such variations. But even regarding nematode infestation, as suggested in specific example 1, the system might be used to simply extract and count cysts instead of eggs. This would eliminate the grinding step. By further example, the system might simply try to extract any of cysts, eggs, or worms and quantify any or all relative to some range of reference values.

Another subtlety is repeatability and precision. Utilizing one or more of sieving steps, use of fluid by gravity or by pressurization, shaking or vibrating, or other features available with extraction station 28, repeatability within acceptable accuracy and precision for different number of samples or different types of samples is possible. This includes the subtlety of not only relying on gravity to move the sample through the sieves, but also washing action at first sieve #20 (and others if desired), to promote filtering of as much of the original soil sample as possible. This promotes higher precision and accuracy of the final count estimate by trying to ensure that all relevant particles are being sieved and not left behind such as on the sieve sidewall or surface.

Likewise, on quantification, subtle benefits are possible with quantification station 26. It has been found that with a relatively quick and non-complex processing step (centrifuge or shaker table for density separation of SCN eggs from other particles suspended in water), a consistent, repeatable major fraction of SCN eggs can be presented for automated counting, which can help accuracy and precision of the automated quantification methods.

Furthermore, even after extraction through extraction station 20, it is not trivial as to how to automate a count of the minute SCN eggs. Embodiment 1 promotes effective results with digital imaging. One technique is static imaging. Another uses video of a flowing sample. Both have been shown to provide quantification results within the needed range of accuracy for classifying the original soil sample relative to severity of SCN infestation, if any.

While optimization of count can be a goal through trial and error and other techniques, the subtle aspect described above allows some margin of error in a final count, as to be effective it must just allow a classification not absolute measurement.

F. Options and Alternatives

As mentioned, the invention and its aspects can take many forms and embodiments. Variations obvious to those skilled in the art will be included within the invention.

The invention and its aspects can also include certain options or alternatives. A few examples will be discussed below.

a) Form Factor

The size, configuration, make and model, and other aspects of the embodiments can vary according to need or desire of the designer. For example, the system with extraction, collection, and quantification stations can be integrated as a table-top version or a room-sized version. On the other hand, stations could be stand-alone or modular and have interoperability.

As can be appreciated, the form factor will depend on a variety of factors. Non-limiting examples include which functions will be enabled, what items of interest and samples will be processed, and the like.

b) Scaling

Another aspect of scaling is how much throughput is desired. For example, in one form, a conveyor sub-system could be configured to supply on a continuous basis pre-prepared multiple samples. This could be a substantially sized conveyor belt or other conveying apparatus.

Likewise, the extraction station turntable could be scaled up or down according to need or desire. This could include more levels, more spaces per level, and diameter of levels. For example, a larger diameter level may allow more room for actuators or other components to be placed on the turntable.

FIG. 19 gives one non-limiting example of high-throughput parallel processing of samples.

c) Base/Housing

A vibratory base might be used to vibrate the sieves. An alternative is to either have a vibrational actuator at the turntable or, possibly preferably, have it as another station.

In one example, a separate station could be comprised of a sieve vibrator (e.g. a mount with a sieve receiver and direct mount vibrator). The robotic arm could move any sieve to that station and impart vibration to the sieve, and then return the sieve to the turntable. The sieve vibrator can be employed to direct particles of interest from one sieve to another or combined with the rinsing step to clean a sieve.

Otherwise, a variety of bases or housing for the overall system or sections therefore can be designed as needed or desired.

d) Starting Sample

As discussed above, the starting samples can vary according to need or desire. One example discussed regarding soil or feces samples is dilution of the soil or feces sample core with water (or other diluter).

(1) Type

As will be appreciated, the system and method of the invention can be applied to a variety of samples and items of interest. Non-limiting examples include soil or feces samples consisting of plant-parasitic and animal-parasitic nematodes and their eggs and cysts, beneficial nematodes and their eggs and cysts, weed seeds, fungal spores, and eggs of insects. The system can be used to quantify the composition of the soil or feces sample, including mineral particles, chemical composition, water, air, and organic matter. Mineral particles such as clay, sand, gravel, and silt can be extracted by the system.

By varying the pore size of the sieves used and the timing and water flow volume of the process, the invention can be used to extract other nematodes—both parasitic and beneficial—as well as other soil microfauna (mites, insects for example) as well as weed seeds and fungal spores. Thus, the invention could facilitate research on a wide range of biological organisms, including research related to soil ecology and pest management.

(2) Items of Interest

Aspects of the invention can be applied not only to nematodes, in whatever stage of development. Likewise, aspects can be applied to other parasitic pests. Aspects may be relevant to other biological particles.

One example is extraction of live nematodes and their eggs and cysts and their quantification in causing plant diseases. A demand exists to provide quantified numbers for research purposes.

Another example is perhaps extracting and quantifying physical and chemical constituent parts of soil or feces. Soil typically is made of part sand, part silt, and part clay. Processes analogous to nematode processing could be used to separate those constituent's parts and quantify one for purposes of automatically or semi-automatically estimating those parts to assist an agricultural producer in making decisions about farming that soil.

Another example is extraction of nematodes and their eggs from feces or stool of farm animals and humans to estimate the nematode or other organism population density in the animal or human.

Non-limiting examples of insect eggs and larvae include Japanese beetle, European Corn Borer, and Western Root Worm.

Preparation of a feces sample would be similar to a soil sample. It would be mixed with a quantity of water (or other dilutant).

e) Sample Identification (1) Source

A variety of ways can be used to maintain identification of each sample through the system. One example is marking each sample container with a distinguishable or unique identifier (e.g. alphanumeric) and then translating a unique identifier to a collection container. Information associated with the unique identifier can then allow correlation to the source of the sample (field, farmer, client, etc.).

(2) Spatial

As can further be appreciated, the unique identifier can allow correlation with a wide variety of information or data relevant to the sample, the source of the sample, or other. By digital association, a database or other data source can include data about where the sample came from (spatial information), when the sample was taken (temporal information), who the sample related to (customer, client, etc.), and what is/are the items of interest in the sample (nematodes, eggs, cysts). There is no significant limitation on what associated information is possible. It could also include soil type, type and stage of nematode of interest, historical and geographical properties of the soil, or other specific parameters, characteristics, or instructions relative the process.

It will be understood that a number of ways exist to track and maintain identity of each sample through any parts of the processing. One example is bar codes on sample containers and sieves at the input station. The controller or other intelligent devices could track the sample through any of the other stations by means of knowing or sensing the time of each processing step. Once processing is complete and the items of interest extracted from the sample into an output container, a bar code on that output container can be correlated to the bar code on the appropriate input container to maintain correlation.

Other machine-readable methods are possible. RFID tags are both readable and writeable. They also can be read from or written to with stand-off near-field wireless transmissions. Depending on make-up and power capabilities, such stand-off distance can be quite close (e.g. millimeters) but could be meters. The technical field of processing biological samples is quite mature and techniques from it can be used or modified here. Some examples can be seen at U.S. Pat. Nos. 5,526,705; 6,202,829; and US 2004/0005714A1 (each of which is incorporated by reference herein in its entirety), which also speak to such things as liquid handling, conveying sample holders and vessels, and other automation techniques that might be applied to the present embodiments.

f) Input Function/State/Station

The ability to automate input to the system can take a number of forms. The biological sample technological art is quite advanced and includes a variety of mechanized automated systems for such things as moving multiple samples through one or more processes.

For example, U.S. Pat. Nos. 5,526,705; 6,202,829; and US 2004/0005714A1 describe conveyors, well plates, automated XYX positioners, liquid handlers, and the like. Concepts like these can be utilized with aspects of the present invention.

g) Output Function/State/Station

Similarly, a variety of automated components and techniques could be used with aspects of the invention. U.S. Pat. No. 5,526,705 gives some examples. Again, once collected, items of interest can be moved to a quantification station. Also, U.S. Pat. No. 5,526,705 gives examples of how identification of multiple samples can be maintained. Non-limiting examples include bar codes, RFID tags or other machine-readable techniques.

h) Intermediate Functions/States/Stations

An optional station of sieve stacks can be maintained where sieves are stored based on their operational property (e.g. clean or dirty) and mesh sizes. Individual sieves in the sieve stacks is accessible by the gripper and turntable for various system functions.

(1) Extraction

The exemplary embodiments focus on sieving to extract items of interest.

(a) Separation/sieving

It will be appreciated that variations are possible with the sieving examples. Non-limiting examples are the types, physical shape and size, and mesh sizes of the sieves. They would, of course, vary depending on the item of interest to be extracted.

The number of stages of sieving can also vary. This includes that sometimes it may be indicated to desirable to repeat at least once the sieving for a single sieve. This can improve the likelihood of accurate extraction.

(b) Sieves

The sieves can vary but there are benefits to having each the same form factor so such things as the gripper and the receivers in the turntable work with any sieve and its screen size. Additionally, a similar form factor but with a solid impermeable bottom could be used as the sample input container or the sample output container from the extraction station so the gripper is readily adapted to grab, move, and tip those containers.

An option for the gripper could be an inflatable air or pneumatic bladder. Also, rubber could be placed on the inside surfaces of the gripper jaws for cushioning and grippability.

The form factor of the sieves allows them to be stacked on one another. This might be used when cleaning or even during such processes as sieving and grinding instead of having them on separate stage levels.

Options for cleaning sieves after use include use of the washing tool 52. Alternatively, gripper could move a sieve into an ultrasonic bath. A still further option would be an air/gas or water station dedicated to cleaning, over and above, the availability of washing tool 52.

Options for enhancing sieving and washing action include vibration. Another possibility would be utilization of pressurized fluids or vacuum to help draw the material through the sieves faster. This would likely involve a hood like that of washing tool 52, inverted and brought by gripper 56 underneath the sieve, and then vacuum applied to its interior.

(c) Washing/Rinsing

There can be different configurations for/washing rinsing. Embodiment 1 has washing tool 52. By appropriate control of valving of a pressurized water source, the system could spray a sieve from above or below or both. And this could include when a sieve is tipped by the gripper.

An alternative could be a single ring-shaped rinsing head at the turntable or sieves which could be moved by the gripper to such a rinsing head at its own station. The ring could be sized to be complementary to the diameter of a sieve. In particular, it can be designed to create a ring-like spray pattern focused on rinsing the sidewalls of the whole sieve to promote all matter captured by the sieve to be brought to the mesh of the sieve. This promotes accuracy because it deters relevant matter being left on the sieve walls.

i) Sprayer System

One can spray from below, the other from above. A controllable water supply can be routed to nozzles or sprayers at those locations. A controller can actuate the timing, pressure, sequence, etc. of spraying in coordination with other process steps.

As will be appreciated, different configurations of sprayers are possible. Also, the sprayer could be used to wash/clean a sieve after use to prepare it for reuse. This could be on the turntable in a controlled, known position. Alternatively, the gripper could take any sieve out to a separate rinsing/washing station.

Still further it can be appreciated that a washing tool can be brought over a sieve in any orientation whether the sieve is basically horizontal, tipped from horizontal, or even upside down.

j) Moving

One example of a controllable means to move things around the system is the gripper of Embodiment 1. As will be appreciated by those of technical skill in this art, alternatives are possible. U.S. Pat. No. 5,526,705 shows some.

k) Gripper

FIGS. 5A-E show a gripper with two fingers that converge to grip. It has been discovered that it can be advantageous to have the inside edges of each finger to have undulations. This has been found to better effectively grip such sieves. It tends to consistently center the sieve in the gripper for more accurate placement as the sieve is moved between turntable positions or other stations. Their size and form factor can be appreciated relative to a sieve of the type discussed previously.

An envisioned possible alternative gripper would be an inflatable cuff or partial cuff (U- or C-shaped). Inflation automatically could inflate a relatively high stiffness fabric or material to achieve good grip on sieves. A pneumatic source would provide the inflation and a release value, automatically controlled, deflation. This could engender also use of pneumatics for other functions, such as rotation of the turntables and movement of sieves to stations. This could be advantageous, particularly in a resource-limited environment where water is scarce. The elimination or reduction of electric motors and electronics regarding them could be beneficial. Such pneumatic motors are known to those skilled in the art. Inflatable cuffs could also be beneficial if different diameter sieves are to be used.

Another alternative to the electromechanical gripper is the option of pneumatic gripper that use compressed air to grasp, hold, and release objects. Other options include electric grippers, linear actuators, pneumatic rotary actuators, and robotic arm tool changers.

l) Timing and Sequencing Control

As will be appreciated, a number of techniques are known regarding how the controller or controllers of the system would accurately control and monitor the various functions and operations of the processing.

One example is use of servo motors or the like with encoded feedback to allow the digital controller, with appropriate calibration, to convert motor position to component position; such as each position on each level of the turntable, vertical position of the gripper, tilted position of the gripper, rotational position of the gripper, and the like. Other or supplemental feedback can include permanent and electro-magnets and magnetic sensors.

Some examples of actuators with feedback or sensing of position are described in U.S. Pat. Nos. 5,526,705; 6,202,829; and US 2004/0005714A1.

m) Automation

Those skilled in the art will appreciate that the whole process of input, extraction, collection, and quantification could be automated. This could allow essentially continuous, round-the-clock sample processing so long as an adequate supply of samples is available. As diagrammatically depicted in the Figures, this could be implemented in a conveyor system that presents samples serially to an input station. Each sample, sequentially, could then be directed through extraction (e.g. one or more sieving steps), collection, and then through quantification (e.g. the collected part of each sample automatically conveyed to an imaging station with uses automatic image recognition software to count and thus quantify items of interest (e.g. eggs, cysts, and/or nematodes).

On the other hand, a semi-automated version is possible where just sub-sets of the processing steps could be automated. For example, workers could manually bring a sample to the input of the extraction station and then allow automatic extraction of items of interest. The extracted items of a sample could then be manually collected (e.g. in a container) and moved to a desired place. Another example is manual input to the extraction station, then automatic extraction and automatic collection. The quantification can be automated where desired sample is loaded in pipette or syringe, spread or flowed on the imaging station, and the image is recorded.

(1) Tilting

The gripper of Embodiment 1 allows movement between turntable levels, movement to other stations, but also tipping of any sieve. This includes 360 degrees rotation if desired. The controller can be programmed to rotate to the extent deemed needed for any of the functions. Normally this would not require 360 degrees. But full rotation may be selected to promote full pouring of contents and/or complete cleaning after use. The rinsing and vibration steps can also be performed during the tilting step to enhance extraction of material or cleaning of sieves.

(2) Grinding/Vibrating

There can be different grinding options. It is to be understood that the material, rpm, and down force of grinding can vary according to need or desire.

For example, with soybean cyst nematodes, it has been discovered that the material used for rubber stoppers in lab flasks or the like can work. And the down force against cysts on a sieve screen and movement to within an appropriate distance spaced from come in contact with the screen surface to adequately promote breakage of the cysts and passage of eggs through the relevant mesh size.

The amount of travel of the grinder head relative the screen surface, rpm, and other parameters (such as time of grinding applied) can be programmed by the designer. Feedback sensors, such as proximity sensors, could be used to limit how close the grinder comes to the mesh screen.

It is to be understood that the grinding and the components to carry it out can vary. The designer would consider not only the form factor, material properties of the grinding surface, as well as downforce, movement, speed, and the like depending on the items of interest.

Attached Faghihi, J. et al., "An Efficient New Device to Release Eggs From *Heterodera glycines*", J. of Nemo. 32(4):411-413 (2000), incorporated by reference herein, is one example of a discussion of this type of grinder head and suggests some of the operational parameters relevant to cyst nematodes. Variations are of course possible.

There could be feedback to the grinder. Examples could be a small force sensor and proximity sensor. Once a calibrated downforce level is sensed, the grinder could be moved back up after a designed period of time, and the sequence can be repeated multiple times. A proximity sensor could sense separation distance between grinder surface and sieve surface and be calibrated for cysts to stop convergence once a certain distance is met.

It is envisioned that grinding might be applied to other forms of nematodes. One example is to grind nematode eggs either after quantification or before. The resulting ground matter could be used in DNA research. One example is to automatically extract eggs, grind them, and conduct DNA testing to automatically determine what species of eggs have been extracted. This could be applied to other matter for molecular diagnostics.

As will be appreciated, vibration might promote extraction. A variety of ways are possible to impart the same. The whole base of the vertical board or frame could be operably linked to a source of vibration (e.g. a rotary eccentric motor). Water spray has been shown to prevent particles from accumulating on the sidewalls of sieves during the grinding step.

Another example is a separate vibration station. The gripper could take a sieve to a receiver (e.g. wood with aperture to receive and hold a sieve. A vibration motor linked to the wood receiver could be operated for a designed time, vibrations/sec, and magnitude.

n) Collection

An enhancement to the collection step is to use filter paper 116 (FIG. 11B). It can be a relatively small piece (e.g. 47 mm in diameter) of filter paper (e.g. 0.45 micrometer pore size). Other sheet material (e.g. plastic) can be used.

The sheet (e.g. filter paper 116) with extracted material (usually a combination of not only items of interest but other matter that is caught on the sieve screen) can be moved to a rotary platform shaker. It has been found that 100-220 rpm for 20-30 minutes influences most nematode eggs towards the center of the sheet and other matter towards the perimeter of the sheet. As such, this helps collect the truly relevant items of interest at the center. The eggs in the center tend to be in a single two-dimensional layer.

It has been found beneficial with the filter fabric of 116 to also apply heat (e.g. approx. 30 degrees Celsius) while on the shaker. It is believed this regulates the rate of evaporation of water, which is typically with the matter, in a manner that promotes this separation of eggs to the middle and other matter to the outside.

It is envisioned that alternatively a punch could be automatically bought down on the filter after this separation and be sized to remove only the center section with collected eggs. This could further improve image recognition accuracy and precision.

It is believed some level of hydrophobicity of the filter material or other substrate could promote this process. Additionally, it may be that hydrophobicity can be adjusted beneficially depending on what items of interest are involved. The addition of surfactants (e.g. TWEEN 20) and higher viscosity solutions could enhance the separation of eggs from the other materials during the shaking process. Also, the above method can be repeated multiple times on the same sample or a section of the same sample to improve the egg collection throughput by using multiple membranes sequentially.

(o) Automation sensors

Automation can be enhanced through use of the sensors. Below are some examples.

A proximity sensor (Hall effect) could be utilized with grinder 162 to ensure that grinding pad 162 does not exceed the minimum distance from a sieve screen.

A light sensor could be used to view reflection from a sieve. Through calibration, it could automatically estimate if the sieve is sufficiently cleaned for a next round of use.

A depth sensor could be utilized on microchip 281. This could help differentiate eggs based on that diameter over and above the video imaging. In some cases, eggs in their elongated shape are crossed. A diffraction pattern or blurred image from a lens-free video would look larger than a single egg. That sensor could help conclude it is two eggs crossed over one another.

(p) Quantifying

Imaging and image recognition is becoming an increasingly mature technological art. Attached U.S. Pat. No. 7,123,750 to Lu et al and U.S. Pat. No. 7,830,504 to Deppermann et al, each incorporated by reference herein, provide examples of digital imaging and image recognition. Aspects of those disclosures could be applied here.

Blue tooth, other wireless communication or wired communication could transfer images to a PC or other processor with the image recognition software to generate a count of items of interest.

In the case of nematodes, the PC or other intelligent device (e.g. another computer or processor) could take the count and, by appropriate programming, calculate an estimate of density of the nematodes per unit volume of soil. This can be compared to known information about whether the estimation indicates remedial steps should be taken.

As can be appreciated, quantification can be used for other purposes or with other calculations. As mentioned, automatic quantification might be just to have some level of assurance of estimated count of an item of interest for such things as research purposes. These aspects of the invention are applicable to quantifying a variety of relatively small items of interest.

There are methods of staining that might help imaging and image recognition. These are known in the art. Liquid handling automation such as in U.S. Pat. Nos. 5,526,705; 6,202,829; and US 2004/0005714A1 might facilitate this. Auto-fluorescing techniques are sometimes used. For soybean nematodes, 470 nm light can be beneficial. A light source at this wavelength could be automatically turned on for this purpose by the controller or imaging station. The green fluorescence method, in combination with superimposing white light, has been used to clearly see the eggs in the background of dirt material.

q) Imaging/Image Recognition As will be appreciated, the image recognition art has matured considerably. U.S. Pat. Nos. 7,123,750 and 7,830,504 (incorporated by reference) deal with the same.

These patents give examples of the types of imaging and image recognition that might be utilized with aspects of the present invention. Others are possible.

Several non-limiting examples have been given of how extracted items of interest can be prepared from quantification, including for digital imaging and counting by image recognition software.

As will be appreciated by those skilled in the SCN art, even with appropriate sieving to extract and collect SCN eggs, particles of a similar size and/or shape as SCN eggs might be present. To differentiate them, a green fluorescent protein (GFP) can be used to stain the particles (both SCN eggs and other). Under white light illumination, it has been found that the SCN eggs stained with GFP fluoresce green. Thus, image recognition could be used to differentiate based on color. This can be in addition to distinguishing other particles with shape and size parameters related to SCN eggs, or by itself.

r) Use of Quantification

As mentioned earlier, any quantification with the invention can be used in a variety of ways. In the case of soybean nematodes, density per unit volume soil can help the crop producer decide if and how to remediate for nematode level. The quantification method can be extended to other plant-parasitic nematodes, weed seeds, and fungal spores.

But furthermore, as indicated, aspects of the system can be applicable to other things. One example is for research. There are existing research programs where it is important to collect known quantities of pest organisms, including nematodes, to add to experimental units (such as plants growing in pots in a greenhouse) for research purposes (e.g. to collect inoculum). Aspects of the invention could be used to extract nematodes from a starting sample, quantify them, and thus have a deliverable to researches of a known quantity. The system can be used to quantify the composition of the soil or feces sample, including mineral particles, water, air, and organic matter. Mineral particles such as clay, sand, gravel, and silt can be extracted by the system.

Analogous examples for other items of interest should be obvious to those skilled in the art.

s) Sample Sensing

Figure 20A:
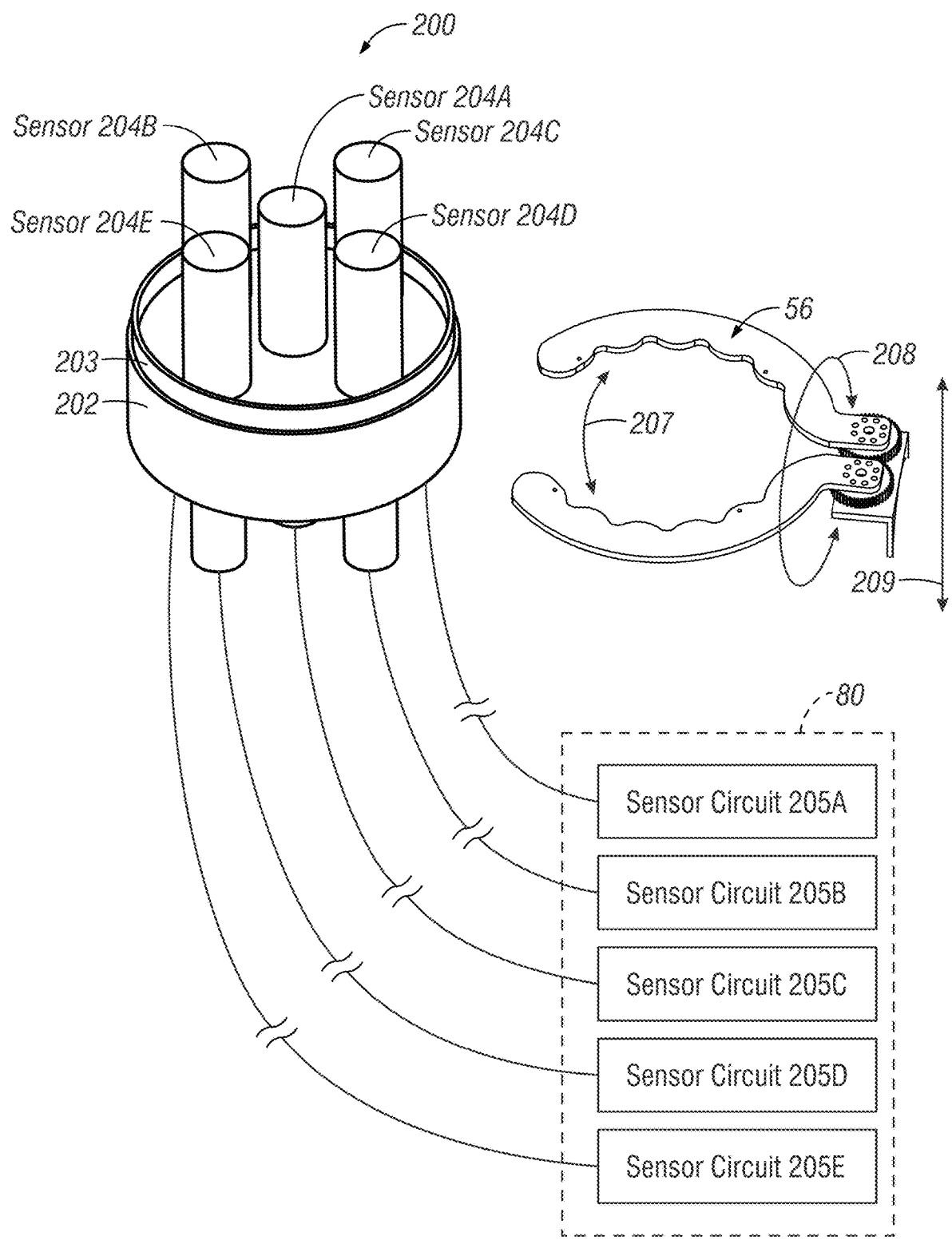
FIGS. 20A and B are perspective and side elevation views, respectively, of an optimal sensor tool that can be used in the other embodiments of the invention.

FIGS. 20A and B show an optional feature that could be utilized with the exemplary embodiments. As discussed above, in the case of extraction instrument 40 (FIGS. 4-9), a variety of sieves of uniform size can be grabbed and moved to different turntable locations. A washing tool can be moved to any sieve on the turntable and moved down to that sieve to spray inside the sieve.

The alternative of FIGS. 20A and B present another tool 200. A housing 200 which is basically similar form factor as a sieve 27 has one or more sensor working ends 204 mounted inside its perimeter. In this example, there are five sensors 204A-E extending out of the plane of a body 202 at lip 203 in the same direction. Electrical connections to associated sensor circuits 205A-E allow electrical communication with sensors 204A-E.

As diagrammatically illustrated in FIG. 20A, gripper tool 56 can open and close (see arrow 207) to grab body 202. It can then be motion control to flip 180° (see arrow 208) as previously described. This would invert the sensor working ends 204A-E to point down. By cooperation of gripper arm 56 and turntable 60, the inverted sensor tool 200 could be aligned over a sieve with sample inside, gripper 56 moved down (see arrow 209) such that the sensing elements 204A-E at least move into contact with or penetrate into the sample. This could include the sample and any water or other fluids present.

By appropriate communication with circuits 205A-E, each sensor 204A-E could be used to measure or transduce a parameter related to the sample.

After a measurement is taken, gripper 56 can remove inverted sensor tool 200 from the sieve and processing of contents of that sieve can continue.

It is to be understood that the multiple degree of freedom of instrument 40 including the gripper tool 56 allows such sensors to be moved to a sample in a sieve at any stage of operation.

Figure 20B:
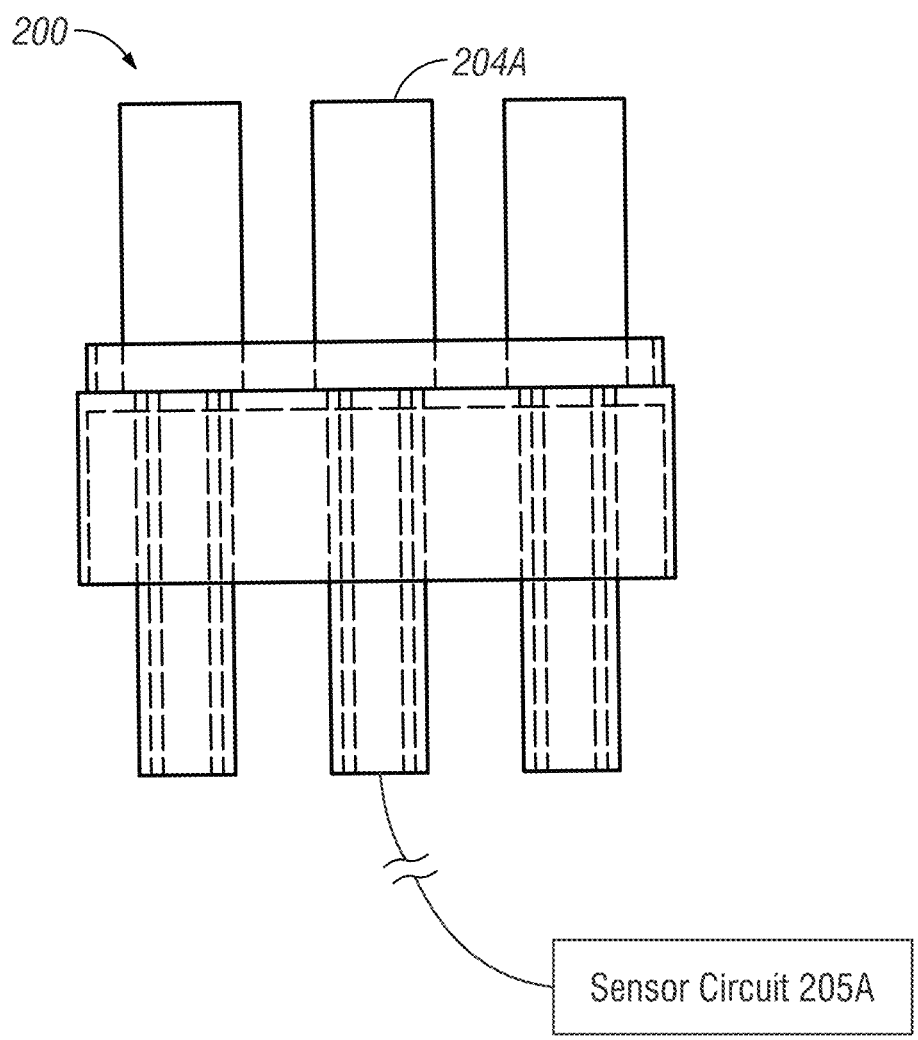

FIG. 20B shows an enlarged side elevation of FIG. 20A and just one connection to a sensor circuit. As will be appreciated, the electrical connections would be long enough to allow range of motion from one location to another in instrument 40. Sensor circuits 205 could be placed on top of frame 41 with circuit 380. Alternatively, some or all of them could be placed in tool 200 or in other locations.

The types and configurations for such sensors can vary according to need or desire. A wide variety of the same are commercially available or are described in the literature.

The following examples, incorporated by reference herein, describes some of these:

1. Adamchuk et al., On-the-go soil sensors for precision agriculture, Computers and Electronics in Agriculture 44 (2004) 71-91, (incorporated by reference herein), describes various types of know sensors related to agronomic soil characteristics including (a) electrical and electromagnetic sensors measure electrical resistivity/conductivity, capacitance or inductance affected by the composition of tested soil; (b) optical and radiometric sensors use electromagnetic waves to detect the level of energy absorbed/reflected by soil particles; (c) mechanical sensors measure forces resulting from a tool engaged with the soil; (d) acoustic sensors quantify the sound produced by a tool interacting with the soil; (e) pneumatic sensors assess the ability to inject air into the soil, (f) electrochemical sensors use ion-selective membranes that produce a voltage output in response to the activity of selected ions ($H+$, $K+$, $NO3-$, $Na+$, etc.).
2. http://soilsensor.com/soil-sensor-types/ mentions examples of classes of sensors including (a) coaxial impedance dielectric reflectometry, (b) frequency domain reflectometry, (c) time domain reflectometry, (d) gypsum blocks, (e) neutron probes, and (f) gravimetric probes.
3. U.S. Pat. No. 7,788,970 B2 to Hitt, et al., entitled Wireless Sensor Probe, discusses small form factor sensors that can be bundled to interrogate soil properties for such things as pH, soil water content, temperature, dissolved oxygen, pH, conductivity, and dielectric frequency response.
4. U.S. Pat. No. 6,331,438 B1 to Aylott, et al., entitled Optical Sensors and Multisensor Arrays Containing Thin Film Electroluminescent Devices, gives additional examples of both specific types of sensors and use for sensing chemical, biological, and physical analytes.

For example, the sensors could look for parameters related to objects of interest. On the other hand, they could look for parameters related to the other constituents of the sample. For instance, it might be of interest to measure chemical constituents of the soil. Such things as nitrates, potassium, and other chemicals can be of great interest to agricultural producers. In this sense this embodiment, combined with extraction and quantification of objects of interest, expands information about the sample beyond the objects of interest. As can be understood, instrument 40 might be simply used to use sensor tool 200 with a sample regardless of whether or not extraction or quantification of objects of interest is conducted.

As will be further appreciated, sensors 204 could be electrical based. A variety of electrode—based chemical sensors are possible. Each of working ends 204A-E could alternatively carry some chemical—based member. One example would be litmus paper or similar. Insertion into the sample or the sample in solution would expose it to the sample or the sample in solution. Upon extraction of tool 200, the litmus paper could be viewed, removed, imaged, or otherwise interpreted.

Variations obvious to those skilled in this technical area are included within this option.

Thus, it can be seen that concurrently instrument 40 can manipulate the physical composition of a sample with the sieving action and sieves. Addition of sensor tool 200 can allow derivation of chemical composition.

As can be further appreciated, alternatively different sensors could be placed along sieve sidewalls or other locations on a sieve. Techniques for transducing sensor measurements can include both wired and wireless techniques. Small-scale even micro-sized sensors can be installed by a variety of techniques and queried for measurements at appropriate times.

As mentioned, this might include measurements related to the sample or to fluid associated with the sieving action or the sample.

What is claimed is:

1. A system for extraction and quantification of predetermined objects of interest in a soil or feces sample with automated steps comprising:
   a. an extraction station comprising:
      i. a motion-controlled rotatable multilevel turntable assembly with rotational position feedback, wherein each level of the multilevel turntable assembly comprises at least one receiver for removable insertion of a sieve;
      ii. a motion-controlled sieve manipulator to position sieves of different screen sizes relative to one another for at least one sieving action on the soil or feces sample to separate and extract the objects of interest from the remainder of the soil or feces sample, wherein the motion-controlled sieve manipulator has a range of movement to each level of the multilevel turntable adapted for controlled movement of sieves in position relative to other components of the system or relative to space generally; and
      iii. a collection container for receiving the extracted objects of interest;
   b. a quantification station for quantifying the extracted objects of interest comprising:
      i. an imaging location adapted to present the extracted objects of interest for imaging;
      ii. an image recognition or reconstruction sub-system having a field of view including the imaging location and pattern recognition software programmed with pattern-recognition parameters correlated to the objects of interest; and
   c. a programmable controller for instructing motion control in the extraction station;
   d. so that one or more of the following can be conducted on a soil or feces sample:
      i. objects of interest are automatically extracted from the soil or feces sample; and
      ii. extracted objects of interest are automatically counted by pattern recognition.

2. The system of claim 1 wherein the extraction station further comprises:
   a. at least two vertically positioned sieves of different pore sizes that are supported on the multilevel turntable.

3. The system of claim 1 further comprising a grinder tool at the extraction station having a rotatable grinding pad sized to fit in a sieve and adapted to provide gentle grinding and press actions on a sample on a sieve screen.

4. The system of claim 1 further comprising a washing tool adapted to provide washing liquid to a sieve, wherein the washing tool is motion-controlled for movement in the extraction station.

5. The system of claim 1 further comprising an input station, the input station comprising:
   a. a conveyor sub-system to support and automatically transport a plurality of soil or feces samples to the extraction station;
   b. a collection component to receive extracted particles and contain them in a container that can be identified and correlated to the input sample.

6. The system of claim 1 wherein objects of interest comprise:
   a. nematodes, wherein the different screen sizes include at least one to pass nematode cysts and one to pass nematode eggs; or
   b. one of fungal spores, weed seeds, eggs of nematodes, larvae of nematodes, cysts of nematodes, organisms, eggs of insects, larvae of insects, and soil mites.

7. The system of claim 1 wherein the image recognition subsystem comprises:
   a. a digital imager for static imaging;
   b. a substrate to support extracted objects of interest in the digital scanner;
   c. software to;
      i. scan discrete areas of the substrate,
      ii. store images of each discrete area,
      iii. run pattern recognition on each discrete area;
      iv. increment a counter for each pattern recognition indicative of an object of interest; and
      v. provide a final cumulative count.

8. The system of claim 1 wherein the image recognition subsystem comprises:
   a. a lens-free photodetector array sensor for video imaging;
   b. a microfluidic subsystem to flow extracted objects of interest in solution past the imaging location of the lens-free photodetector array sensor to acquire video of the flow
   c. software to;
      i. select two frames of video;
      ii. run image reconstruction on each of the frames;
      iii. run pattern recognition on each reconstruction;
      iv. increment a counter for each pattern recognition indicative of an object of interest object of interest, and
      v. provide a final cumulative count.

9. The system of claim 1 further comprising:
   a. a sensor subassembly including one or more sensors adapted to sense one or more attributes of the sample and communicate a sensed attribute to a processor;

b. the sensor subassembly being embodied in at least one of:
  i. a sieve holding a sample; or
  ii. a motion-controlled tool that can be moved to a sieve holding a sample.

10. The system of claim 1 wherein the sample is processed prior to imaging by density separation.

11. A method to automate extraction of objects of interest from a soil or feces sample comprising:
  a. preparing a diluted soil or feces sample containing objects of interest;
  b. conducting a first sieving on a first sieve for separating the objects of interest from larger particles in the soil or feces sample with automated washing action, wherein the first sieving comprises controlled movement of the first sieve in position relative to other components of the system or relative to space generally;
  c. collecting the separated objects of interest on a second sieve;
  d. conducting a second sieving on the second sieve to influence releasing the objects of interest and passing them through the second sieve, wherein the second sieving comprises controlled movement of the second sieve both in position relative to other components of the system or relative to space generally; and
  e. collecting what is passed through the second sieve.

12. The method of claim 11 further comprising conducting one or more of:
  a. a third sieving with a third sieve after the second sieve, the third sieve having a screen size to pass objects of interest; and
  b. spraying water in and on the second sieve between periods of grinding and pressing.

13. The method of claim 11 further comprising quantifying the collected objects of interest by automated digital pattern recognition of acquired images of the objects of interest.

14. The method of claim 13 wherein the acquired images are scans of a static substrate containing the objects of interest, wherein recognized patterns indicative of an object of interest are counted for the acquired images.

15. The method of claim 13 wherein the acquired images are video frames of flowing solution containing the objects of interest, wherein recognized patterns indicative of an object of interest are counted for the acquired images.

16. The method of claim 15 wherein the count is of objects of interest comprising one of nematode worms, cysts, or eggs and used to estimate an infestation level for the soil or feces sample, further comprising using the estimate for remedial action at the source of the soil or feces sample.

17. The method of claim 11 further comprising automatically sensing a chemical, physical, electrical, electromagnetic, optical, radiometric, mechanical, acoustic, pneumatic, electrochemical or biological parameter of the sample or the objects of interest in the sample by use of one or more sensors.

18. The method of claim 11 wherein the sample is processed prior to imaging by density separation.

19. A system for extraction and quantification of predetermined objects of interest in a soil or feces sample with automated steps comprising:
  a. an extraction station comprising:
    i. a motion-controlled sieve manipulator to position sieves of different screen sizes relative to one another for at least one sieving action on the soil or feces sample to separate and extract the objects of interest from the remainder of the soil or feces sample;
    ii. a collection container for receiving the extracted objects of interest;
  b. a quantification station for quantifying the extracted objects of interest comprising:
    i. an imaging location adapted to present the extracted objects of interest for imaging;
    ii. an image recognition or reconstruction sub-system having a field of view including the imaging location and pattern recognition software programmed with pattern-recognition parameters correlated to the objects of interest; wherein the image recognition or reconstruction subsystem comprises:
      a. a lens-free photodetector array sensor for video imaging;
      b. a microfluidic subsystem to flow extracted objects of interest in solution past the imaging location of the lens-free photodetector array sensor to acquire video of the flow
      c. software to;
        i. select two frames of video;
        ii. run image reconstruction on each of the frames;
        iii. run pattern recognition on each reconstruction;
        iv. increment a counter for each pattern recognition indicative of an object-of interest, and
        v. provide a final cumulative count; and
  c. a programmable controller for instructing motion control in the extraction station;
  d. so that one or more of the following can be conducted on a soil or feces sample:
    i. objects of interest are automatically extracted from the soil or feces sample; and
    ii. extracted objects of interest are automatically counted by pattern recognition.

20. The system of claim 19 wherein the extraction station further comprises:
  a. a motion-controlled rotatable multilevel turntable with rotational position feedback;
  b. each level comprising at least one receiver for removable insertion of a sieve; and
  c. at least two vertically positioned sieves of different pore sizes are supported on the multilevel turntable.

21. The system of claim 19 wherein the motion-controlled sieve manipulator has range of movement to each level of the multilevel turntable.

22. The system of claim 19 further comprising a grinder tool at the extraction station having a rotatable grinding pad sized to fit in a sieve and adapted to provide gentle grinding and press actions on a sample on a sieve screen.

23. The system of claim 19 further comprising a washing tool adapted to provide washing liquid to a sieve, wherein the washing tool is motion-controlled for movement in the extraction station.

24. The system of claim 19 further comprising an input station, the input station comprising:
  a. a conveyor sub-system to support and automatically transport a plurality of soil or feces samples to the extraction station;
  b. a collection component to receive extracted particles and contain them in a container that can be identified and correlated to the input sample.

25. The system of claim 19 wherein objects of interest comprise:
  a. nematodes, wherein the different screen sizes include at least one to pass nematode cysts and one to pass nematode eggs; or b. one of fungal spores, weed seeds, eggs of nematodes, larvae of nematodes, cysts of nematodes, organisms, eggs of insects, larvae of insects, and soil mites.

\* \* \* \* \*

UNITED STATES PATENT AND TRADEMARK OFFICE
CERTIFICATE OF CORRECTION

Page 1 of 1

PATENT NO.        : 10,900,877 B1
APPLICATION NO.   : 15/914735
DATED             : January 26, 2021
INVENTOR(S)       : Santosh Pandey et al.

It is certified that error appears in the above-identified patent and that said Letters Patent is hereby corrected as shown below:

<u>In Column 40, Claim 8.c.iv., Lines 61-62:</u>
DELETE "object of interest" after "an"

Signed and Sealed this
Fourth Day of May, 2021

Drew Hirshfeld
*Performing the Functions and Duties of the
Under Secretary of Commerce for Intellectual Property and
Director of the United States Patent and Trademark Office*